United States Patent
Detwiler et al.

(10) Patent No.: US 12,495,353 B2
(45) Date of Patent: Dec. 9, 2025

(54) NON-WAKING MAINTENANCE OF NEAR OWNER STATE

(71) Applicant: Apple Inc., Cupertino, CA (US)

(72) Inventors: Benjamin A. Detwiler, Encinitas, CA (US); Brent M. Ledvina, San Francisco, CA (US); Kenneth U. Victa, San Jose, CA (US); Langford M. Wasada, San Diego, CA (US); Yannick L. Sierra, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 524 days.

(21) Appl. No.: 18/050,887

(22) Filed: Oct. 28, 2022

(65) Prior Publication Data

US 2023/0328635 A1    Oct. 12, 2023

Related U.S. Application Data

(60) Provisional application No. 63/348,802, filed on Jun. 3, 2022, provisional application No. 63/330,221, filed on Apr. 12, 2022.

(51) Int. Cl.
   *H04W 4/00*     (2018.01)
   *H04W 48/16*    (2009.01)
   *H04W 52/02*    (2009.01)

(52) U.S. Cl.
   CPC ....... *H04W 48/16* (2013.01); *H04W 52/0258* (2013.01)

(58) Field of Classification Search
   CPC .......................... H04W 48/16; H04W 52/0258
   (Continued)

(56) References Cited

U.S. PATENT DOCUMENTS

| 4,918,425 A | 4/1990 | Greenberg et al. |
| 5,910,776 A | 6/1999 | Black |

(Continued)

FOREIGN PATENT DOCUMENTS

| CN | 101682508 | 3/2010 |
| CN | 102098656 A | 6/2011 |

(Continued)

OTHER PUBLICATIONS

PCT/US2019/048899, "Notification of Transmittal of the International Search Report and the Written Opinion of the International Searching Authority, or The Declaration" mailed Dec. 2, 2019, 5 pgs.

(Continued)

*Primary Examiner* — Temica M Beamer
(74) *Attorney, Agent, or Firm* — Kilpatrick Townsend & Stockton LLP

(57) ABSTRACT

Embodiments described herein provide for a mobile electronic device including a wireless network interface coupled to a bus, a memory device coupled to the bus, and one or more processors coupled to the bus, the one or more processors to execute instructions to perform a scan, via the wireless network interface, for a beacon advertisement that is broadcast by a wireless device within range of the wireless network interface, detect the beacon advertisement broadcast by the wireless device, retrieve an identifier broadcast within the beacon advertisement, based on a result of a comparison between the identifier to at least one expected identifier, selectively send a timer reset packet to the wireless device and an authorization token for the wireless accessory to remain in near-owner mode, and allow the one or more processors to sleep for a predetermined time.

22 Claims, 35 Drawing Sheets

(58) Field of Classification Search
USPC .................................................... 455/434
See application file for complete search history.

(56) References Cited

U.S. PATENT DOCUMENTS

| | | |
|---|---|---|
| 6,292,660 B1 | 9/2001 | Hartless et al. |
| 6,345,098 B1 | 2/2002 | Matyas, Jr. et al. |
| 6,369,706 B1 | 4/2002 | Anderson et al. |
| 6,754,349 B1 | 6/2004 | Arthan |
| 6,993,350 B2 | 1/2006 | Katoh |
| 7,039,427 B2 | 5/2006 | Tachikawa |
| 7,059,182 B1 | 6/2006 | Ragner |
| 7,224,987 B1 | 5/2007 | Bhela et al. |
| 7,274,761 B2 | 9/2007 | Muller et al. |
| 7,342,497 B2 | 3/2008 | Chung et al. |
| 7,376,393 B2 | 5/2008 | Ono et al. |
| 7,388,491 B2 | 6/2008 | Chand et al. |
| 7,519,377 B2 | 4/2009 | Tsukamoto |
| 7,558,529 B2 | 7/2009 | Seshadri et al. |
| 7,657,248 B2 | 2/2010 | Hodoshima |
| 8,213,389 B2 | 7/2012 | Bush et al. |
| 8,224,355 B2 | 7/2012 | Beydler et al. |
| 8,351,937 B2 | 1/2013 | Lee |
| 8,457,617 B2 | 6/2013 | Sweeney et al. |
| 8,499,337 B1 | 7/2013 | Kenny |
| 8,538,401 B2 | 9/2013 | Kim et al. |
| 8,583,915 B1 | 11/2013 | Huang |
| 8,873,758 B2 | 10/2014 | Bradley |
| 8,971,924 B2 | 3/2015 | Pai et al. |
| 9,009,794 B2 | 4/2015 | Dykeman et al. |
| 9,077,521 B2 | 7/2015 | Machani |
| 9,104,896 B2 | 8/2015 | Pai et al. |
| 9,277,353 B2 | 3/2016 | Merriam |
| 9,277,386 B1 | 3/2016 | Masiero et al. |
| 9,316,717 B2 | 4/2016 | Gicklhorn et al. |
| 9,323,916 B1 | 4/2016 | Wu et al. |
| 9,357,348 B2 | 5/2016 | Evans et al. |
| 9,420,423 B1 | 8/2016 | Mendelson |
| 9,426,749 B2 | 8/2016 | Cordeiro et al. |
| 9,432,802 B2 | 8/2016 | Matsushita et al. |
| 9,439,056 B2 | 9/2016 | Chukka et al. |
| 9,443,366 B2 | 9/2016 | Rayner |
| 9,456,298 B2 | 9/2016 | Lee et al. |
| 9,462,109 B1 | 10/2016 | Frazier Fields et al. |
| 9,516,620 B1 | 12/2016 | Upp et al. |
| 9,520,045 B2 | 12/2016 | Hawkins |
| 9,544,075 B2 | 1/2017 | Altman et al. |
| 9,557,185 B2 | 1/2017 | Kimes |
| 9,565,255 B2 | 2/2017 | Kapoor et al. |
| 9,641,622 B2 | 5/2017 | Kapoor et al. |
| 9,706,032 B2 | 7/2017 | Pai et al. |
| 9,762,316 B2 | 9/2017 | Kukuiski et al. |
| 9,769,601 B2 | 9/2017 | Zelinka |
| 9,779,596 B2 | 10/2017 | Ingrassia et al. |
| 9,781,106 B1 | 10/2017 | Vitus et al. |
| 9,801,059 B2 | 10/2017 | Ziv et al. |
| 9,820,093 B2 | 11/2017 | Mayor et al. |
| 9,848,075 B1 | 12/2017 | Ahmad et al. |
| 9,860,932 B2 | 1/2018 | Kapoor et al. |
| 9,922,531 B1 | 3/2018 | Doxey et al. |
| 9,961,507 B1 | 5/2018 | Mendelson |
| 10,015,836 B2 | 7/2018 | Kapoor et al. |
| 10,022,066 B2 | 7/2018 | Tomiha |
| 10,022,086 B1 | 7/2018 | Kahn et al. |
| 10,042,595 B2 | 8/2018 | Behzadi et al. |
| 10,110,642 B2 | 10/2018 | Numakami |
| 10,366,692 B1 | 7/2019 | Adams et al. |
| 10,368,378 B2 | 7/2019 | Foster et al. |
| 10,410,485 B2 | 9/2019 | Ingrassia et al. |
| 10,448,211 B1 | 10/2019 | Shen et al. |
| 10,506,517 B2 | 12/2019 | Dai Javad et al. |
| 10,600,310 B2 | 3/2020 | Hawkins |
| 10,667,313 B2 | 5/2020 | Maguire et al. |
| 10,701,203 B2 | 6/2020 | Fiorini et al. |
| 10,771,898 B2 | 9/2020 | Dusan et al. |
| 10,841,736 B1 | 11/2020 | De La Broise |
| 10,855,483 B1 | 12/2020 | Ramesh et al. |
| 10,862,684 B2 | 12/2020 | Hong et al. |
| 10,956,975 B1 | 3/2021 | Abdul Gaffar et al. |
| 10,970,989 B1 | 4/2021 | Quibelan et al. |
| 10,992,755 B1 | 4/2021 | Tran |
| 11,051,105 B2 | 6/2021 | Dusan et al. |
| 11,088,830 B2 | 8/2021 | Gu et al. |
| 11,107,088 B2 | 8/2021 | Radocchia et al. |
| 11,202,168 B2 | 12/2021 | Evans et al. |
| 11,265,716 B2 | 3/2022 | Klinkner et al. |
| 11,282,351 B2 | 3/2022 | Ingrassia, Jr. et al. |
| 11,288,562 B2 | 3/2022 | Purba |
| 11,310,652 B2 | 4/2022 | Norp et al. |
| 11,356,799 B2 | 6/2022 | Haney |
| 11,595,784 B2 | 2/2023 | Mohalik |
| 11,606,669 B2 | 3/2023 | Lopatin et al. |
| 11,622,237 B2 | 4/2023 | Diem |
| 11,641,563 B2 | 5/2023 | Lopatin et al. |
| 11,716,603 B2 | 8/2023 | Lee et al. |
| 11,863,671 B1 | 1/2024 | Sierra et al. |
| 11,889,302 B2 | 1/2024 | Victa et al. |
| 2002/0144215 A1 | 10/2002 | Hoskote et al. |
| 2003/0065918 A1 | 4/2003 | Willey |
| 2003/0092437 A1 | 5/2003 | Nowlin et al. |
| 2003/0182584 A1 | 9/2003 | Banes et al. |
| 2004/0162027 A1 | 8/2004 | Chang |
| 2004/0203854 A1 | 10/2004 | Nowak |
| 2004/0249817 A1 | 12/2004 | Liu et al. |
| 2005/0021767 A1 | 1/2005 | Cai |
| 2005/0148340 A1 | 7/2005 | Guyot |
| 2005/0154896 A1 | 7/2005 | Widman et al. |
| 2005/0190098 A1 | 9/2005 | Bridgelall et al. |
| 2005/0285739 A1 | 12/2005 | Velhal et al. |
| 2006/0039337 A1 | 2/2006 | Hodoshima |
| 2006/0111835 A1 | 5/2006 | Baker et al. |
| 2006/0223518 A1 | 10/2006 | Haney |
| 2007/0139199 A1 | 6/2007 | Hanlon |
| 2007/0249374 A1 | 10/2007 | Hu et al. |
| 2007/0283151 A1 | 12/2007 | Nakano et al. |
| 2007/0283395 A1 | 12/2007 | Wezowski |
| 2008/0004043 A1 | 1/2008 | Wilson et al. |
| 2008/0004798 A1 | 1/2008 | Troxler et al. |
| 2008/0119953 A1 | 5/2008 | Reed et al. |
| 2008/0120196 A1 | 5/2008 | Reed et al. |
| 2008/0139219 A1 | 6/2008 | Boeiro et al. |
| 2008/0186165 A1 | 8/2008 | Bertagna et al. |
| 2008/0287151 A1 | 11/2008 | Fjelstad et al. |
| 2009/0006566 A1 | 1/2009 | Veeramachaneni et al. |
| 2009/0058670 A1 | 3/2009 | Sweeney et al. |
| 2009/0113340 A1 | 4/2009 | Bender |
| 2009/0150674 A1 | 6/2009 | Richardson et al. |
| 2009/0315767 A1 | 12/2009 | Scalisi et al. |
| 2009/0323972 A1 | 12/2009 | Kohno et al. |
| 2009/0325599 A1 | 12/2009 | Vuori |
| 2010/0004005 A1 | 1/2010 | Pereira et al. |
| 2010/0079249 A1 | 4/2010 | Pan |
| 2010/0159833 A1 | 6/2010 | Lewis et al. |
| 2010/0184378 A1 | 7/2010 | Wakefield |
| 2010/0245054 A1 | 9/2010 | Kim |
| 2010/0250727 A1 | 9/2010 | King et al. |
| 2010/0289620 A1 | 11/2010 | Aminger et al. |
| 2011/0051658 A1 | 3/2011 | Jin et al. |
| 2011/0124326 A1 | 5/2011 | Kudo |
| 2011/0137813 A1 | 6/2011 | Stewart |
| 2012/0008526 A1 | 1/2012 | Borghei |
| 2012/0054028 A1 | 3/2012 | Tengler et al. |
| 2012/0054493 A1 | 3/2012 | Bradley |
| 2012/0083209 A1 | 4/2012 | Giles et al. |
| 2012/0095918 A1 | 4/2012 | Jurss |
| 2012/0100868 A1 | 4/2012 | Kim et al. |
| 2012/0275361 A1 | 11/2012 | Berenberg et al. |
| 2012/0302256 A1 | 11/2012 | Pai et al. |
| 2012/0310391 A1 | 12/2012 | Sanders |
| 2012/0328061 A1 | 12/2012 | Chow |
| 2013/0023238 A1 | 1/2013 | Kaplan et al. |
| 2013/0034004 A1 | 2/2013 | Mannemala et al. |
| 2013/0104035 A1 | 4/2013 | Wagner et al. |
| 2013/0111555 A1 | 5/2013 | Leneel |

(56) References Cited

U.S. PATENT DOCUMENTS

| | | |
|---|---|---|
| 2013/0171986 A1 | 7/2013 | Shimizu |
| 2013/0271902 A1 | 10/2013 | Lai et al. |
| 2013/0275873 A1 | 10/2013 | Shaw et al. |
| 2013/0290191 A1 | 10/2013 | Dischamp et al. |
| 2013/0290522 A1 | 10/2013 | Behm, Jr. |
| 2013/0343542 A1 | 12/2013 | Rosati et al. |
| 2014/0111307 A1 | 4/2014 | Ingrassia et al. |
| 2014/0222685 A1 | 8/2014 | Middleton et al. |
| 2014/0379584 A1 | 12/2014 | Ward |
| 2015/0019124 A1 | 1/2015 | Bandyopadhyay et al. |
| 2015/0072618 A1 | 3/2015 | Granbery |
| 2015/0189596 A1 | 7/2015 | Stephens |
| 2015/0277852 A1 | 10/2015 | Burgis |
| 2015/0289207 A1 | 10/2015 | Kubo et al. |
| 2015/0334569 A1 | 11/2015 | Rangarajan et al. |
| 2015/0350140 A1 | 12/2015 | Garcia et al. |
| 2015/0350820 A1 | 12/2015 | Son et al. |
| 2015/0356030 A1 | 12/2015 | Zahand et al. |
| 2015/0382140 A1 | 12/2015 | Cho et al. |
| 2016/0006577 A1 | 1/2016 | Logan |
| 2016/0017402 A1 | 1/2016 | Roth et al. |
| 2016/0037439 A1 | 2/2016 | Shamis et al. |
| 2016/0057572 A1 | 2/2016 | Bojorquez Alfaro et al. |
| 2016/0057625 A1 | 2/2016 | Andrada et al. |
| 2016/0069991 A1 | 3/2016 | Das et al. |
| 2016/0080591 A1 | 3/2016 | Asakura |
| 2016/0087959 A1 | 3/2016 | Park |
| 2016/0088143 A1 | 3/2016 | Cohn et al. |
| 2016/0094947 A1 | 3/2016 | Shen et al. |
| 2016/0140335 A1 | 5/2016 | Proulx et al. |
| 2016/0164973 A1 | 6/2016 | Kapoor et al. |
| 2016/0174023 A1 | 6/2016 | Cavallaro et al. |
| 2016/0180392 A1 | 6/2016 | Liu et al. |
| 2016/0189507 A1 | 6/2016 | Rayner |
| 2016/0205556 A1 | 7/2016 | Borghei |
| 2016/0212538 A1 | 7/2016 | Fullam et al. |
| 2016/0234213 A1 | 8/2016 | Kim et al. |
| 2016/0242192 A1 | 8/2016 | Llosa et al. |
| 2016/0248564 A1 | 8/2016 | Qi et al. |
| 2016/0302137 A1 | 10/2016 | Escott et al. |
| 2016/0330095 A1 | 11/2016 | Numakami |
| 2016/0344712 A1 | 11/2016 | Ding et al. |
| 2016/0352518 A1 | 12/2016 | Ford et al. |
| 2016/0357385 A1 | 12/2016 | Dan et al. |
| 2016/0360350 A1 | 12/2016 | Watson et al. |
| 2016/0371507 A1 | 12/2016 | Jakobsson |
| 2017/0006417 A1 | 1/2017 | Canoy et al. |
| 2017/0078408 A1 | 3/2017 | Lepp et al. |
| 2017/0126818 A1 | 5/2017 | Kang |
| 2017/0127340 A1 | 5/2017 | Dooey et al. |
| 2017/0134898 A1 | 5/2017 | Vega et al. |
| 2017/0171181 A1 | 6/2017 | Britt |
| 2017/0228935 A1 | 8/2017 | Foster et al. |
| 2017/0272415 A1 | 9/2017 | Zhao et al. |
| 2017/0330031 A1 | 11/2017 | Wilson et al. |
| 2018/0013815 A1 | 1/2018 | Gold |
| 2018/0025595 A1 | 1/2018 | Ingrassia et al. |
| 2018/0035374 A1 | 2/2018 | Borden et al. |
| 2018/0176748 A1 | 6/2018 | Kim et al. |
| 2018/0183591 A1 | 6/2018 | De Laat et al. |
| 2018/0183596 A1 | 6/2018 | Deshpande et al. |
| 2018/0184286 A1 | 6/2018 | Patterson |
| 2018/0199138 A1 | 7/2018 | Dusan et al. |
| 2018/0219872 A1 | 8/2018 | Sugashima et al. |
| 2018/0227284 A1 | 8/2018 | Sugano et al. |
| 2018/0262907 A1 | 9/2018 | Alanis et al. |
| 2018/0288208 A1 | 10/2018 | Lee et al. |
| 2018/0317266 A1 | 11/2018 | Britt et al. |
| 2018/0343561 A1 | 11/2018 | Patterson |
| 2018/0348718 A1 | 12/2018 | Richardson et al. |
| 2019/0028281 A1 | 1/2019 | Turissini et al. |
| 2019/0028445 A1 | 1/2019 | McLaughlin et al. |
| 2019/0034920 A1 | 1/2019 | Nolan et al. |
| 2019/0037469 A1 | 1/2019 | Krishnan et al. |
| 2019/0058966 A1 | 2/2019 | Puppala et al. |
| 2019/0069243 A1 | 2/2019 | Bean et al. |
| 2019/0116173 A1 | 4/2019 | Robison et al. |
| 2019/0124469 A1 | 4/2019 | Roy et al. |
| 2019/0191301 A1 | 6/2019 | Fang et al. |
| 2019/0213528 A1 | 7/2019 | Gupta et al. |
| 2019/0246253 A1 | 8/2019 | Ryu et al. |
| 2019/0289059 A1 | 9/2019 | Vanahalli et al. |
| 2020/0034835 A1 | 1/2020 | Kim |
| 2020/0074822 A1 | 3/2020 | Ingrassia, Jr. et al. |
| 2020/0107164 A1 | 4/2020 | Lopatin et al. |
| 2020/0145244 A1 | 5/2020 | Hollinger et al. |
| 2020/0177595 A1 | 6/2020 | Rakshit et al. |
| 2020/0187001 A1 | 6/2020 | Ard et al. |
| 2020/0226908 A1 | 7/2020 | Doxey et al. |
| 2020/0242662 A1 | 7/2020 | Middleton et al. |
| 2020/0344549 A1 | 10/2020 | Wegener |
| 2021/0044957 A1 | 2/2021 | Norp et al. |
| 2021/0136846 A1 | 5/2021 | Ponnusamy et al. |
| 2021/0203747 A1 | 7/2021 | Gorsica, IV et al. |
| 2021/0204115 A1 | 7/2021 | Gorsica, IV et al. |
| 2021/0250355 A1 | 8/2021 | Galdo et al. |
| 2021/0256833 A1 | 8/2021 | Daouta et al. |
| 2021/0334851 A1 | 10/2021 | Proctor, Jr. et al. |
| 2021/0400045 A1 | 12/2021 | Kondeti |
| 2022/0021684 A1 | 1/2022 | Mensah et al. |
| 2022/0052847 A1 | 2/2022 | Gonzalez Cervantes et al. |
| 2022/0070667 A1* | 3/2022 | Victa .................. H04L 9/0891 |
| 2022/0078029 A1 | 3/2022 | Galdo et al. |
| 2022/0165139 A1 | 5/2022 | Ingrassia, Jr. et al. |
| 2022/0200789 A1 | 6/2022 | Lalande et al. |
| 2022/0224300 A1 | 7/2022 | Knode |
| 2022/0256633 A1 | 8/2022 | Gu et al. |
| 2022/0327196 A1 | 10/2022 | Trapani |
| 2022/0369022 A1 | 11/2022 | Jorgovanovic et al. |
| 2022/0386076 A1 | 12/2022 | Lopatin et al. |
| 2022/0394431 A1 | 12/2022 | Lopatin et al. |
| 2022/0394660 A1 | 12/2022 | Werner et al. |

FOREIGN PATENT DOCUMENTS

| | | |
|---|---|---|
| CN | 102325324 A | 1/2012 |
| CN | 102868968 A | 1/2013 |
| CN | 104833945 | 8/2015 |
| CN | 106412816 | 2/2017 |
| CN | 106792501 A | 5/2017 |
| CN | 107328424 | 11/2017 |
| CN | 108223229 A | 6/2018 |
| CN | 108520552 | 9/2018 |
| CN | 109596118 | 4/2019 |
| CN | 111436040 | 7/2020 |
| CN | 112068512 | 12/2020 |
| CN | 114071357 | 2/2022 |
| DE | 102012208616 A1 | 12/2012 |
| EP | 1296155 | 3/2003 |
| EP | 1387590 A2 | 2/2004 |
| EP | 2020784 | 2/2009 |
| GB | 2472192 A | 2/2011 |
| GB | 2491247 | 11/2012 |
| JP | H11262065 | 9/1999 |
| JP | 2003207556 A | 7/2003 |
| JP | 2007150904 | 6/2007 |
| JP | 2009081865 A | 4/2009 |
| JP | 2010288162 A | 12/2010 |
| JP | 2011060065 A | 3/2011 |
| JP | 2018191522 | 12/2018 |
| JP | 2021025798 | 2/2021 |
| KR | 20140044916 | 4/2014 |
| KR | 20170013833 | 2/2017 |
| KR | 20180086118 | 7/2018 |
| KR | 2019-0141998 A | 12/2019 |
| WO | 0141468 A2 | 6/2001 |
| WO | 0203093 A1 | 1/2002 |
| WO | 2010048995 A1 | 5/2010 |
| WO | 2010126846 | 11/2010 |
| WO | 2011080622 A1 | 7/2011 |
| WO | 2012030733 | 3/2012 |
| WO | 2012162192 A1 | 11/2012 |
| WO | 2013036488 | 3/2013 |
| WO | 2013163334 | 10/2013 |

(56) References Cited

FOREIGN PATENT DOCUMENTS

| | | |
|---|---|---|
| WO | 2014005004 | 3/2014 |
| WO | 2014042507 A1 | 3/2014 |
| WO | 2016032610 | 3/2016 |
| WO | 2016036453 A1 | 3/2016 |
| WO | 2017107077 | 6/2017 |
| WO | 2018001518 A1 | 1/2018 |
| WO | 2018118026 A1 | 6/2018 |
| WO | 2018135919 | 7/2018 |
| WO | 2018156555 | 8/2018 |
| WO | 2018160863 A1 | 9/2018 |
| WO | 2019232420 A2 | 12/2019 |
| WO | 2020214701 A1 | 10/2020 |
| WO | 2020214708 A1 | 10/2020 |
| WO | 2020214709 A1 | 10/2020 |
| WO | 2020214711 A1 | 10/2020 |
| WO | 2022046527 | 3/2022 |
| WO | 2022256438 | 12/2022 |

OTHER PUBLICATIONS

A. Korolova et al., "Cross-App Tracking via Nearby Bluetooth Low Energy Devices", A presentation proposal for PrivacyCon 2017, Published Mar. 13, 2018, 12 pgs.

PCT/US2020/028318, "PCT Notification of Transmittal of the International Search Report and the Written Opinion of the International Searching Authority, or the Declaration", Mailed Jul. 8, 2020, 16 pages.

PCT/US2020/028326, "PCT Notification of Transmittal of the International Search Report and the Written Opinion of the International Searching Authority, or the Declaration", Mailed Jul. 3, 2020, 12 pages.

PCT/US2020/028327, "PCT Notification of Transmittal of the International Search Report and the Written Opinion of the International Searching Authority, or the Declaration", Mailed Sep. 14, 2020, 17 pages.

PCT/US2020/028329, "PCT Notification of Transmittal of the International Search Report and the Written Opinion of the International Searching Authority, or the Declaration", Mailed Jul. 15, 2020, 13 pages.

Mannan, Mohammad, et al. "Mercury: Recovering forgotten passwords using personal devices." International Conference on Financial Cryptography and Data Security. Springer, Berlin, Heidelberg, 2011 (Year: 2011).

FOFA, "Find One, Find All Key Finder & Remote Control Locators", received from The Wayback Machine—https://web.archive.org/web/20200715080402/http://www.findonefindall.com:80/index.htm, 3 pages.

Kim et al., "In/Out Status Monitoring in Mobile Asset Tracking with Wireless Sensor Networks", received from www.mdpi.com/journal/sensors, published Mar. 26, 2010, 22 pages.

Fuemmeler et al., "Energy Efficient Multi-Object Tracking in Sensor Networks", received from https://ieeexplore.ieee.org/document/5439914, published Mar. 29, 2010, 9 pages.

Cocchi et al., "Subband Neural Networks Prediction for On-Line Audio Signal Recovery", received from https://ieeexplore.ieee.org/document/1021887, Published Jul. 2002, 10 pages.

PCT/US2022/027681, "PCT Notification of transmittal of the International Search Report and the Written Opinion of the International Searching Authority, or the Declaration", mailed Jul. 28, 2022, 9 pages.

EP22172663.1, "Extended European Search Report" mailed Jan. 25, 2023, 18 pages.

Lopez, Mareo, "The Importance of a Speaker's Resonant Frequency", proaudioland.com, 3 pages, Aug. 2015 (Year: 2015).

Thetileapp.com [online], "Learn How Tile's Tracking Device Helps You Find Your Lost Things," Dec. 9, 2016, retrieved from URL <https://www.thetileapp.com/how-it-works>, 9 pages.

PCT/US2023/017975, "PCT Notification of Transmittal of the International Search Report and the Written Opinion of the International Searching Authority, or the Declaration", mailed Jun. 29, 2023, 12 pages.

U.S. Appl. No. 13/113,856, Final Office Action, Mailed on Nov. 7, 2012, 20 pages.

U.S. Appl. No. 13/113,856, Non-Final Office Action, Mailed on Jul. 18, 2012, 15 pages.

U.S. Appl. No. 13/488,430, Final Office Action, Mailed on May 8, 2013, 20 pages.

U.S. Appl. No. 13/488,430, Non-Final Office Action, Mailed on Dec. 5, 2012, 14 pages.

European Patent Application No. EP12168980.6 , Extended European Search Report, Mailed on Sep. 21, 2012, 7 pages.

United Kingdom Patent Application No. GB1209044.5 , "Combined Search and Examination Report", Aug. 24, 2012, 5 pages.

Japanese Patent Application No. JP2012-113725, Office Action, Mailed on May 27, 2013, 9 pages (4 pages of English translation and 5 pages of official language copy).

\* cited by examiner

NON-WAKING MAINTENANCE OF NEAR OWNER STATE

RELATED APPLICATIONS

This application claims the benefit of priority of U.S. Provisional Patent Application No. 63/348,802, entitled "Non-Waking Maintenance of Near Owner State," filed Jun. 3, 2022, and U.S. Provisional Patent Application No. 63/330,221, entitled "Non-Waking Maintenance of Near Owner State," filed Apr. 12, 2022, each of which is herein incorporated by reference.

FIELD

Embodiments described herein relate generally to a system and method of locating wireless devices and accessories.

BACKGROUND INFORMATION

Applications that provide notifications on a location of another device rely on being able to establish a wireless connection with the other device. When a first device loses the ability to form a wireless connection with another wireless device, the owner of the first device may be alerted as to the loss of the connection within the user interface of the application. Continuously reporting on the status of the connection to another wireless device rapidly becomes a drain on device resources because the first device cannot know when to expect the other device to send advertisements even if the first device stores information on a window of time (i.e., each X minutes) that the other device plans to advertise within because the first device does not have the most up-to-date information on where the other device is in the window of time. To report on the connection status, the owner device must repeatedly either wake the device processor or not allow the processor to sleep to be able to detect an advertisement from the other device. In an effort to avoid draining resources, the wireless connection between the first device and the other device may be missed and notifications about proximity to the first device may be inaccurate. As a result, prior approaches for reporting on the connection status with other devices unnecessarily drain the device battery.

SUMMARY

Methods, non-transitory machine-readable mediums, and system to provide location services for locating wireless devices and accessories are described. In an embodiment, a device provides a wireless network interface coupled to a bus, a memory device coupled to the bus, and one or more processors coupled to the bus. In some embodiments, one or more processors execute instructions stored on the memory device, wherein upon execution, the instructions cause the one or more processors to perform a scan, via the wireless network interface, for a beacon advertisement that is broadcast by a wireless device within range of the wireless network interface, detect the beacon advertisement broadcast by the wireless device, retrieve an identifier broadcast within the beacon advertisement, based on a result of a comparison between the identifier to at least one expected identifier, selectively send a timer reset packet to the wireless device and an authorization token for the wireless accessory to remain in near-owner mode, and allow the one or more processors to sleep for a predetermined time. In an embodiment, the identifier is a hardware address. In some embodiments, the instructions cause the one or more processors to determine whether the wireless device associated with the beacon advertisement is associated with an account on the mobile electronic device. In some embodiments, the instructions additionally cause the one or more processors to generate a set of cryptographic keys based on stored key material, where the key material is collaboratively generated with the wireless accessory. In an embodiment, thes et of cryptographic keys includes keys for one or more privacy periods of the wireless accessory, and the operations additionally comprising changing, each privacy period, one or more keys used to generate the hardware address with the wireless accessory. In an embodiment, at least one processor wakes after predetermined period of time. In an embodiment, the timer reset packet includes a reset identifier and a channel selection. In some embodiments, the wireless network interface is a Bluetooth network interface.

In an embodiment, a wireless accessory provides a wireless network interface coupled to a bus, a memory device coupled to the bus, and one or more processors coupled to the bus, the one or more processors to execute instructions stored on the memory device, wherein upon execution, the instructions cause the one or more processors to verify a received timer reset packet contents includes an expected identifier, enter near owner mode, and broadcast near owner mode packet after expiration of a timer. In an embodiment, the instructions additionally cause the one or more processors to generate a set of cryptographic keys based on stored key material, where the key material is collaboratively generated with the wireless accessory. In an embodiment, the set of cryptographic keys includes keys for one or more privacy periods of the wireless accessory, and the operations additionally comprising changing, each privacy period, one or more keys used to generate the hardware address with the wireless accessory. In another embodiment, a predetermined time for expiration of a timer is dependent on at least one of a location of the wireless accessory and a motion state.

In an embodiment, a method provides performing a scan, via the wireless network interface, for a beacon advertisement that is broadcast by a wireless device within range of the wireless network interface, detecting the beacon advertisement broadcast by the wireless device, retrieving an identifier broadcast within the beacon advertisement, based on a result of a comparison between the identifier to at least one expected identifier, selectively sending a timer reset packet to the wireless device and an authorization token for the wireless accessory to remain in near-owner mode, and allowing the one or more processors to sleep for a predetermined time.

In an embodiment, the identifier is a hardware address. In an embodiment, the method further provides determining whether the wireless device associated with the beacon advertisement is associated with an account on the mobile electronic device. In an embodiment, the method further provides generating a set of cryptographic keys based on stored key material, where the key material is collaboratively generated with the wireless accessory. In an embodiment, the set of cryptographic keys includes keys for one or more privacy periods of the wireless accessory, and the operations additionally comprising changing, each privacy period, one or more keys used to generate the hardware address with the wireless accessory. In an embodiment, at least one processor wakes after predetermined period of time. In an embodiment, the timer reset packet include a reset identifier and a channel selection. In some embodiments, the wireless network interface is a Bluetooth network interface.

DETAILED DESCRIPTION

Figure 1:
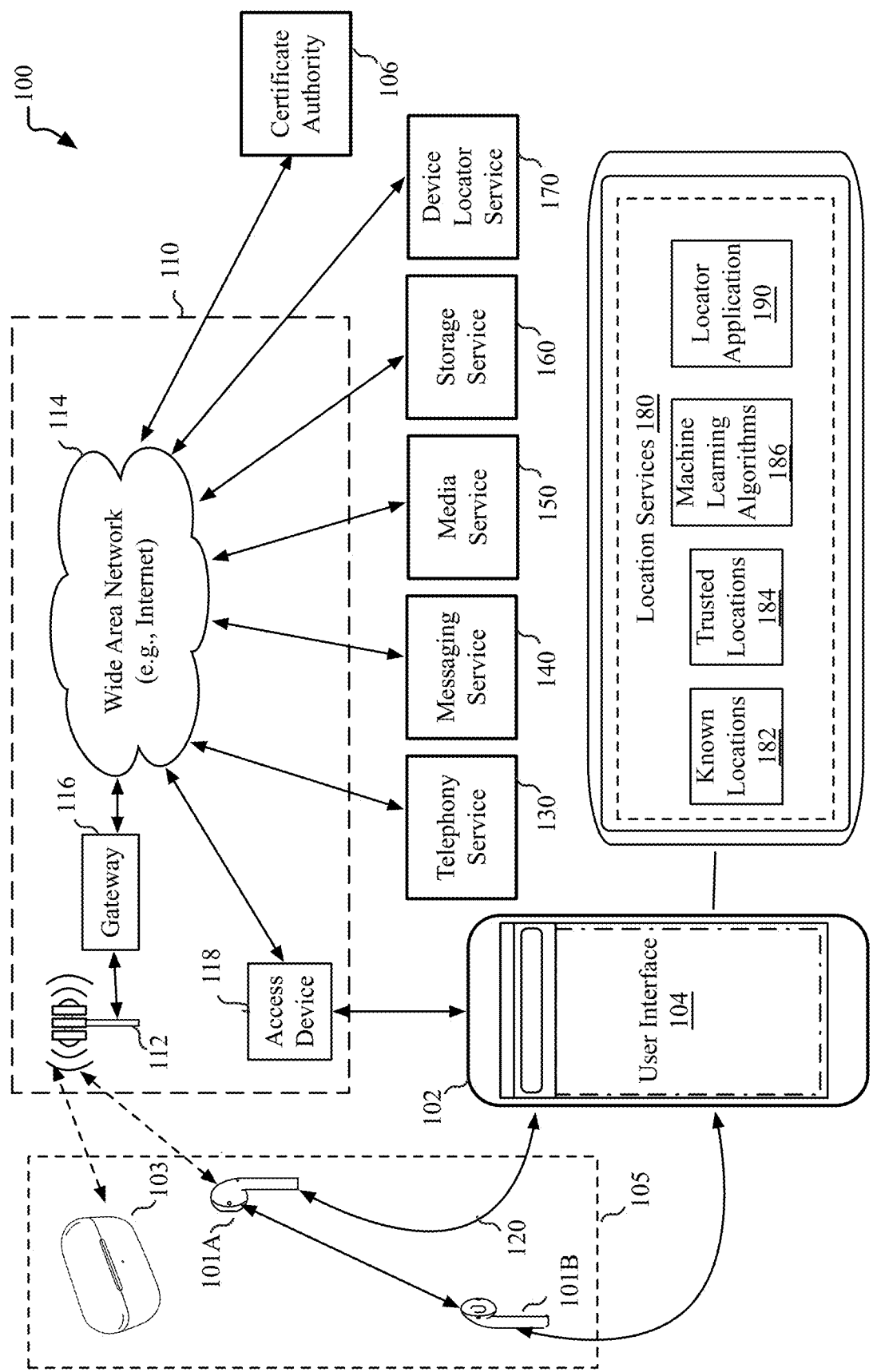
FIG. 1 is a block diagram of a network operating environment for mobile devices, according to an embodiment.

Embodiments described herein provide techniques to enable separation notifications, unwanted tracking notifications, and locator services for lost or misplaced devices or items. An accessory device that is detected near an owner device may be put into a "near-owner" mode. The near-owner mode can indicate that the accessory has detected the nearby presence of the owner device associated with the accessory. In some embodiments, an approach is described for maintaining a near-owner mode to avoid unnecessary unwanted tracking notifications, inaccurate separation notifications, and reduce the impact to resources of an owner device (e.g., device battery, execution time on application processor, etc.).

Unwanted tracking notifications may occur when an accessory device is detected by a device other than the owner device and the accessory device does not have a near-owner status. A potential downside of privacy protections described herein is the risk of allowing accessories to remain unfound or allowing accessories to be placed on an individual with malicious intent to track the individual. As such, an unwanted tracking notification may be provided to the other device to inform the user of the potential unwanted tracking with the accessory device. If near-owner mode is not properly maintained in the presence of the owner device due to loss of near-owner status even when an accessory device is in the presence of owner device, then unnecessary unwanted tracking notifications may be presented to the non-owner devices.

By way of example, if a first user with an owner device and a second user with a non-owner device (e.g., different user account from the first user) travel together (e.g., in a vehicle) to a location (e.g., a defined location, such as a store, a park, etc.) and the near-owner status is not maintained by the accessory device, then a beacon scan buffer of the non-owner device may be receiving advertisements from an accessory device (e.g., Apple AirPods®) associated with the owner device that is in wild mode. Wireless accessories will enter a discoverable wild mode when near-owner status is not maintained for a period of time. Heuristics can be applied using sensor data to infer movement or activity context to additionally determine whether to cause a device to enter discoverable wild mode. When in the discoverable wild mode, accessory devices will begin to advertise a new payload containing a stable identifier. Upon arrival at a next location (e.g., a home, another store, etc.) an unwanted tracking notification may be triggered by the non-owner device due to accumulation of advertisements received from the accessory device in the wild mode (e.g., sending advertisements with the stable identifier) in the beacon scan buffer of the non-owner device which triggers the unwanted tracking notification. In this example, the resulting unwanted tracking notification is a false positive unwanted tracking notification because the accessory device is still near the owner device.

In some embodiments, a timer reset packet is sent by the owner device to the accessory device to inform the accessory device when to send advertisements to the owner device and reduce the impact to the owner device in maintaining near-owner mode.

In some embodiments, the locator services may be locating devices may be part of a device group is a set of accessory devices (e.g., a pair of earbuds, such as Apple AirPods®) that can each be separately, independently verified, and paired to another device. The association of the accessory devices in the device group may allow the accessory devices to have access to information to facilitate pairing of other accessory devices within the device group and to find accessories within the device group.

In various embodiments, description is made with reference to figures. In various embodiments, description is made with reference to figures. However, certain embodiments may be practiced without one or more of these specific details, or in combination with other known methods and configurations. In the following description, numerous specific details are set forth, such as specific configurations, dimensions and processes, etc., in order to provide a thorough understanding of the embodiments. In other instances, well-known semiconductor processes and manufacturing techniques have not been described in particular detail in order to not unnecessarily obscure the embodiments. Reference throughout this specification to "one embodiment" means that a particular feature, structure, configuration, or characteristic described in connection with the embodiment is included in at least one embodiment. Thus, the appearances of the phrase "in one embodiment" in various places throughout this specification are not necessarily referring to the same embodiment. Furthermore, the particular features, structures, configurations, or characteristics may be combined in any suitable manner in one or more embodiments.

In the discussion that follows, a computing device that includes a touch-sensitive display is described. It should be understood, however, that the computing device may include one or more other physical user-interface devices. The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent.

Some processes are described below in terms of some sequential operations. However, it should be appreciated that some of the operations described may be performed in a different order. Moreover, some operations may be performed in parallel rather than sequentially.

FIG. 1 is a block diagram of a network operating environment 100 for mobile devices, according to an embodiment. The network operating environment 100 includes multiple mobile devices, such as accessory devices with 101A and 101B (collectively 101) as well as mobile device 102. In some embodiments, the devices may be part of a device group is a set of accessory devices (e.g., a pair of earbuds, such as Apple AirPods®) that can each be separately, independently verified, and paired to another device. For example, mobile devices 101A and 101B may be accessory devices that may be paired as a device group 105. The association of the accessory devices in the device group may allow the accessory devices to have access to information to facilitate pairing of other accessory devices within the device group and to find accessories within the device group. In other embodiments, the accessory device 101 is a single accessory device and not part of a device group 105.

Optionally, the device group with accessory devices 101 may be stored in a mobile device with a wired connection, such as a case 103 to hold the accessory devices 101. The case 103 may also be an accessory device that may be paired with mobile device 102 in some embodiments. By way of example, accessory devices 101 may be devices such as Apple AirPods®, EarPods®, and/or PowerBeats®. In some embodiments, accessory devices 101 may not be able to communicate over a wide area network.

In other embodiments, the mobile devices 101 and 102 can each be any electronic device capable of communicating with a wireless network and a wireless accessory device. Some example mobile devices 101 and 102 include but are not limited to the following: a smartphone, a tablet computer, a notebook computer, a wearable computer (e.g., smartwatch or other wearable computing accessory), a mobile media player, a personal digital assistant, AirPods®, EarPods®, PowerBeats®, locator tags, headphones, head mounted display, health equipment, speakers, and other similar devices. Each of mobile devices 101 and mobile device 102 optionally can include a user interface, such as user interface 104 of mobile device 102. In other embodiments, mobile device 101, as an accessory device, may not have a user interface. Mobile devices 101 and 102 may be a third-party device that utilizes an application programming interface to access device locator services. The third-party device may be provided by a different device manufacturer or be part of a different ecosystem (e.g., operating system) from mobile device 101 and 102. Mobile devices 101 and 102 can communicate over one or more wired and/or wireless networks 110 to perform data communication. For example, a wireless network 112 (e.g., cellular network, Wi-Fi network) can communicate with a wide area network 114, such as the Internet, by use of a gateway 116. Likewise, an access device 118, such as a mobile hotspot wireless access device, can provide communication access to the wide area network 114. The gateway 116 and access device 118 can then communicate with the wide area network 114 over a combination of wired and/or wireless networks.

In some implementations, both voice and data communications can be established over the wireless network 112 and/or the access device 118. For example, mobile device 102 can place and receive phone calls (e.g., using VoIP protocols), send and receive e-mail messages (e.g., using POP3 protocol), and retrieve electronic documents and/or streams, such as web pages, photographs, and videos, over the wireless network 112, gateway 116, and wide area network 114 (e.g., using TCP/IP or UDP protocols). In some implementations, mobile device 102 can place and receive phone calls, send and receive e-mail messages, and retrieve electronic documents over the access device 118 and the wide area network 114. In some implementations, mobile device 101 and/or mobile device 102 can be physically connected to the access device 118 using one or more cables, for example, where the access device 118 is a personal computer. In this configuration, mobile device 101 or mobile device 102 can be referred to as a "tethered" device. In one embodiment, mobile device 101 can communicate with mobile device 102 via a wireless peer-to-peer connection 120. The wireless peer-to-peer connection 120 can be used to synchronize data between the devices.

Mobile device 101 or mobile device 102 can communicate with one or more services, such as a telephony service 130, a messaging service 140, a media service 150, a storage service 160, and a device locator service 170 over the one or more wired and/or wireless networks 110. For example, the telephony service 130 can enable telephonic communication between mobile devices or between a mobile device and a wired telephonic device. The telephony service 130 can route voice over IP (VoIP) calls over the wide area network 114 or can access a cellular voice network (e.g., wireless network 112). The messaging service 140 can, for example, provide e-mail and/or other messaging services. The media service 150 can, for example, provide access to media files, such as song files, audio books, movie files, video clips, and other media data. The storage service 160 can provide network storage capabilities to mobile device 101 and mobile device 102 to store documents and media files. The device locator service 170 can enable a user to locate a lost or misplaced device that was, at least at some point, connected to the one or more wired and/or wireless networks 110. Other services can also be provided, including a software update service to update operating system software or client software on the mobile devices. In one embodiment, the messaging service 140, media service 150, storage service 160, and device locator service 170 can each be associated with a cloud service provider, where the various services are facilitated via a cloud services account associated with the mobile devices 101 and 102.

In some embodiments, accessory devices 101A, accessory device 101B, mobile device 102, case 103, and/or device group 105 may be registered with a certificate authority 106. In some embodiments, the certificate authority 106 is an entity that issues digital certificates, and the service may be implemented using a set of servers managed by a device manufacturer, service provider, or a registration service. The certificate provided by the certificate authority 106 may attest to the validity of received verifiable information about the device, such as a particular manufacturer for the device, a serial number, an identifier for a device group or other identifier, an indicator that device is part of a device group 105, and/or any other verifiable information. In some embodiments, a device manufacturer may establish the device group 105 by grouping serial numbers of accessory devices in the device group 105. In further embodiments, the certificate can be encrypted by the device 101, 102, or 103 prior to being sent to a third party and may be decrypted at an attestation service (e.g., certificate authority or another attestation service) when the third-party requests verification of information provided by accessory device 101, mobile device 102, case 103 and/or devices within device group 105. In some embodiments, a secure token may be provided in requests to pair by an accessory device 101. Additional examples of paired devices using location services may be found in U.S. patent application Ser. No. 17/219,595 filed Mar. 21, 2021 entitled "Secure Pairing and Pairing Lock for Accessory Devices," which is incorporated by reference herein in its entirety.

Mobile device 101 and 102 may have applications, services, and functionality locally accessible on the devices including location services 180. Mobile devices 102 may have a device locator application (e.g., a "Find my" application) 190 to utilize device locator services 170 and location services 180 to locate accessory devices 101. Locally accessible data may be stored on known locations 182 and safe or trusted locations 184. In some instances, machine learning algorithms 186 may be used to identify known locations 182, and/or safe and trusted locations 184. Although cluster analysis is provided as an example of machine learning algorithms that may be used, those with skill in the art will recognize that other algorithms may be used to identify potential known or trusted locations. By way of example, cluster data analysis may be used to identify and classify and provide semantic labels for locations, such as locations frequented by a user. Safe or trusted locations 184 may be designated explicitly or confirmed as such by a user of the device 102A-B after data analysis. In other instances, the known locations 182 or the trusted locations 184 may be classified offline and provided by device locator service 170 or a third-party (e.g., a database with map information).

On-device heuristics and/or machine learning models may be used to infer relationships between a user and locations based on analysis of the locally stored data on frequented locations including frequently visited locations by the user, known locations, and/or any other locations. For example, a frequently visited location such as a home, a vehicle, a workplace, any location frequented by a user with mobile device (e.g., accessory devices, 101 and mobile device 102) and/or any other location designated as a trusted location 184 by the user. Known locations 182 may be business locations, public spaces, parks, museums, and/or any other location that may be frequented by a user. Boundary information for the respective stored locations may be stored along with classification type for the location and any semantic label assigned to the location. Stored information may include a defined set of boundaries or a radius distance around a point location to allow for creation of a geofence for the location. The geofence is a virtual perimeter for a real-world geographic area. Global positioning system (GPS) may be used to create a virtual fence around a location and track the physical location of the mobile devices 101 and 102 within the geofence boundary as well as entry and exit of the bounded area.

Machine learning algorithms 186 may include on-device heuristics, machine learning algorithms, or a combination thereof to analyze and assign a label regarding movement or travel of a device to be designated as being "in transit" state or "settled" state in a particular location for a time period. Analysis may be performed using a variety of signals from data sources available to the mobile device 102, including, but not limited to, the following: sensor data, positioning data, calendar data, transit card usage data, application data, historical data on patterns/routines of travel, and/or any other data accessible to the mobile device 102. [[May be overkill: In some embodiments, a mobile device 102 may be classified with a "settled" semantic label after remaining within the geographic boundaries that define a location (e.g., the trusted location 184) for a defined time period. Positioning data for the mobile device 102 may remain within the boundaries of a geofence for a particular location for a duration of time (e.g., 5 minutes). Sensor data, such as accelerometer data, may indicate that the mobile device 102 is at rest to support an inference of being settled. Application data may support the inference that the mobile device 102 is settled, such as the mobile device being located at a calendar appointment location. Application data indicating a type of application in use may also provide an inference of the device being settled, such as using a media application. Historical data for the user on routines or patterns in travel may be used to determine whether the mobile device 102 is settled, such as a bedtime routine at a home or hotel location. Mobile device 102 may be classified as with an "in transit" label based on prior behavior, patterns, or routines for the user and analyzed on mobile device 102. For example, the user may have routine of going to work around the same time every day and an "in transit" state may be assigned if the data on the device supports that the pattern is being repeated. A speed at which the mobile device is moving or entering and exiting known geographic areas (e.g., using geofences) may allow for the inferring that the mobile device 102 is in transit. If the mobile device 102 is detected as accelerating in known areas of transit (e.g., on roads, highways, train routes, etc.), then the mobile device 102 may be given the status of "in transit." Similarly, if transit applications/cards are used/in use, then the mobile device 102 may be designated as "in transit".

Figure 2:
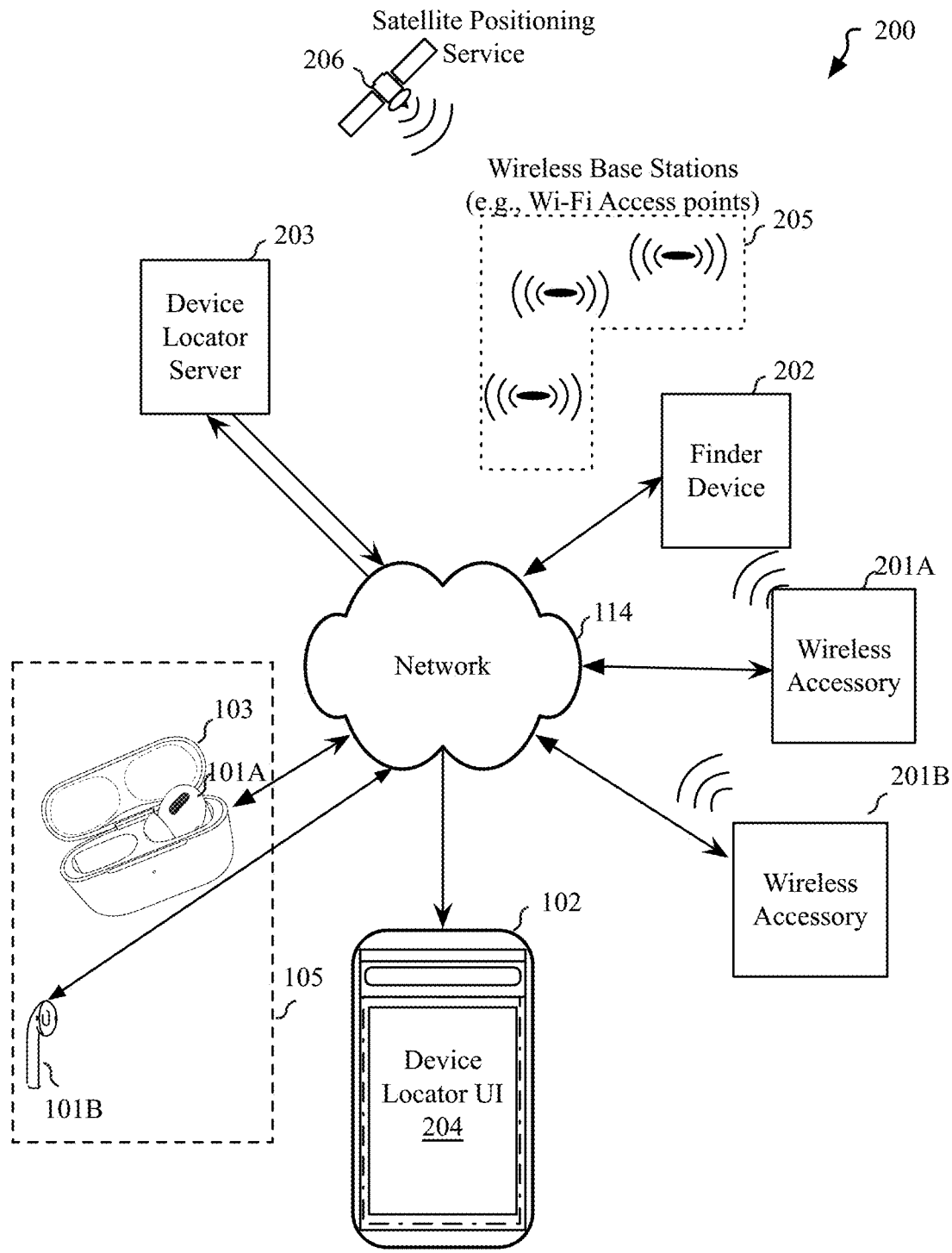
FIG. 2 illustrates a system to locate wireless accessories, according to an embodiment.

FIG. 2 illustrates a system 200 to locate wireless accessories 201A and/or 201B, according to an embodiment. In one embodiment, the wireless accessories 201A and 201B (collectively 201) are another embodiment of accessory devices 101A and 101B (and optionally case 103) that may be paired as part of a device group 105 and may be used interchangeably throughout the description. Each accessory device includes one or more wireless transceivers and can communicate, either directly or indirectly (e.g., through another device or computer) with a companion device (e.g., mobile device 102) over a wireless network or peer-to-peer communication link. Accessory devices 101A is shown in case 103 and may provide the beacon signal for the case 103 and any accessories in the case 103. Accessory device 101B is separated from the case 103 and independently and separately able to be found by providing the beacon signal. Some examples of additional wireless accessory devices 101 include but are not limited to wireless earbuds, EarPods®, AirPods®, input devices, a charging device, a case for accessories, headphones, headsets, fitness equipment, health equipment, display devices, external hard drives, other wearable devices (e.g., smartwatches, fitness bands, optical head-mounted displays), adapters, speakers, and/or other devices. Paired groups of accessories may be the same type of device (e.g., speakers, AirPods®, fitness weights, etc.) or different types of devices (e.g., smartphone and credit card reader, etc.). The wireless accessories 201 can also include other wireless devices such as input devices including, but not limited to credit card reading devices, stylus devices, mouse, keyboard, game controllers or remote controls. The wireless accessories 201, in one embodiment, also includes smartphones, tablet computers, laptop computers, smart speaker devices, televisions, or television set top boxes that at least temporarily are unable to access a wide area network, such as the Internet (e.g., wide area network 114 as in FIG. 1). The wireless accessories 201 can also be any other wireless device, including beacons or locator tags that can be attached to other devices to enable the tracking or locating of those devices. In one embodiment, the wireless accessories 201 can be from a device group of accessory devices that are paired with the mobile device 102 using a wireless technology standard, such as but not limited to Bluetooth®. The wireless accessories 201 can also communicate with the mobile device 102 over wireless technologies including the implementation of any wireless standards and protocols, such as Wi-Fi direct, Zigbee, or AirPlay. While the companion device to which the wireless accessories 201 are paired is generally referred to as a mobile device 102, companion devices are not limited to mobile devices. Companion devices, in some embodiments, can also include laptop or desktop devices and can additionally include some wearable accessories, such as but not limited to a smart watch device or a wearable display.

In one embodiment, the wireless accessories 201 can periodically transmit a wireless beacon signal. The wireless accessories 201 can transmit the beacon signal using one of a variety of wireless technologies described herein (e.g., Bluetooth®, Wi-Fi, etc.) and in one embodiment can also beacon using an ultra-wide band (UWB) radio technology. The beacon signal can be transmitted using a single wireless technology, one of multiple selectable wireless technologies, or multiple simultaneous wireless technologies. The beacon signal can transmit a beacon identifier that includes information to specifically identify the individual wireless accessory 201A or 201B and/or a device group 105. In one embodiment, the beacon identifier is a public encryption key associated with the device.

The beacon signal can also convey information about the wireless accessory 201, such device status information and/or verifiable information. Device status information in the beacon signal may include, but is not limited to the following: a beacon type, a device classification, a battery level, any pre-defined device status, a device state, a lost status, an alarm status, a separated from owner status, a near-owner status, a proximate to one or more accessory devices 101 in a device group status, a wired or wireless connection status, a physically connected to one or more accessory devices 101 in a device group status, a pairing status indicating whether accessory device is paired or not paired, a pending pairing status, a battery life state, a charging status, and/or any other status information. The lost or "separated from owner" status can indicate that the wireless accessory 201 has determined itself to be lost or has been placed into a lost state by the owner of the device. The alarm status can indicate that the wireless accessory 201 was placed in a state that the device should trigger an alarm if moved from a current location. The near-owner status can indicate that the wireless accessory 201 has detected the nearby presence of the mobile device 102 associated with the owner of the accessory.

In some embodiments, verifiable information may include any information that may be needed to establish trust or authority that a pairing process and/or finding process may proceed with the device presenting the verifiable information. By way of example, verifiable information may include information established by a device manufacturer, such as a serial number or set of serial numbers in a device group 105. In some embodiments, the verifiable information may include status or state information for the device. The verifiable information may include, but is not limited to, the following: a device type, a member of device group, a serial number, a device group, serial numbers of other devices within a device group, state or status information, a software version, and/or any other verifiable information. Verifiable information may be sent to the certificate authority 106 or other attestations service to verify received information presented by the device to another device. Verifiable information may be encrypted and/or sent with a token to allow for further verification of the device.

In some embodiments, the beacon signal can be detected by a finder device 202, which is locally proximate to the wireless accessory 201A or 201B in order to use crowdsourcing to locate a lost wireless accessory 201. The finder device 202 can be a similar device as the mobile device 102 and can receive and transmitting data over a wide area network 114 and receiving and transmitting using similar wireless technologies as the wireless accessory 201 (e.g., Bluetooth®, etc.). Particularly, the finder device 202 can receive data using the wireless protocol over which the beacon signal is transmitted. The finder device 202 can determine a location using one or more location and/or positioning services including, but not limited to a satellite positioning service 206 or a terrestrial positioning system using RF signals received from wireless base stations 205 such as Wi-Fi access points or cell tower transmitters of a cellular telephone network. In an embodiment, the finder device 202 periodically stores its location as determined based on the one or more location and/or positioning services. The stored location can be associated with a timestamp for which the location was determined. When the finder device 202 receives a beacon signal from the wireless accessory 201, the finder device 202 can transmit a location for the finder device 202 over the wide area network 114 to a device locator server 203. The timestamp for a determined location for the finder device 202 can be correlated with a timestamp for which a beacon signal was received to associate a geographic location with a received beacon signal.

Where the wireless accessory 201 provides a public key within the beacon signal, the finder device 202 can encrypt the determined location data and transmit the encrypted location data to the device locator server 203 over the wide area network 114. In one embodiment, additional data can either be encrypted and transmitted along with the location data or transmitted unencrypted to the device locator server 203. For example, a received signal strength indicator (RSSI) for the beacon signal can be transmitted along with the location data. The RSSI data can then be used to determine the distance of the wireless accessory 201 from the finder device 202 and assist in triangulation on the owner device. Where the RSSI data is transmitted in an unencrypted state, in one embodiment the server can use RSSI information to reduce noise by discarding very weak signals if other, stronger signals are present. In one embodiment, UWB ranging data can also be provided, where such data is available.

In one embodiment, the finder device 202 can behave differently upon receiving a beacon signal from a wireless accessory 201 depending upon a device status conveyed by the wireless accessory 201. For standard beacon signals, the finder device 202 can place encrypted location data into a queue and transmit the location data to the device locator server 203 during a periodic transmission window. However, if the wireless accessory 201 is indicating an alarm state, the finder device 202 can transmit the location data to the device locator server 203 immediately. Additionally, the finder device 202 may not transmit the location data to the device locator server 203 if the beacon signal of the wireless accessory 201 indicates that the accessory is near the owner of the accessory. Alternatively, the finder device 202 may delay transmission of encrypted location data.

If the owner of the wireless accessory 201 wishes to locate the wireless accessory, the owner can access a device locator user interface 204 on the mobile device 102. The device locator user interface 204 can be associated with a device locator application that is used to locate electronic devices and accessories that are registered with an online account of the user, such as a cloud services account or another type of online account. The device owner, using the device locator UI 204, can query the device locator server 203 for location data that may have been transmitted to the device locator server by a finder device 202 of the wireless accessory 201. In one embodiment, the mobile device 102 can transmit the public encryption key associated with the wireless accessory 201 to the device locator server 203. The device locator server 203 can then return any stored location data that corresponds with the public encryption key. The location data returned to the mobile device 102 can be encrypted data that is encrypted by the finder device 202 using the public encryption key. The mobile device 102 can use an associated private key to decrypt the encrypted location data. The decrypted location data can then be processed by the mobile device 102 to determine a most probable location for the wireless accessory 201. In various embodiments, the most probable location for the wireless accessory 201 can be determined by triangulation from multiple received locations and using other data, such as a beacon signal RSSI associated with each location and timestamp or UWB ranging data included within the location data.

Figure 3:
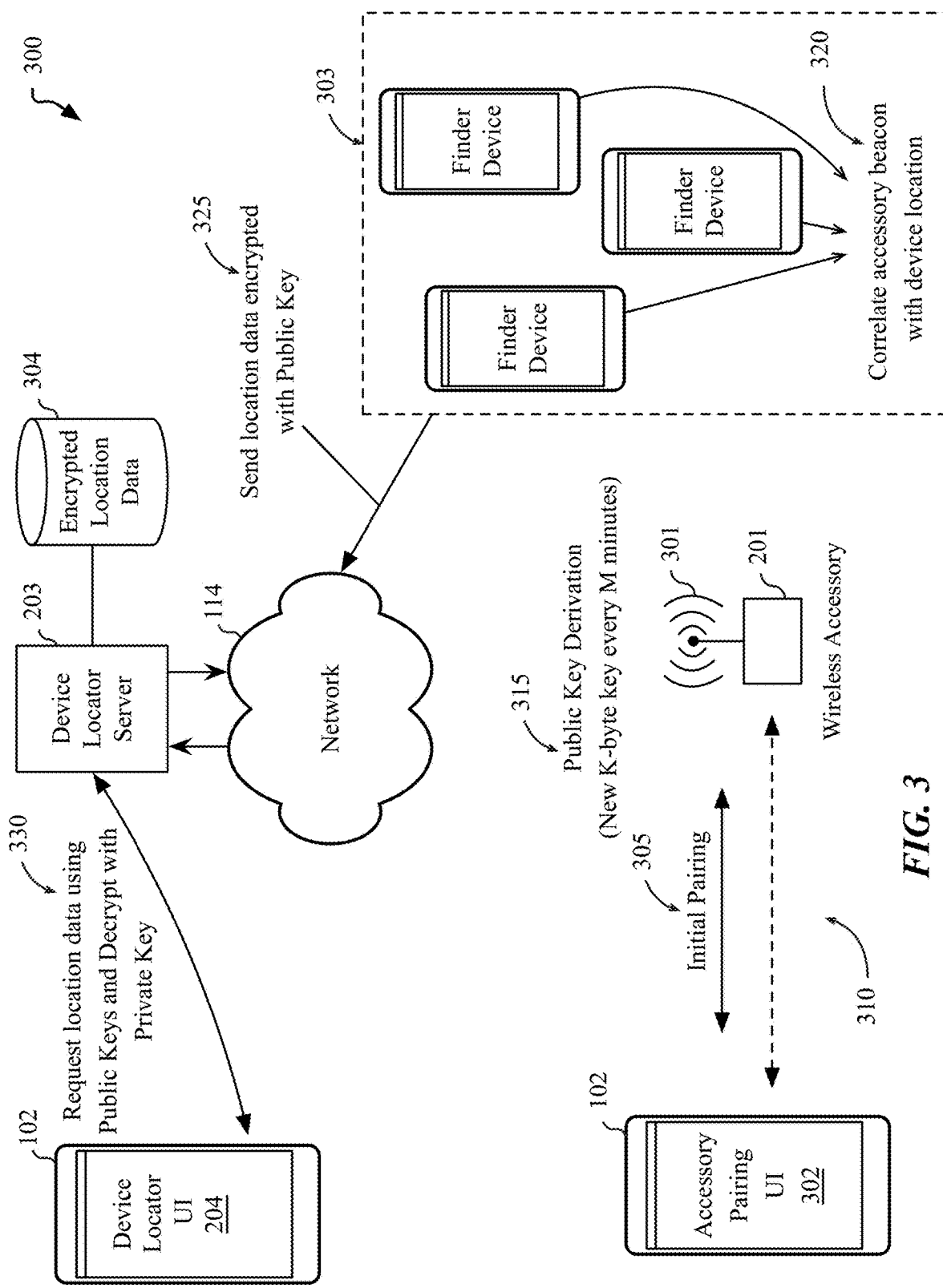
FIG. 3 illustrates a system for pairing and locating a wireless accessory, according to embodiments described herein.

FIG. 3 illustrates a system 300 for pairing and locating a wireless accessory, according to embodiments described herein. In one embodiment a mobile device 102 of a user of the wireless accessory 201 (e.g., example of device 101A, 101B, or 103) can present an accessory pairing UI 302 by which the user can pair the mobile device 102 with the wireless accessory 201. During an initial pairing (305) between the mobile device 102 and the wireless accessory 201, a public key exchange (310) can be performed between the mobile device and the wireless accessory 201. In one embodiment, during the public key exchange (310) the mobile device 102 and the wireless accessory 201 exchange public keys of public key pairs generated by the device and the accessory 201. In one embodiment the public key exchange (310) is a one-way transfer, in which the mobile device 102 transmits a public key of a public/private key pair to the wireless accessory 201. Alternatively, or additionally, the public key exchange (310) may be a Diffie-Hellman key exchange in which the device and the accessory establish a shared secret between two parties. In one embodiment, the public key exchange (310) additionally uses elliptic curve cryptography to establish the shared secret. For example, Elliptic-curve Diffie-Hellman (ECDH) can be used to enable the establishment of a public key pair and one or more shared secrets. In one embodiment, the one or more shared secrets include an anti-tracking secret, which can the wireless accessory 201 to periodically derive additional public keys.

After the wireless accessory 201 has been paired with the mobile device 102, the wireless accessory 201 can periodically broadcast a beacon signal 301 that includes device status information and a beacon identifier. In one embodiment the beacon identifier is a public key derived from a shared secret that is established during the public key exchange (310). Additionally, the wireless accessory 201 can periodically perform a public key derivation (315) to generate a new public key and begin broadcasting the new public key as the beacon identifier. The public key is a K-byte key, with a new K-byte key generated every M minutes. The value K and M can vary between embodiments. In one embodiment, a K value of 28 bytes is used. In one embodiment, a K value of 27 bytes is used. The value K can be determined at least in part based on the beacon length associated with the wireless protocol used to transmit the beacon signal 301. In one embodiment, the beacon signal can transmit a variant of beacon advertisement packet associated with a low-energy radio protocol, such as Bluetooth® Low Energy.

The value M, in one embodiment, is 15 minutes, such that a new K-byte key is generated every 15 minutes. The public key can be derived deterministically based on a timestamp and an anti-tracking secret generated during the public key exchange 310. The public key derivation (315) process enables the wireless accessory 201 to use different keys over time, preventing the long-term association with a specific key with a specific device. The key can be derived based on an anti-tracking secret known only to the mobile device 102 and the wireless accessory 201, allowing the mobile device 102, and only the mobile device, to determine which public key will be broadcast by the wireless accessory 201 at any given timestamp. The anti-tracking secret can be generated along with an ECDH public key and transferred to the wireless accessory 201. The anti-tracking secret can then be used to enable the wireless accessory 201 to generate a sequence of public keys $P_i$. In one embodiment, the sequence of public keys $P_i = \lambda_i \cdot P$, which defines a group operation between a scalar or exponent value $\lambda_i$ and group elements, such as, for example, Elliptic Curve points P. The scalar or exponent value λ=KDF(AT, i), where KDF is a key derivation function, AT is the anti-tracking secret, and i is a counter or timestamp.

In one embodiment, backtracking resistance can be enabled to protect the anti-tracking secret in the event the wireless accessory 201 is compromised. When backtracking resistance is enabled, the anti-tracking secret is transferred to the wireless accessory 201 but is not retained by the wireless accessory. Instead, the accessory computes a value $\lambda_{i+1}$=H ($\lambda_i$||time), with $\lambda_0$=AT and H being a cryptographic hash function. The wireless accessory 201 then stores $\lambda_i$ for a given time period i. If the wireless accessory 201 is compromised, only $\lambda_i$ for current and future values of i is exposed, without exposing the anti-tracking secret AT. In one embodiment, backtracking resistance is performed by periodically writing $\lambda_i$ to non-volatile memory of the wireless accessory 201.

In one embodiment the wireless accessory 201 can transmit the beacon signal 301 every two seconds, although other beacon rates can be used, and the beacon rate can vary under certain circumstances. For example, the wireless accessory 201 can decrease a beacon rate when in a near-owner state. Beacon rate can also vary based on accelerometer triggered events. For example, the wireless accessory 201 can increase the beacon rate when in an alarm state, which can be triggered by the accelerometer on the wireless accessory 201.

The wireless accessory 201 can enter the near-owner state if, after transmitting the beacon signal 301, the wireless accessory 201 receives a reply from the mobile device 102 associated with the user of the accessory, which indicates that the mobile device 102 is within range of the wireless accessory. Additionally, while the wireless accessory is in the near-owner state, the amount of data transmitted by the beacon signal 301 may be reduced. In one embodiment, the rate at which new public keys are generated can also be reduced while the wireless accessory is in the near-owner state.

The wireless accessory 201 can enter an alarm state upon receiving a message from the mobile device 102 that indicates that the wireless accessory 201 should enter the alarm state. When in the alarm state, the wireless accessory can initially enter an armed state in which the wireless accessory 201 can reduce or cease the transmission of locator beacon signals, although other types of wireless signaling can persist. The wireless accessory 201 can remain in the armed state until the state is deactivated by the mobile device 102 or alarm is triggered. The alarm can be triggered, in one embodiment, upon detection of movement, for example, via an accelerometer within the wireless accessory 201. The alarm can also be triggered, in one embodiment, upon detection that the wireless accessory has moved out of range of the mobile device and is no longer in the near-owner state. When the alarm is triggered, the rate at which the beacon signal 301 can be increased, to increase the speed by which the wireless accessory 201 can be located.

The beacon signal 301 transmitted by the wireless accessory 201 can be detected by a set of finder devices 303 (finder devices may be finder device 202) and/or the mobile device 102, which are other electronic devices that can receive the beacon signal transmitted by the wireless accessory and are transmit location and other data associated with the beacon signal 301 to the device locator server 203 via the wide area network 114. In one embodiment the set of finder devices 303 include variants of the mobile device 102 or can be other types of electronic devices. For example, the set of finder devices 303 can perform operations (320) to correlate the beacon signal 301 received from the wireless accessory 201 with a device location associated with the finder device 303. As described with respect to FIG. 2, the device location can be determined via a satellite positioning service or a terrestrial positioning system that uses RF signals received from wireless base stations (e.g., Wi-Fi access points or cell tower transmitters). In one embodiment the set of finder devices 303 can also include stationary devices such as smart speaker devices, televisions, or television set top boxes that can receive the beacon signal 301.

The set of finder devices 303 can encrypt the location data with the beacon identifier (e.g., public key) received within the beacon signal 301 and send the location data (325) to the device locator server 203. The data sent by the set of finder devices 303 is send anonymously and no identifying information for the finder devices is stored with the data sent by the finder devices.

The device locator server 203 can store encrypted location data in a data store 304, which in one embodiment can be a distributed database having multiple nodes. Hashes of the beacon identifier/public key of an accessory can be sent along with encrypted location data. The encrypted location data can be stored to a database node based on a hash of the beacon identifier. The encrypted location data can be indexed by the device locator server 203 using the hash of the beacon identifier. Sending the hash of the beacon identifier instead of the full beacon identifier prevents the storage of the full beacon identifier to the server. Other information can also be sent and stored with the location data, either in an encrypted or unencrypted state. The other information can include timestamps for when the beacon signal 301 was received, RSSI information for the received beacon, and/or ranging information determined, for example, via UWB ranging.

When the user or owner of the wireless accessory 201 wishes to locate the accessory, the user or owner can access the device locator UI 204 on the mobile device 102. The device locator UI 204 can be associated with a locator application 190 or feature of the mobile device 102. The device locator UI 204 may also have a web-based interface that can be accessed from the mobile device 102 or another type of electronic device, such as a laptop or desktop device. The mobile device 102, upon loading the device locator UI 204, can send a request (330) for location data to the device locator server 203. The request 330 can include a set of public keys or public key hashes, which can serve as beacon identifiers for the beacon data. The mobile device 102 can generate the set of public keys based on the secret information held by the mobile device 102 and the wireless accessory 201 and the timestamps over which the mobile device 102 wishes to receive location data. In one embodiment the set of public keys is the sequence of public keys $P_i$ that are generated based on the anti-tracking secret. The sequence of public keys $P_i$ corresponds to a matching sequence of private keys $d_i$. The mobile device 102 can generate the sequence of public keys, as well as the corresponding sequence of public keys $d_i$, where i is a counter or timestamp. In one embodiment, the mobile device 102 can generate and send the previous 24 hours of public keys (or hashes of the 24 hours of public keys) within the request 330. If no data is found for 24 hours of public keys, the mobile device 102 can send generate keys for an earlier period, back to a pre-determined location data retention limit.

In one embodiment the encrypted location data is stored and indexed based on a hash of the public key instead of the public key to prevent the provider of the location service data from storing data that can be used to tie the encrypted location data to a specific device, and thus a specific user or user account. The finder device can send the hash of the public key that is broadcast within the beacon signal 301 associated with an observation location. The owner of the device can query the device locator server 203 using a hash of the public key that is determined for a query period.

In some embodiments, if a location query is to be performed via the web-based interface from an electronic device, such as a laptop or desktop device, keys to enable the decryption of the location data may be required to be sent to the electronic device. In one embodiment, decryption keys for the location data may be sent to the server that provides the web-based interface to enable the server to decrypt location data, at least while the location data is being viewed through the web-based interface. Before location data is displayed via the web-based interface, a notice may be presented to inform the user that location decryption keys are being temporarily shared with the web-based interface server to enable location data to be decrypted and presented. In one embodiment, the sharing of the location decryption keys can be performed via an automatic and temporarily delegation of location query rights with a proxy account associated with the web-based interface.

In one embodiment, the wireless accessory 201 can be placed in a light lost mode. In the light lost mode, a set of future public keys can be generated for the wireless accessory and transmitted to the device locator server 203. The device locator server 203 can then notify the mobile device 102 if any location data is received that correspond with a key in the set of future public keys. In one embodiment, a finder device that sends a location for a wireless accessory that is in the light lost mode can be directed by the device locator server 203 to relay a message to the wireless accessory 201 that notifies the wireless accessory that it is in the light lost mode. A similar mechanism can be used to relay a message to the wireless accessory 201 that places the accessory in an explicit lost mode. The explicit lost mode can be enabled by the user via the device locator UI 204. In the explicit lost mode, the wireless accessory 201 cannot be paired with another device unless unlocked by the owner. Additional examples of paired devices using location services may be found in U.S. patent application Ser. No. 16/543,227 filed Aug. 16, 2019 entitled "A System and Method for Locating Wireless Accessories," which is incorporated by reference herein in its entirety.

Figure 4:
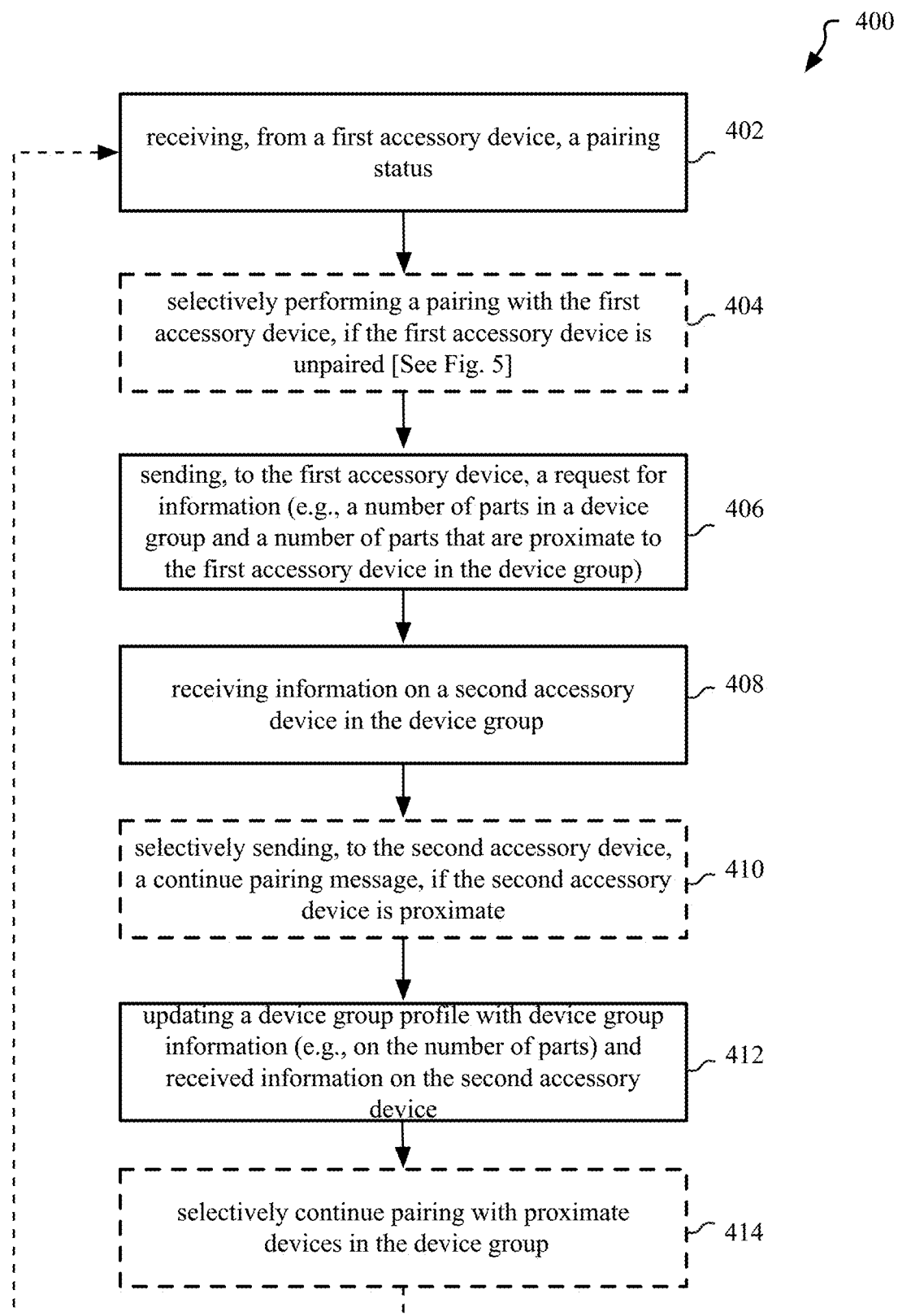
FIG. 4 is a flow diagram illustrating a method for pairing a group of accessory devices, according to embodiments herein.

FIG. 4 is a flow diagram 400 illustrating a method for pairing a group of accessory devices, according to embodiments herein. Mobile device 102 may receive, from a first accessory device 101A, a pairing status (402) indicating whether the first accessory device 101A is paired or not. A pairing between the devices exists when the mobile device 102 has access to at least one key associated with the first accessory device for a user account (e.g., a cloud-based account) for the mobile device 102. Pairing status, status information, and/or verifiable information may be provided in the beacon signal indicating whether the first accessory device 101A is currently paired, pending pairing, or unpaired.

Figure 5:
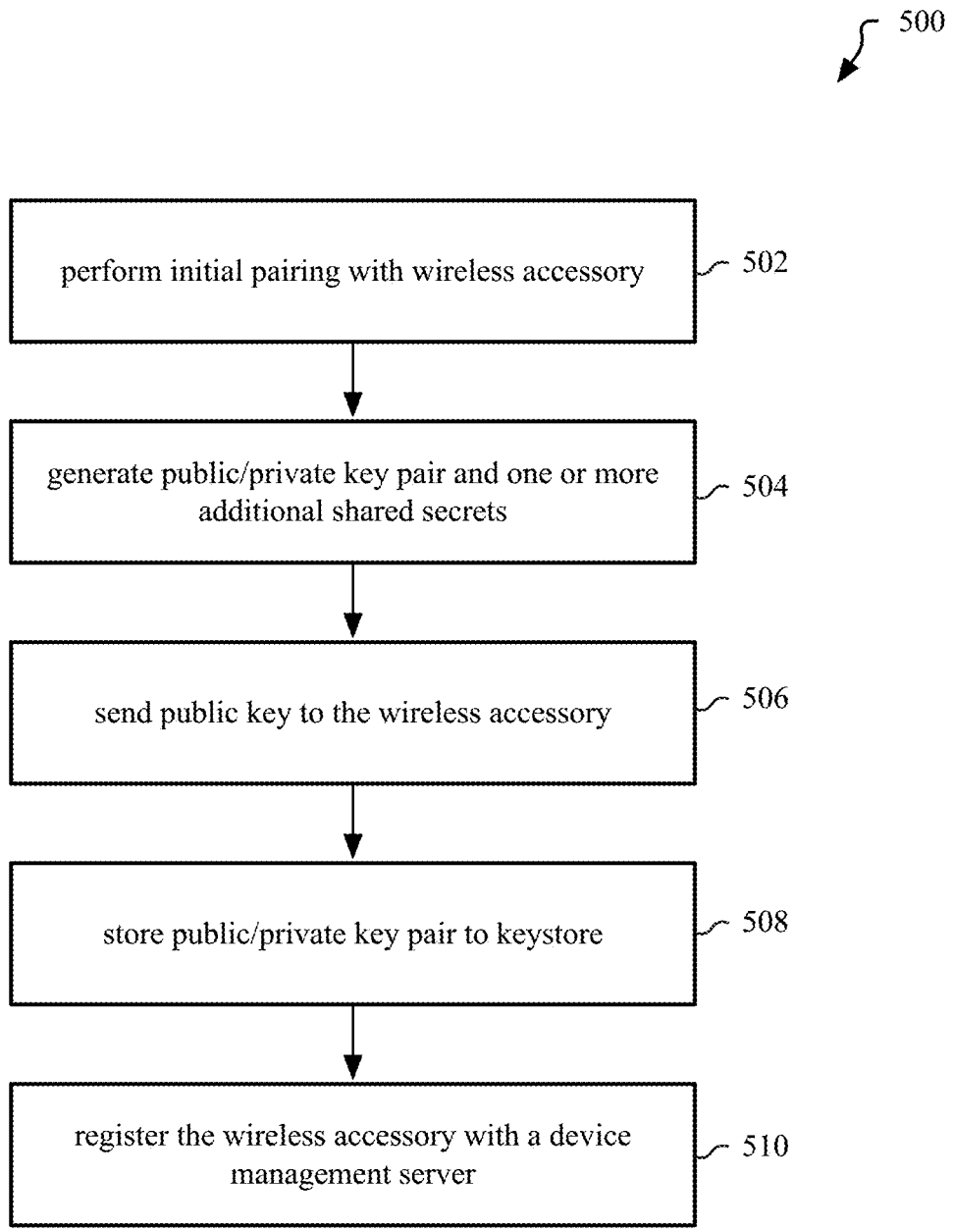
FIG. 5 is a flow diagram illustrating methods for use with the device locator systems described herein.

If the first accessory device 101A is not currently paired the mobile device 102 according to the pairing status, then a pairing process may selectively begin (404), as shown in FIG. 5. In some embodiments, the pairing status may indicate that pairing is pending for the first accessory device 101A and a device group profile for the device group 105 may be retrieved from a device locator server 203 database. The device group profile may be part of a data model for device groups with location data that is crowd sourced with device locator service 170. Device group profiles may be stored on mobile devices 102 and synchronized between devices linked to a cloud-based account. Additionally, device group profiles may be stored in databases on mobile devices 102 and device locator server 203. A device group profile, by way of example, may record relationships between accessory devices, status information, and verifiable information received from accessory devices and/or device manufacturers. The device group profile may be updated with information received via mobile device from accessory devices 101. Device group profiles may include, but is not limited to, the following information: number of accessory devices in device group, number of paired devices, serial numbers of accessory devices in device group, pairing status of accessory devices, and any other information for providing device location services 170. As such, any status and/or verifiable information previously stored in a device group profile may be compared to status information and/or verifiable information received from devices in the device group 105 and stored in the device profile for the device group 105. The pairing process may cease, if there is a mismatch of information between information received from the first accessory device 101A and the device profile and/or if received verifiable information from the first accessory device 101A cannot be verified, in some embodiments. Each member device or accessory device 101 that is a part of the device group 105 may be a beaconing peripheral device that is separately identifiable to allow for finding and verifying all accessory devices 101 in the device group 105.

The first accessory device 101A may provide verifiable information in the beacon signal that may be verified with a certificate authority or other attestation service that the first accessory device 101A has a serial number consistent with a device from the device group 105 as expected from the device manufacturer or user defined device group. Further, the certificate authority or other attestation service may use the verifiable information to attest to the first accessory device 101A having a particular device manufacturer. Those with skill in the art will recognize that there are a variety of ways for verification of information provided by the first accessory device that may be performed prior to proceeding with the pairing process to confirm that the first accessory device may be trusted.

Alternatively, if the first accessory device 101A does not provide verifiable information, then the pairing process may not proceed. Embodiments may require that the first accessory device 101A provide verifiable information (e.g., cryptographically verifiable information, such as a certificate and/or token) for the first accessory device 101A to begin pairing, including, but not limited to, the following: a serial number, a manufacturer identifier, a software version, an indication that the accessory device is part of a device group of accessories devices, expected accessory device identifiers for other accessory devices in the device group, expected number of accessory devices in device group, and/or any other information. In an embodiment, the verifiable information may be cryptographically verifiable and certified by the certificate authority 106.

A request may be sent to the first accessory device 101A for information on accessory devices in the device group (406). For example, information requested may include an indication that the accessory device 101A is a multi-part device or part of a device group 105, a number of devices in the device group 105, and a number of devices that are proximate to the first accessory device 101A in the device group (406). Received accessory device information on the device group 105 may be stored in the device group profile and referenced for the pairing process by the mobile device 102.

Information may be received on a second accessory device 101B in the device group 105 (408). The information received from the first accessory device 101A on the second accessory device 101B may assist in further pairing of the remaining unpaired accessory devices in the device group 105. In an embodiment, if the second accessory device 101B is proximate to the first accessory device 101A, then the first accessory device 101A may send verifiable information on the second accessory device 101B. A continue pairing message may be sent to the second accessory device, if the second accessory device is proximate (410) to attempt to pair the second accessory device 101B. If the second accessory device is not proximate and/or the pairing is unsuccessful, then the verifiable information for the second accessory device may be stored in the corresponding device group profile. Second accessory device 101B information may be stored to be accessible to the mobile device 102 for later attempts to pair the second accessory device 101B in the device group profile and the pairing status for the second accessory device may be set to "pending pairing." Alternatively, if received information from the second accessory device 101B is consistent with the verifiable information from the first accessory device 101A, the pairing process may proceed in FIG. 5 to pair second accessory device 101B. For ease of description, only the pairing of two accessory devices is described, those with skill in the art will recognize that pairing may continue for any number of accessory devices when accessory devices in the device group provide verifiable information to mobile device 102.

The device group 105 information on the number of parts, received information on the second accessory device, and any other status information and/or verifiable information may be stored (412). If the device profile for the device group 105 does not exist, then the device group profile for the device group 105 may be created. The device profile may be updated to store information on the device group 105 that is received from the accessory devices 101 and/or mobile device 102. Information that may be stored in the device group profile includes, but is not limited to, the following: verifiable information received on devices in the device group 105, last received beacon signals (e.g., status, advertisements, proximity information, location data, etc.) received from any device within the device group 105 and any other information for pairing and/or using the devices in the device group 105. Optionally, the pairing may continue with other proximate devices to either first and/or second accessory device 101 (414). The next device to pair may be viewed as the first accessory device and the process may continue (402).

FIG. 5 is a flow diagrams illustrating methods for use with the device locator systems described herein. FIG. 5 illustrates a method 500 to pair a mobile device with a wireless accessory 101. Aspects of method 500 are also illustrated in FIG. 2 and FIG. 3, as described above. For example, the description of the operations below refers to the mobile device 102, wireless accessory 201 and device locator server 203.

As shown in FIG. 5, method 500 includes an operation (502) that performs an initial pairing with a wireless accessory. The initial pairing can be a Bluetooth® pairing or another type of pairing using other wireless radio technologies. During the initial pairing, the mobile device and the wireless accessory can exchange identifiers, passkeys, or other credentials that enables a wireless data exchange to be performed between a mobile or another electronic device and the wireless accessory. On one embodiment the initial paring with the wireless accessory can include the exchange of credentials associated with the wireless protocol for which the pairing is performed, allowing all data exchanged wirelessly to have at least a first layer of encryption.

The mobile device can then generate a public/private key pair and one or more additional shared secrets (504). The device can then send the public key and one or more additional shared secrets to the wireless accessory (506). A variety of key generation techniques can be used. In one embodiment, a variant of ECDH is used to generate a public key pair for encryption. In one embodiment, the one or more additional shared secrets can include an anti-tracking secret that enables the wireless accessory to derive a new public key based on an existing public key.

After generating the public/private keypair and one or more additional shared secrets, the mobile device can store public/private key pair to keystore (508). In one embodiment the keystore is a cloud-based keystore that can be synchronized with other devices associated with the same cloud services account, or family of cloud services accounts, to which the mobile device and wireless accessory are associated. The cloud-based keystore allows the wireless accessory to be located by other synchronized devices. The mobile device can then register the wireless accessory with a device management server (510). Registering the wireless accessory with the device management server can form an association between the wireless accessory and the cloud services account to which the mobile device is associated. In some embodiments, the mobile device may register the wireless accessory and the device group 105. Information stored in a device group profile for the device group 105 may also be synchronized between devices tied to a cloud services account (e.g., a user account). The device management server can be associated with other cloud-based servers that are used to facilitate cloud-based services accessible to the mobile device, such as the device locator server 203 of FIG. 2 and FIG. 3.

Figure 6:
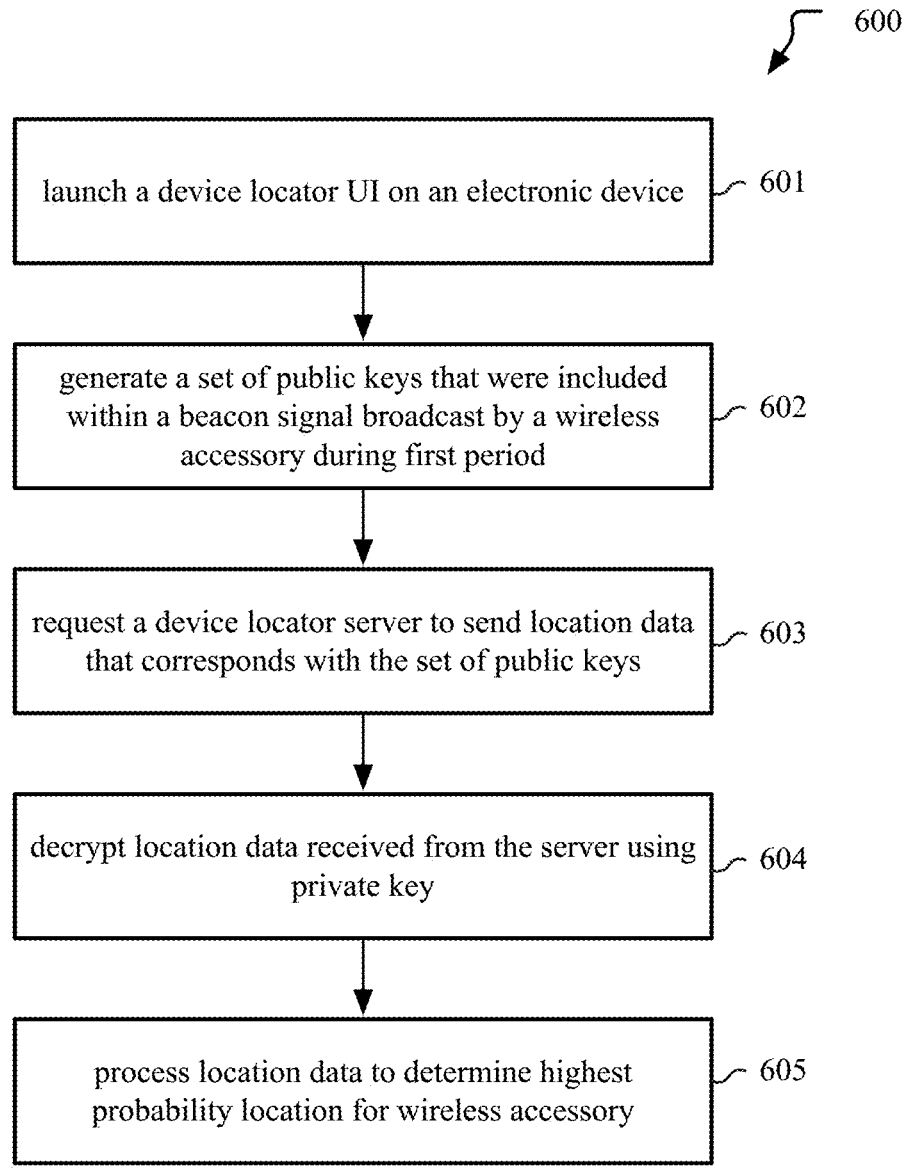
FIG. 6 illustrates a method to determine a location for a wireless accessory via a device locator server.
Figure 7:
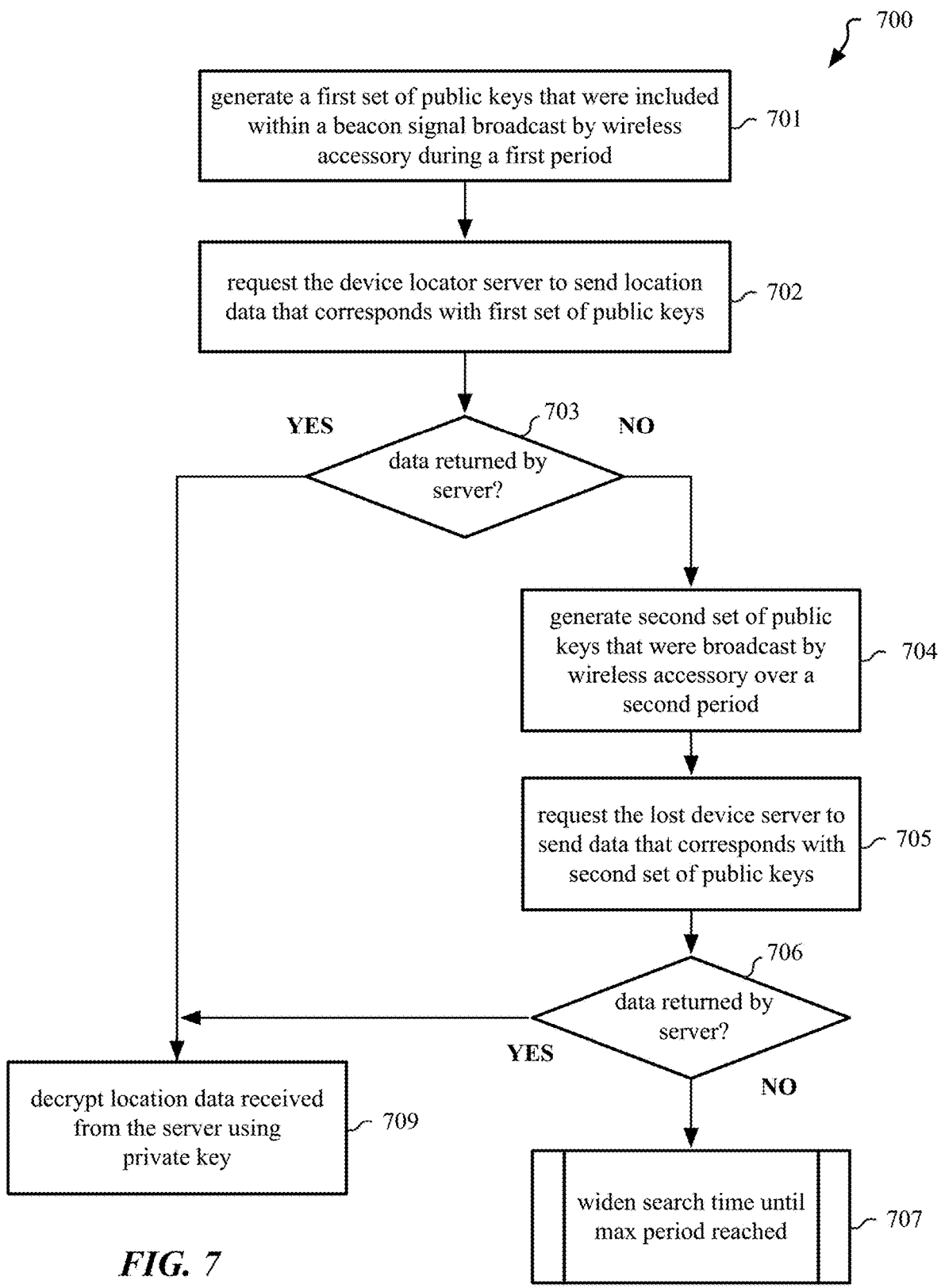
FIG. 7 illustrates an additional method to determine a location for a wireless accessory via a device locator server.

FIG. 6 illustrates a method 600 to determine a location for a wireless accessory via a device locator server 203. FIG. 7 illustrates an additional method 700 to determine a location for a wireless accessory via a device locator server 203. In an embodiment, the location data retrieved with methods illustrated in FIG. 6 and/or FIG. 7 may include data for accessory devices 101 in the device group 105. In another embodiment, the methods illustrated in FIG. 6 and/or FIG. 7 may be performed for each accessory in the device group 105. As shown in FIG. 6, method 600 includes an operation in which an electronic device launches a device locator UI (601). In response to launching the device locator UI, the electronic device, which can be a mobile device 102 as described herein, or another electronic device associated with the same cloud services account as the mobile electronic device 102, can perform an operation to generate a set of public keys that were included within a beacon signal broadcast by a wireless accessory during a first period (602). The first period can be, for example, a previous 24 hours. The electronic device is aware of the frequency in which the wireless accessory is to generate new public keys and, using a shared secret generated with the wireless accessory, can generate a set of public keys that correspond with the keys that were generated by the wireless accessory over the first period. The electronic device can then send the set of public keys within a request for the device locator server 203 to send location data that corresponds with the set of public keys (603). In one embodiment, location data sent by the server in response to the request will be encrypted using the public key transmitted as the beacon identifier of the wireless accessory. The electronic device can decrypt the encrypted location data received by the server using the private key generated during the initial pairing with the wireless accessory (604). The electronic device can then process the location data to determine the highest probability location for the wireless accessory (605).

Figure 12:
FIG. 12-17 illustrate a device locator user interface, according to an embodiment.

Processing the location data can include a variety of different operations. In one embodiment the location data includes latitude and longitude information along with a timestamp for which the location was determined. The electronic device can triangulate based on the timestamps and remove noise or outlier locations. In one embodiment the location data specifies the location of the finder device that detected the beacon. The location data can additionally include UWB ranging information and/or RSSI information for the beacon detected by the finder device. The electronic device can analyze the UWB ranging information and/or RSSI information in context with the device locations to develop a more accurate location for the wireless accessory. Data that can be transmitted by a finder device and used for location processing is shown in FIG. 12 and described below.

As shown in FIG. 7, method 7 includes operations that can be performed if the device locator server does not have location data to provide to the electronic device in response to a request. In the case of a device group, the electronic device (e.g., mobile device 102) may provide the location data on devices in the device group 105. The electronic device can generate a first set of public keys that were included within a beacon signal broadcast by wireless accessory during a first period (701). The first period can be, for example, 24 hours, although other initial search periods can be used. The electronic device can perform a subsequent operation to request the device locator server to send location data that corresponds with first set of public keys (702). If the data is returned by the server (703, "yes"), the electronic device can decrypt the location data received from the server using the private key that corresponds with the set of public keys (block 709).

If data is not returned by the server (703, "no") the electronic device can generate a second set of public keys that were included within a beacon signal broadcast by the wireless accessory during a second period (704). The second period can be the 24, 48, or another number of hours before the first period. The electronic device can then request for the device locator server to send data that corresponds with the second set of public keys (705). If, in response to the request, data is returned by the server (706, "yes"), method 700 can proceed to block 709, in which the electronic device decrypts the received data. If data is not returned by the server (706, "no"), or the server sends a reply that indicates data is not available, method 700 includes for the electronic device can widen the search time by requesting successively older time periods until the max period is reached (707).

Figure 8:
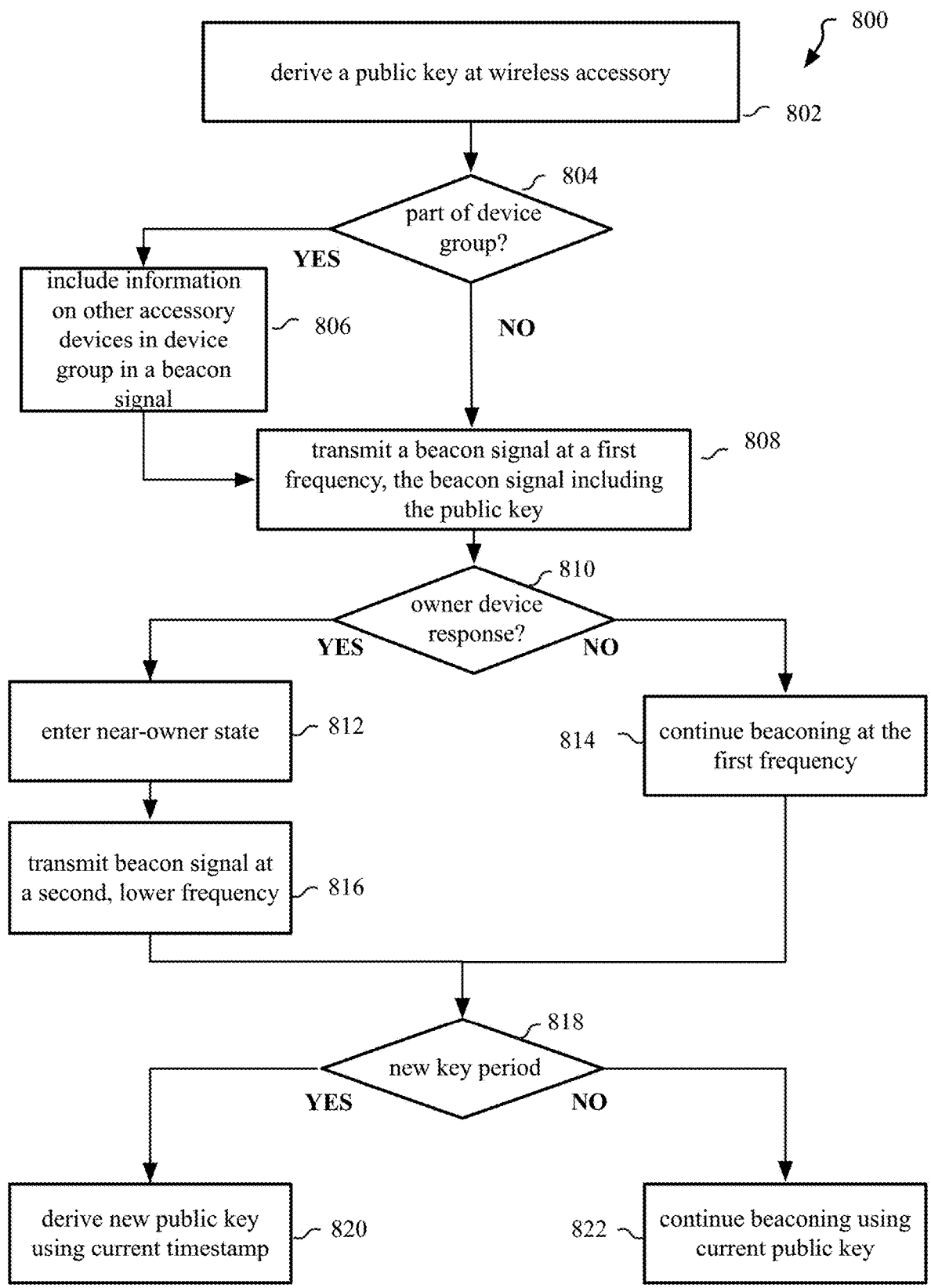
FIG. 8 is a flow diagram illustrating a method of broadcasting a signal beacon at a wireless accessory, according to an embodiment.

FIG. 8 is a flow diagram illustrating a method 800 of broadcasting a signal beacon at a wireless accessory, according to an embodiment. Aspects of method 800 are also illustrated in FIG. 2 and FIG. 3. Method 800 includes for the wireless accessory to derive a public key (block 802). The public key can be derived based on a shared secret and a timestamp determined based on a clock or time keeping device of the wireless accessory. Optionally, a determination is made as to whether the wireless accessory is part of a device group (804). If the wireless accessory is part of a device group (804), the status information and/or verifiable information for other accessory devices 101 in the device group 105 is provided in the beacon signal (806). The wireless accessory may indicate status information and/or verifiable information, such as whether any other wireless accessory in the device group is proximate, connected (physically or wirelessly), and/or any other information on the other wireless accessories in the device group 105. In an embodiment, a set of bits included in the beacon signal may represent each accessory in the device group and setting a Boolean value (e.g., true (1) or false (0)) may indicate whether the respective accessory is proximate and/or connected to the accessory device sending the beacon signal. Alternatively, information is not provided on a device group, if the wireless accessory is not part of a device group (804). The wireless accessory can then transmit a beacon signal at a first frequency, where the beacon signal includes the public key (808). The first frequency can vary, and in one embodiment is one beacon every two seconds.

After transmitting a beacon signal, the wireless accessory can listen for a response from the owner device (810). If the wireless signal receives a response from the owner device (810, "yes"), the wireless accessory can enter a near-owner state (812) and begin to transmit the beacon signal at a second, lower frequency (816). If the wireless accessory does not receive a response from the owner device (810, "no"), the wireless accessory can continue beaconing at the first frequency (814).

Method 800 additionally includes for the wireless device, while beaconing, to rotate the public key every M minutes, where the value of M can vary across embodiments and/or based on the device state. Based on a timer expiration, counter, or another mechanism, the wireless accessory can determine whether the accessory has entered a new key period (818). While the wireless accessory has not entered a new key period (818, "no"), the accessory can continue beaconing using the current public key (822). When the wireless accessory detects that it has entered a new key period (818, "yes") the accessory can derive a new public key using the current timestamp (block 820). In one embodiment the new public key can be derived using an existing public key, a timestamp, and an anti-tracking secret.

Figure 9:
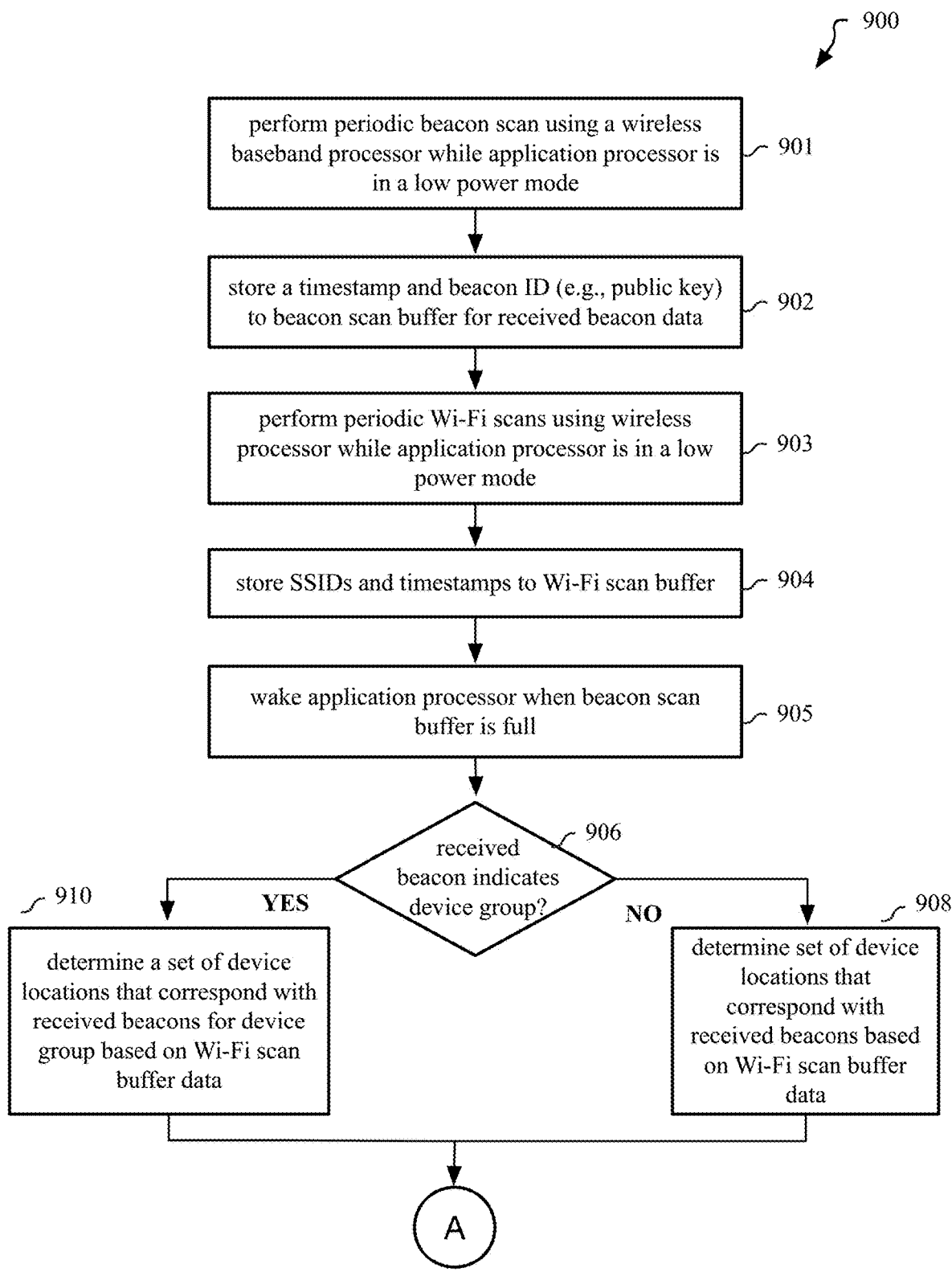
FIG. 9-10 illustrate operations of a method that can be performed by a finder device, according to embodiments described herein.
Figure 10:
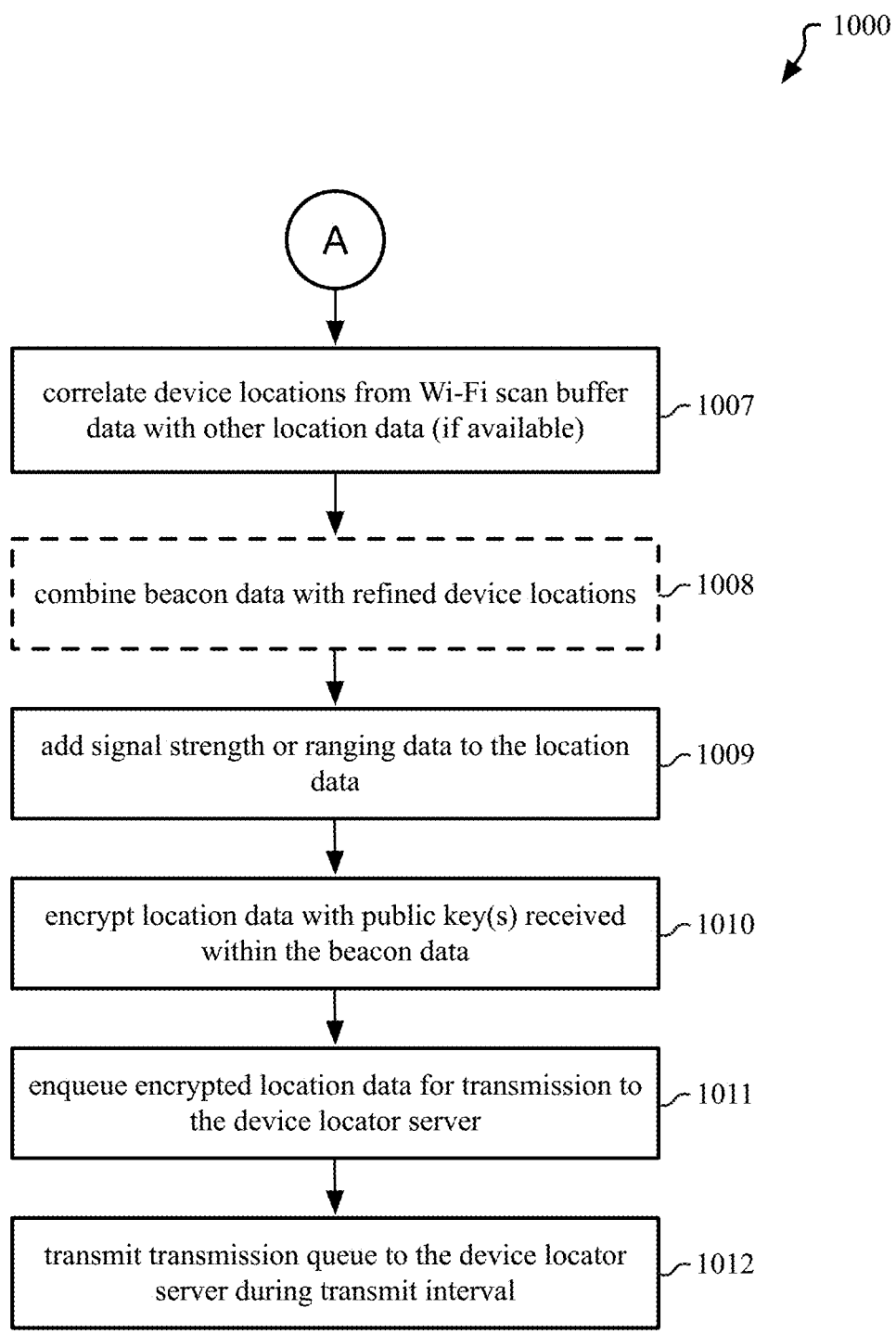

FIG. 9-10 illustrate operations of a method 900 that can be performed by a finder device, according to embodiments described herein. Aspects of method 900 are also illustrated in FIG. 2 and FIG. 3.

As shown in FIG. 9, method 900 includes for the finder device to perform a periodic beacon scan using a wireless baseband processor while an application processor of the finder device is in a low power mode (901). While the beacon scan can also be performed when the application processor is active, beacon scans can be performed by the wireless processor and a wireless radio receiver as a low power operation while the finder device is idle, inactive, or otherwise in a low power state. The finder device can store a timestamp and a beacon identifier to a beacon scan buffer for any beacon data received by the finder device (902). The beacon identifier, in one embodiment, is a public key that is generated by the wireless device based on a timestamp and a shared secret generated with the mobile device of the owner.

Method 900 additionally includes for the finder device to perform periodic Wi-Fi scans using the wireless processor while application processor is in a low power mode (903). While the Wi-Fi scans can also be performed when the application processor is active, Wi-Fi scans can be performed by the wireless processor and a wireless radio receiver as a low power operation while the finder device is idle, inactive, or otherwise in a low power state. The finder device can then store Wi-Fi service set identifiers (SSIDs) and scan timestamps to a Wi-Fi scan buffer on the finder device (904).

In one embodiment, the Wi-Fi scan buffer is a rolling buffer that stores the most recently detected SSIDs, while overwriting older detected SSIDs. In one embodiment the beacon scan buffer can be a fixed-size buffer having space for a pre-determined number of entries. The finder device can wake the application processor when the beacon scan buffer becomes full (905) and correlate those beacon scans with the most recently detected SSIDs in the Wi-Fi scan buffer. If the beacon indicates a beacon signal was received from a device group (906), then a set of device locations that correspond with received beacons based on Wi-Fi scan buffer data may be performed for beacon signals from the device group 105 (910). For example, if a beacon signal is received from a first accessory device from a device group 105 and includes information on a set of proximate devices that are either physically or wirelessly connected to the first accessory device, then the last known location for the first accessory device may be attributed/stored to the first accessory device and each of the proximate devices in the device group 105. Alternatively, that correlation can enable the finder device to determine a set of device locations that correspond with received beacons based on Wi-Fi scan buffer data (908).

Method 900 continues in FIG. 10 and includes for the finder device to correlate device locations from the Wi-Fi scan buffer data with other location data if other location data is available (1007), to generate refined device locations. If refined device locations are generated, the finder device can optionally combine the beacon data with refined device locations (1008). The finder device can also add signal strength (RSSI) and/or ranging data to the location data (1009). The signal strength and ranging data (e.g., UWB ranging data) can be gathered when the beacon signal is received by the finder device. The finder device can then encrypt the location data with one or more public keys received within the beacon data (1010). The signal and ranging data may be encrypted along with the location data or can be send unencrypted along with the encrypted location data. The finder device can enqueue encrypted location data for transmission to the device locator server (1011). The device locator server can be one of multiple cloud services servers to which communication is generally performed in a batched and throttled manner. A batch of encrypted data can be gathered and placed in the transmission queue until a transmit interval arrives, during which the finder device can transmit data to the cloud services servers (1012).

Figure 11:
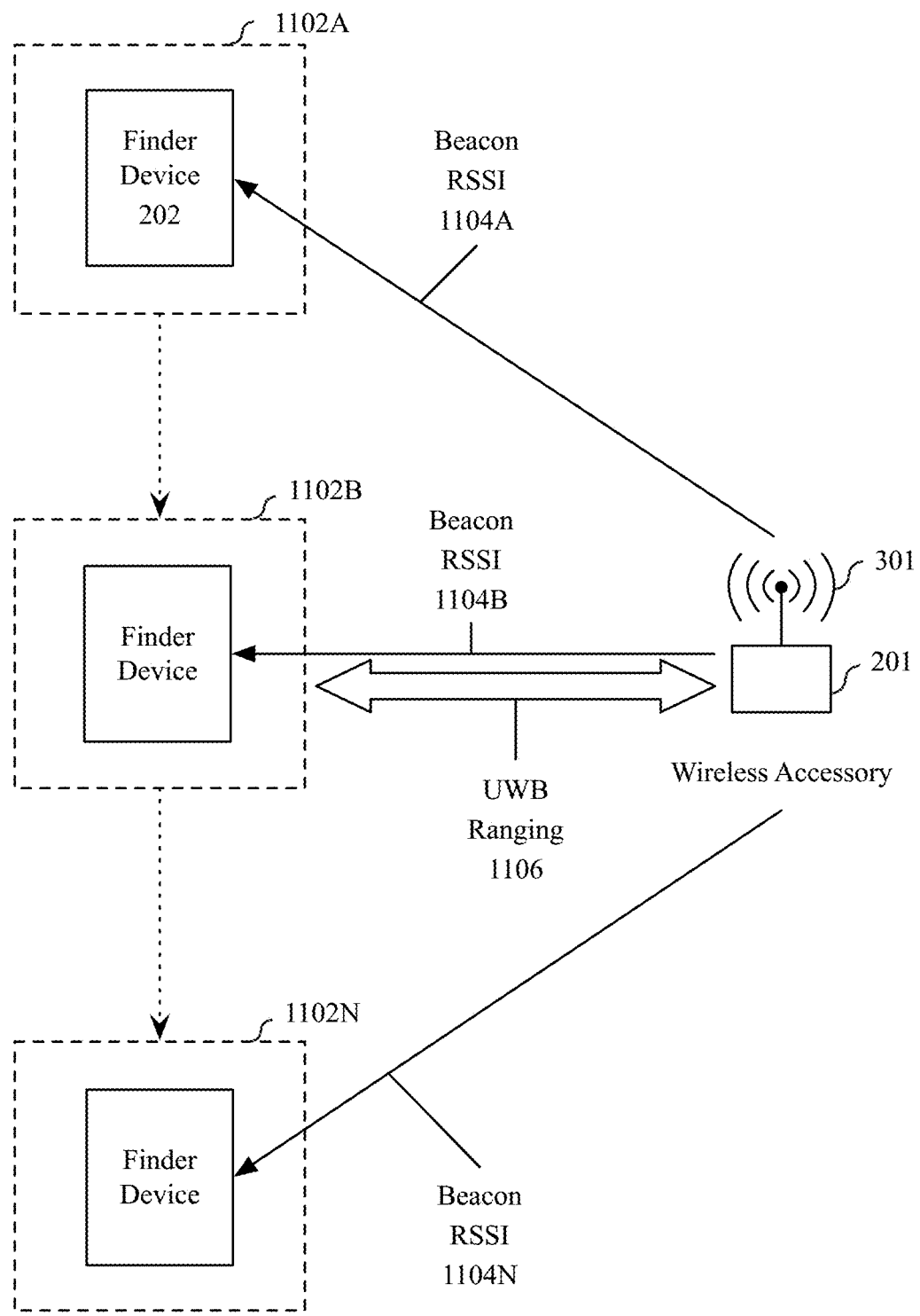
FIG. 11 illustrates the gathering of signal and ranging data by a finder device, according to an embodiment.

FIG. 11 illustrates the gathering of signal and ranging data by a finder device, according to an embodiment. In one embodiment, the finder device 202 can gather signal strength information (e.g., RSSI 1104A-1104N) for a beacon signal 301 received from the wireless accessory 201 across multiple locations 1102A-1102N. The finder device 202 can also represent multiple finder devices, such as the set of finder devices 303 in FIG. 3, where each finder device detects the beacon signal at a different location. Each finder device 202 can send different locations and signal strengths and the location and signal strength data received from the multiple finder devices will be aggregated by the device locator server. In one embodiment, where a finder device and the wireless device each include UWB radios, UWB ranging 1106 can be performed if the finder device and the wireless device are within range of UWB transmissions.

UWB ranging and signal strength data can be transmitted along with location data for the finder devices to the device locator server.

The owner device can retrieve the RSSI and/or UWB information from the device locator server along with location data, which in one embodiment is provided the form of latitude and longitude information, along with timestamps for which the locations were determined. The owner device can then use the location data, timestamps, and signal information to triangulate a most probable location for the wireless accessory 201.

Figure 13:
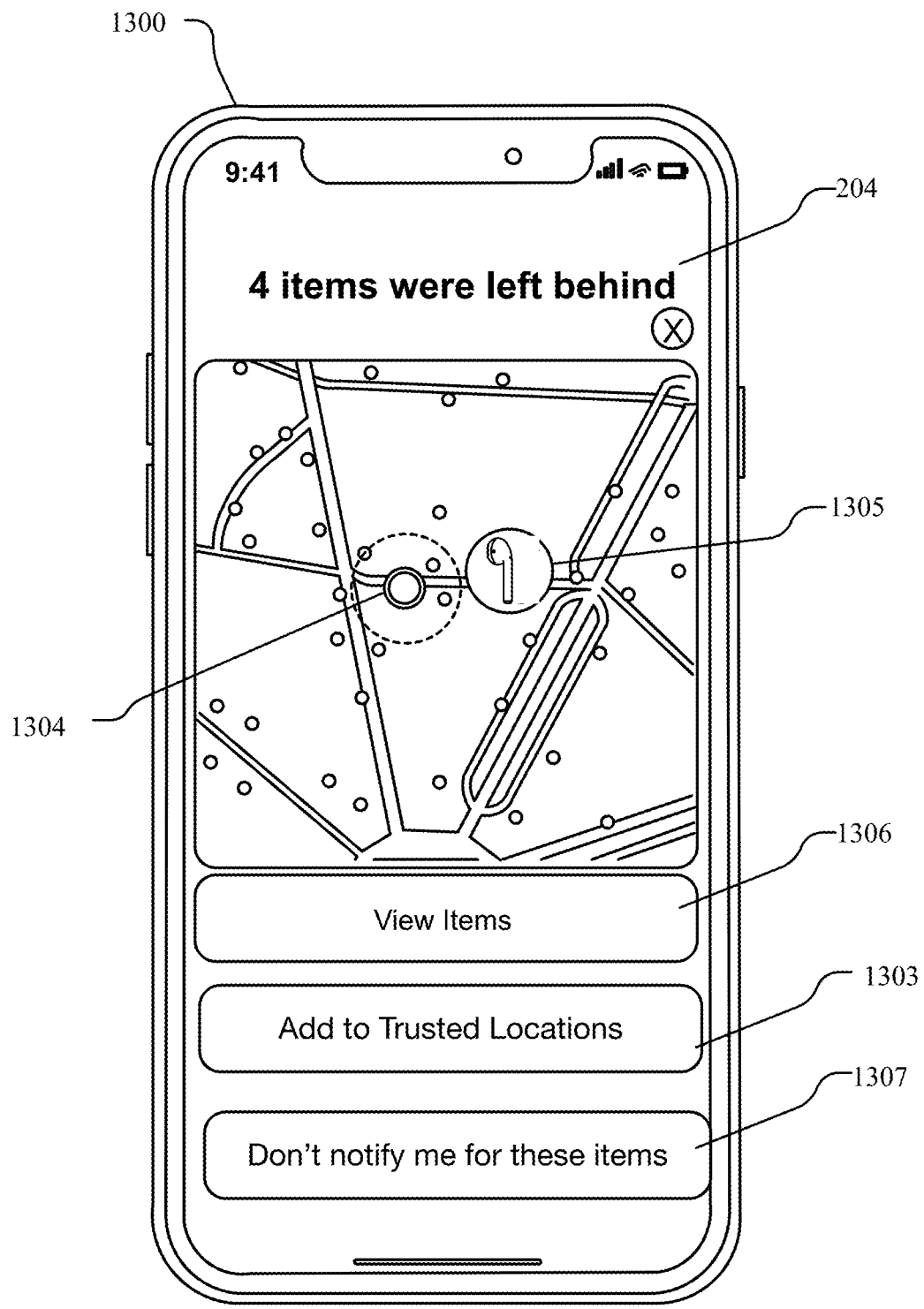
Figure 14:
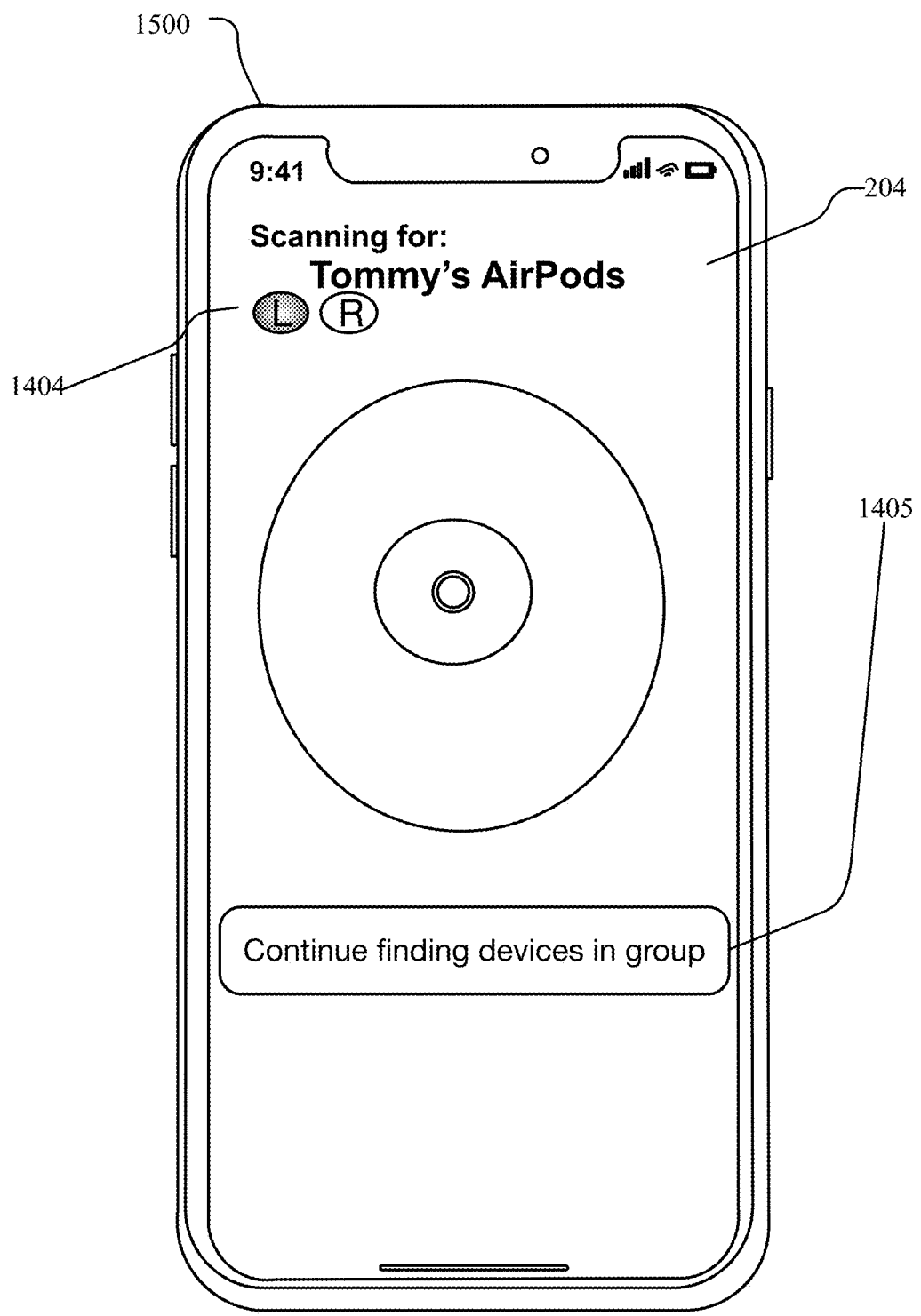

FIG. 12-17 illustrate a device locator UI 204, according to an embodiment. FIG. 12 shows a first graphical user interface of the device locator UI 204, according to an embodiment, which shows a notification for various wireless accessories of a user. FIG. 16-21 illustrate a device locator UI 204, according to an embodiment. FIG. 12 shows a first graphical user interface of the device locator UI 204, according to an embodiment, which shows a notification for various wireless accessories of a user. The device locator UI 204 can cause the presentation of separation notifications 1202 on the home screen 1201 of the electronic device 1200. FIG. 13 shows a second graphical user interface of the device locator UI 204, according to an embodiment, which enables an accessory device left behind to be viewed on a map, add trusted location, or request cease notifications for items. FIG. 14 shows a third graphical user interface of the device locator UI 204, according to an embodiment, which enables accessory devices 101 in a device group 105 to be located. As shown, electronic device 1500, including mobile device 102, may be used to scan for either accessory devices (as shown with "L" left and "R" right options in 1404) in a device group 105 using location data from beacon signals and using finding methods described herein. Selectable element 1405 may be selected to continue finding accessory devices in device group 105.

Figure 15:
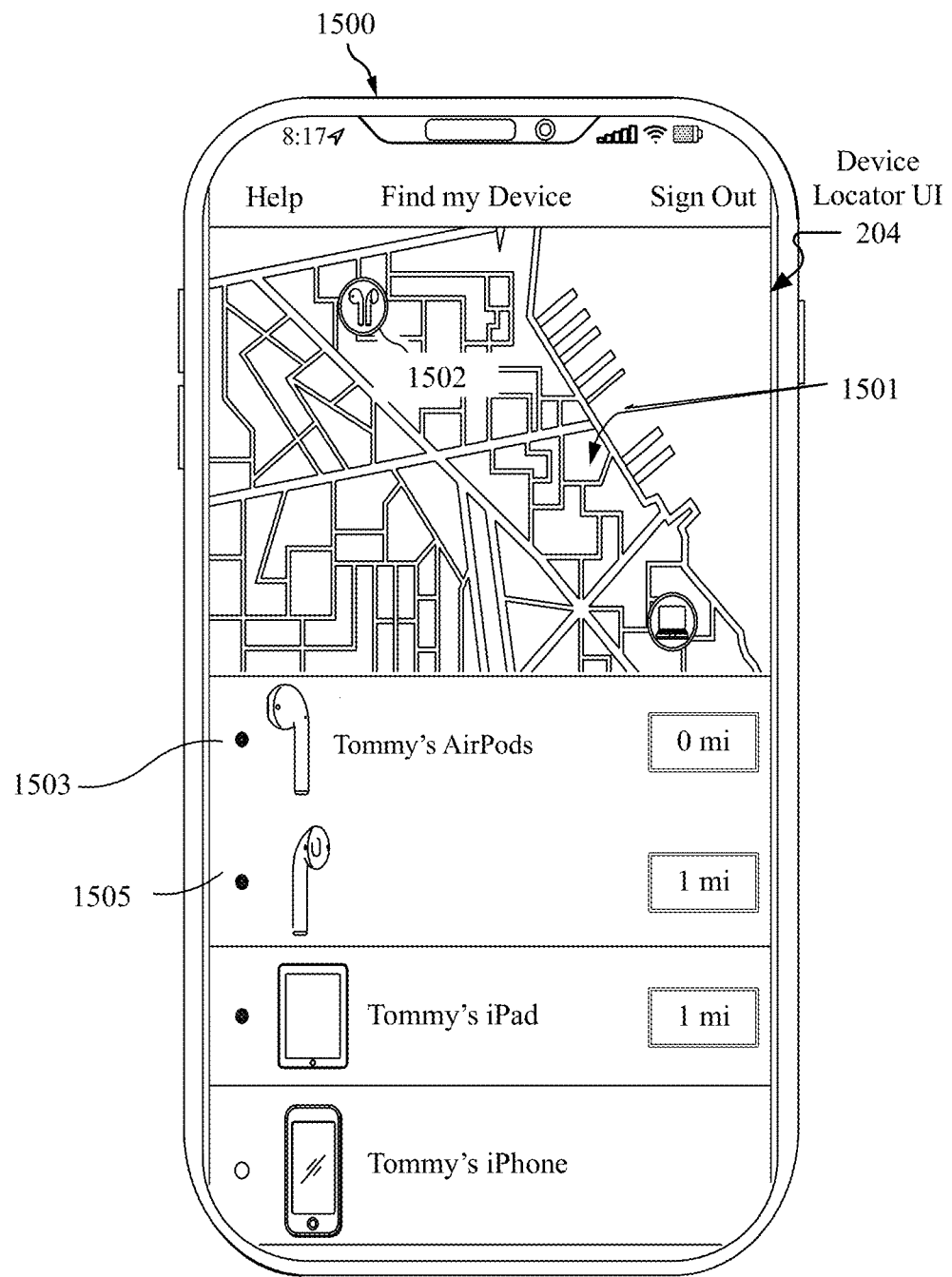
Figure 16:
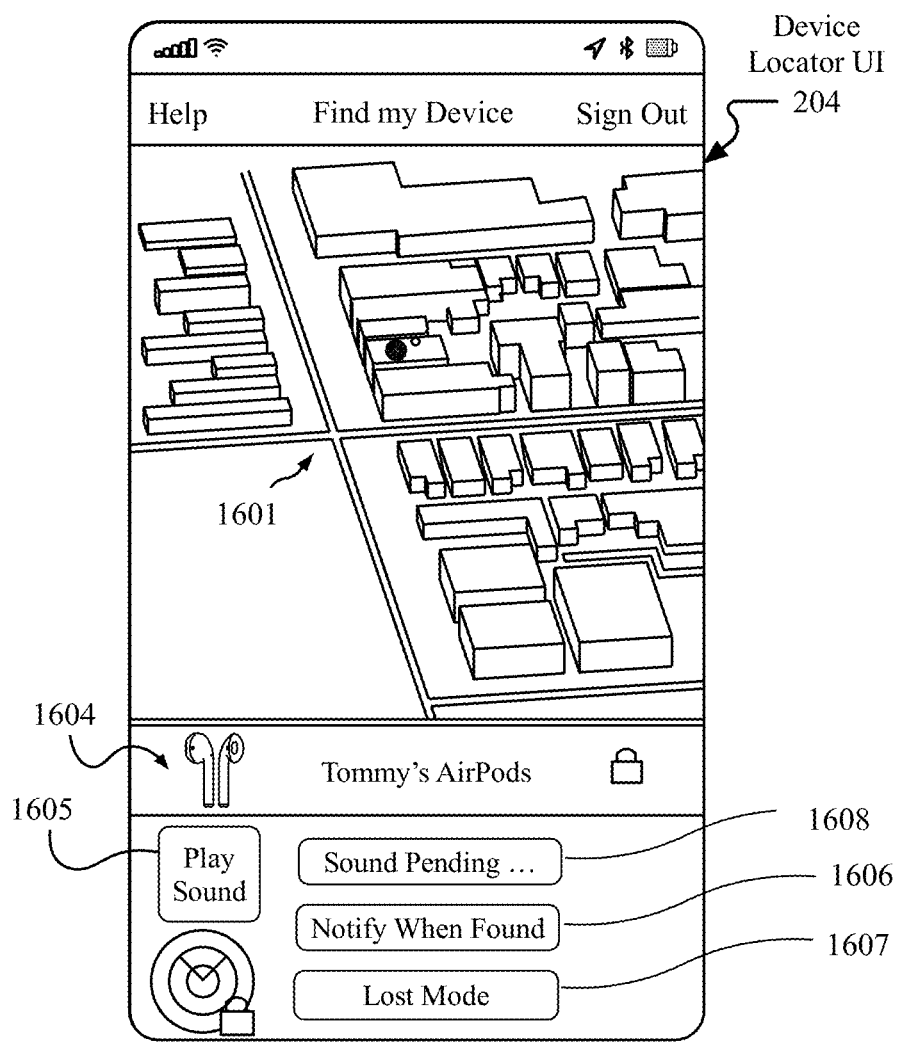
Figure 17:
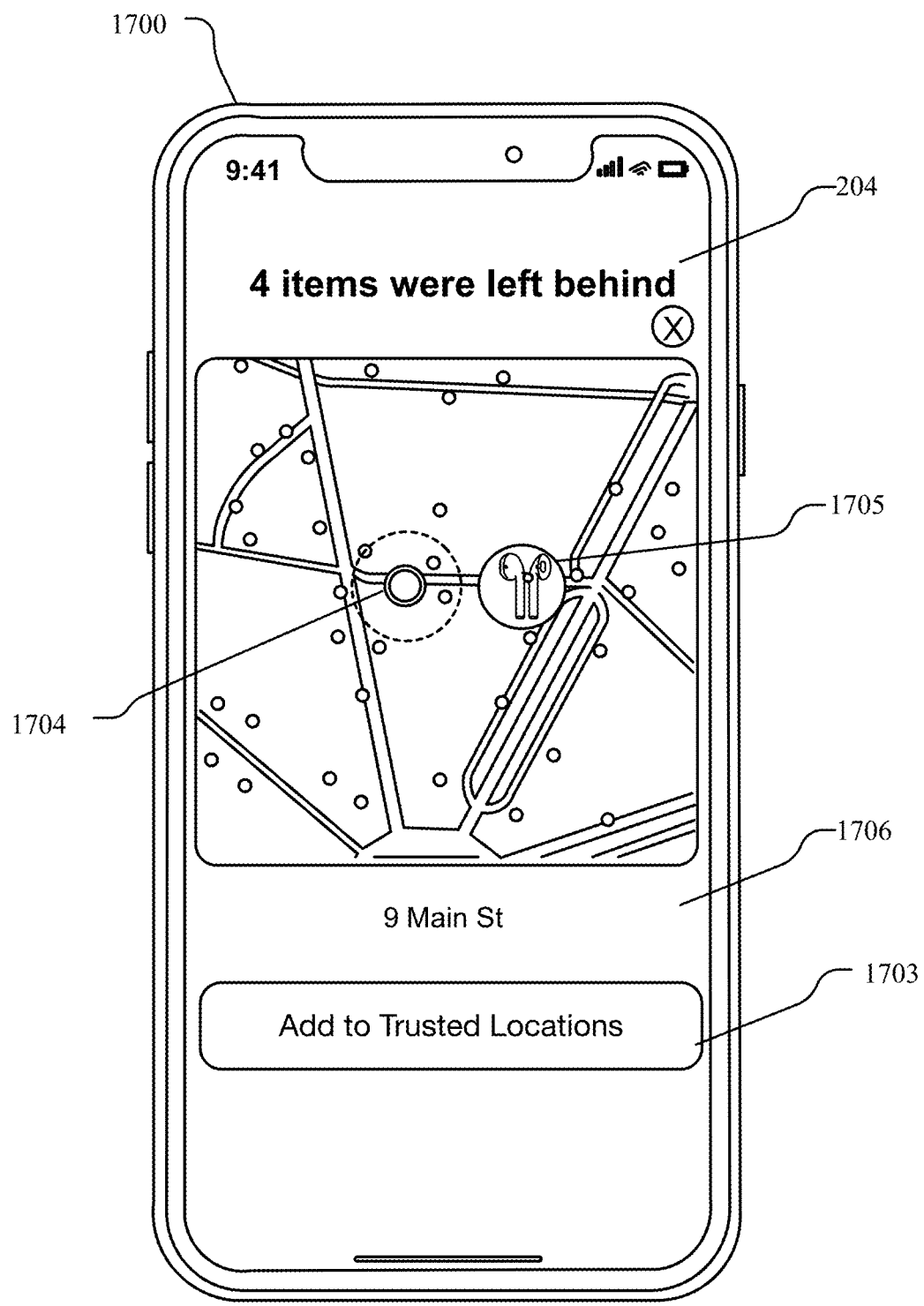

FIG. 15 shows a fourth graphical user interface of the device locator UI 204, according to an embodiment, which enables accessory devices 101 including devices in a device group 105 to be found in a map. FIG. 16 shows a fifth graphical user interface of the device locator UI 204, according to an embodiment, which enables a wireless accessory to be set to a lost mode or notify when found. The device locator UI 204 can be displayed on an electronic device, which can be a mobile device 102, or any other type of electronic device described herein. FIG. 17 shows a sixth graphical user interface of the device locator UI 204, according to an embodiment, which enables a wireless accessory to add trusted locations.

As shown in FIG. 13, the device locator UI 204 can present a unified graphical interface on electronic device 1300 through which multiple different types of devices and accessories can be located, including wireless devices with network or cellular access and wireless accessories without native network access. The device locator UI 204 can include a map 1304 with a marker 1505 that shows the current or last known location of a wireless device or accessory. The marker 1505 can be an icon, image, graphic or any other user interface element that identifies the accessory and conveys a location for the accessory. A selectable element 1306 in the device locator UI 204 can present a description or name of the wireless device or accessory and can show an estimated distance between the wireless device or accessory and the current location of the electronic device 1500 as shown in FIG. 15.

As shown in FIG. 15, the device locator UI 204 can present a fourth user interface that enables a wireless accessory view the item 1503 and distance from electronic device 1500. The second user interface can be displayed, in one embodiment, in response to the selection of the selectable element 1306 shown in FIG. 13. The second user interface can present a user interface element 1502 that represents and/or describes the wireless accessory in question, as well as the map 1501 and marker 1502 that show the current or last known location of the wireless accessory.

As shown in FIG. 16, the device locator UI 204 can present a fifth graphical user interface that enables a wireless accessory to be set to a lost mode. In one embodiment, when a wireless accessory cannot be located via the device locator UI 204, the map 1601 will not display a marker that indicates a location for the accessory. The device locator UI 204 can present the user interface element 1604 that represents and/or describes the wireless accessory in question and a set of selectable user interface elements. One selectable user interface element 1606 can present the option to notify the user when the accessory is found. When notify when found is enabled, in one embodiment the wireless accessory can be placed into a light lost mode. The electronic device associated with the device locator UI 204 can generate a set of public keys that the wireless accessory will broadcast with the beacon signal during a future time period (e.g., next 24 hours, next 48 hours, etc.). If a signal is detected by a finder device using one of the future keys, the device locator server can notify one or more electronic devices associated with the user. The device locator UI 204 can present a selectable user interface element 1605 to allow the user to give the user the option to request that the lost device play a sound. If a connection is established with a lost device from a device group 105, then a request to play sound may be sent to the lost device. If a connection cannot be established, the user may be given the option via selectable user interface element (not shown) to queue a play sound request to be sent to the lost device, if a connection can be formed within a defined period of time. If the user selects to queue the request at the mobile device 102, then the status of the queue request may be provided on the user interface, such as with a selectable user interface element 1608 indicating the request is pending with "Sound Pending."

Another selectable user interface element 1607 can place the wireless accessory into an explicit lost mode. When explicitly placed into lost mode, the wireless accessory will be unable to be paired with other devices until the accessory is unlocked by the user or owner that places the device into lost mode. When sending a request to place a wireless accessory into lost mode, the requesting user can be required to enter authenticating information to ensure that the requesting user is authorized to request that lost mode be initiated on the lost accessory. The authenticating information can include a username or password associated with an account of a user, such as a cloud services account to which the user, electronic device, and wireless accessory are associated. The authenticating information can also include biometric information, such as a fingerprint or facial recognition data.

In one embodiment, a message and contact information provided by the requesting user can be displayed on the user device to alert a person who finds the lost wireless accessory on how to contact the requesting user. In one embodiment, the message and contact information can be displayed when another user attempts to pair another electronic device with the lost accessory.

As shown in FIG. 17, the device locator UI 204 can present a sixth graphical user interface in electronic device 100 that enables a designation of a known location 1706 shown on map with 1704 to become a trusted location with selection of selectable element 1703. The device locator UI 204 can present the user interface element 1705 that represents and/or describes the wireless accessory in question.

Figure 18:
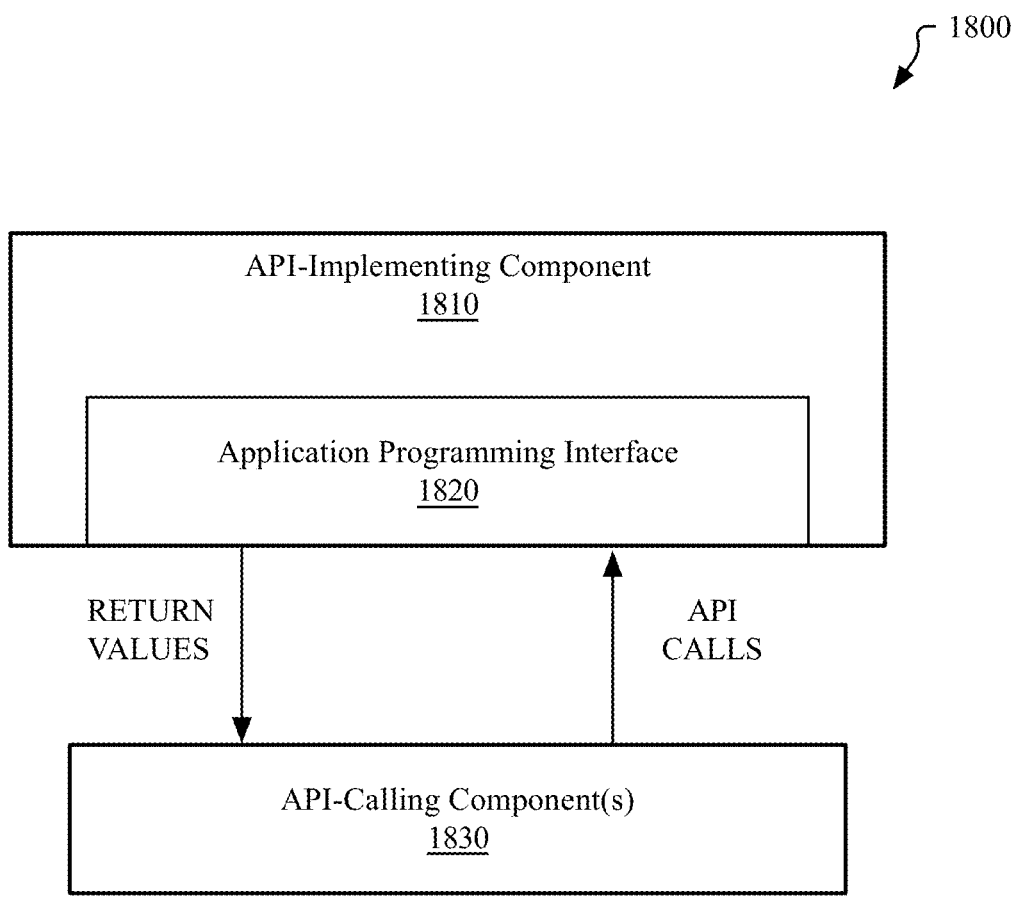
FIG. 18 is a block diagram illustrating an exemplary API architecture, which may be used in some embodiments of the invention.

FIG. 18 is a block diagram illustrating an exemplary API architecture, which may be used in some embodiments of the invention. As shown in FIG. 18, the API architecture 1800 includes the API-implementing component 110 (e.g., an operating system, a library, a device driver, an API, an application program, software or other module) that implements the API 1120. The API 1820 specifies one or more functions, methods, classes, objects, protocols, data structures, formats and/or other features of the API-implementing component that may be used by the API-calling component 1830. The API 1820 can specify at least one calling convention that specifies how a function in the API-implementing component receives parameters from the API-calling component and how the function returns a result to the API-calling component. The API-calling component 1830 (e.g., an operating system, a library, a device driver, an API, an application program, software or other module), makes API calls through the API 1820 to access and use the features of the API-implementing component 1810 that are specified by the API 1820. The API-implementing component 1810 may return a value through the API 1820 to the API-calling component 1830 in response to an API call.

It will be appreciated that the API-implementing component 1810 may include additional functions, methods, classes, data structures, and/or other features that are not specified through the API 1820 and are not available to the API-calling component 1830. It should be understood that the API-calling component 1830 may be on the same system as the API-implementing component 1810 or may be located remotely and accesses the API-implementing component 1810 using the API 1820 over a network. While FIG. 18 illustrates a single API-calling component 1830 interacting with the API 1820, it should be understood that other API-calling components, which may be written in different languages (or the same language) than the API-calling component 1830, may use the API 1820.

The API-implementing component 1810, the API 1820, and the API-calling component 1830 may be stored in a machine-readable medium, which includes any mechanism for storing information in a form readable by a machine (e.g., a computer or other data processing system). For example, a machine-readable medium includes magnetic disks, optical disks, random-access memory; read only memory, flash memory devices, etc.

Figure 19:
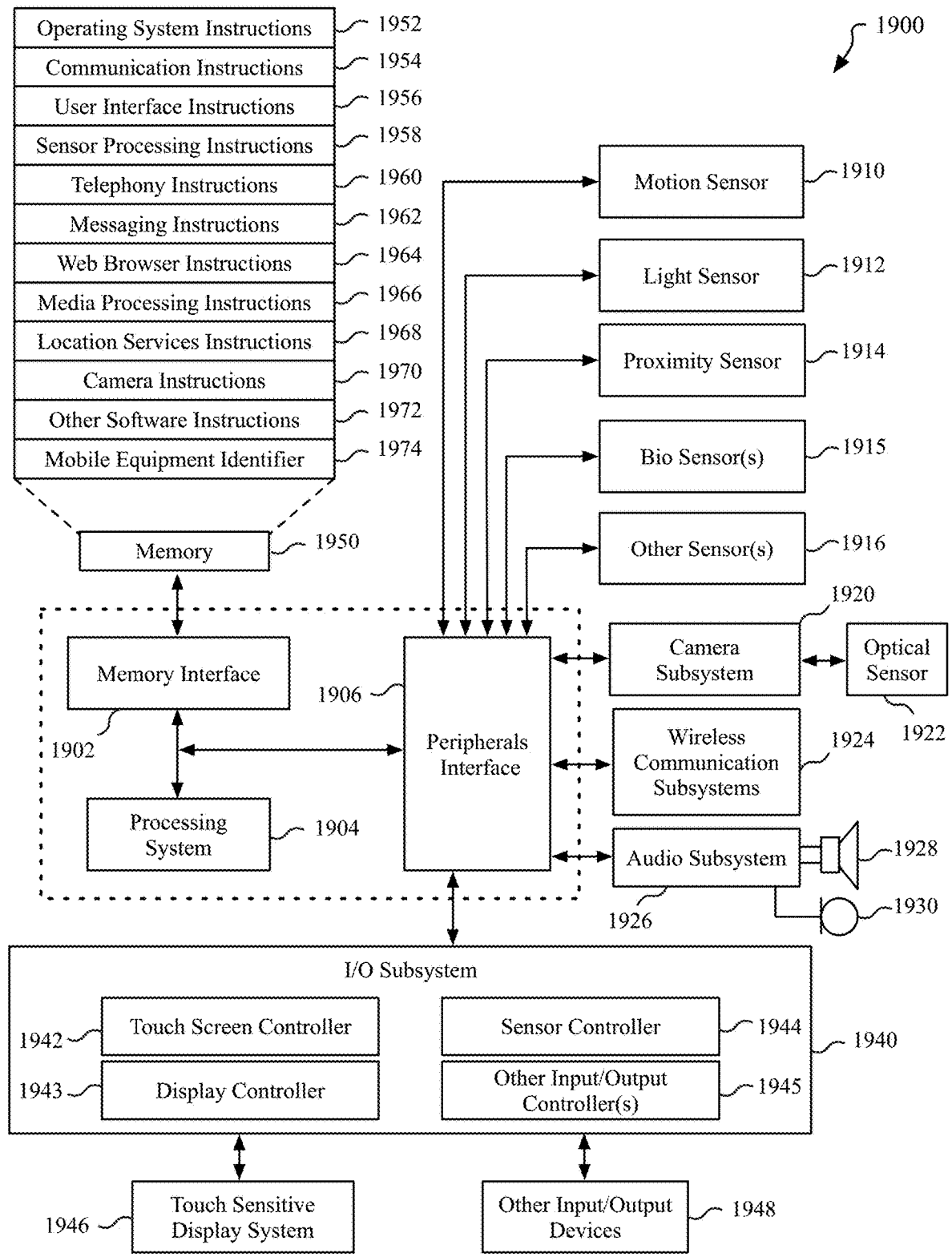
FIG. 19 is a block diagram of a device architecture for a mobile or embedded device, according to an embodiment

FIG. 19 is a block diagram of a device architecture 1900 for a mobile or embedded device, according to an embodiment. The device architecture 1900 includes a memory interface 1902, a processing system 1904 including one or more data processors, image processors and/or graphics processing units, and a peripherals interface 1906. The various components can be coupled by one or more communication buses or signal lines. The various components can be separate logical components or devices or can be integrated in one or more integrated circuits, such as in a system on a chip integrated circuit.

The memory interface 1902 can be coupled to memory 1950, which can include high-speed random-access memory such as static random-access memory (SRAM) or dynamic random-access memory (DRAM) and/or non-volatile memory, such as but not limited to flash memory (e.g., NAND flash, NOR flash, etc.).

Sensors, devices, and subsystems can be coupled to the peripherals interface 1906 to facilitate multiple functionalities. For example, a motion sensor 1910, a light sensor 1912, and a proximity sensor 1914 can be coupled to the peripherals interface 1906 to facilitate the mobile device functionality. One or more biometric sensor(s) 1915 may also be present, such as a fingerprint scanner for fingerprint recognition or an image sensor for facial recognition. Other sensors 1916 can also be connected to the peripherals interface 1906, such as a positioning system (e.g., GPS receiver), a temperature sensor, or other sensing device, to facilitate related functionalities. A camera subsystem 1920 and an optical sensor 1922, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 1924, which can include radio frequency receivers and transmitters and/or optical (e.g., infrared) receivers and transmitters. The specific design and implementation of the wireless communication subsystems 1924 can depend on the communication network(s) over which a mobile device is intended to operate. For example, a mobile device including the illustrated device architecture 1900 can include wireless communication subsystems 1924 designed to operate over a GSM network, a CDMA network, an LTE network, a Wi-Fi network, a Bluetooth® network, or any other wireless network. In particular, the wireless communication subsystems 1924 can provide a communications mechanism over which a media playback application can retrieve resources from a remote media server or scheduled events from a remote calendar or event server.

An audio subsystem 1926 can be coupled to a speaker 1928 and a microphone 1930 to facilitate voice-enabled functions, such as voice recognition, voice replication, digital recording, and telephony functions. In smart media devices described herein, the audio subsystem 1926 can be a high-quality audio system including support for virtual surround sound.

The I/O subsystem 1940 can include a touch screen controller 1942 and/or other input controller(s) 1945. For computing devices including a display device, the touch screen controller 1942 can be coupled to a touch sensitive display system 1946 (e.g., touch-screen). The touch sensitive display system 1946 and touch screen controller 1942 can, for example, detect contact and movement and/or pressure using any of a plurality of touch and pressure sensing technologies, including but not limited to capacitive, resistive, infrared, and surface acoustic wave technologies, as well as other proximity sensor arrays or other elements for determining one or more points of contact with a touch sensitive display system 1946. Display output for the touch sensitive display system 1946 can be generated by a display controller 1943. In one embodiment, the display controller 1943 can provide frame data to the touch sensitive display system 1946 at a variable frame rate.

In one embodiment, a sensor controller 1944 is included to monitor, control, and/or processes data received from one or more of the motion sensor 1910, light sensor 1912, proximity sensor 1914, or other sensors 1916. The sensor controller 1944 can include logic to interpret sensor data to determine the occurrence of one of more motion events or activities by analysis of the sensor data from the sensors.

In one embodiment, the I/O subsystem 1940 includes other input controller(s) 1945 that can be coupled to other input/control devices 1948, such as one or more buttons, rocker switches, thumb-wheel, infrared port, USB port, and/or a pointer device such as a stylus, or control devices such as an up/down button for volume control of the speaker 1928 and/or the microphone 1930.

In one embodiment, the memory 1950 coupled to the memory interface 1902 can store instructions for an operating system 1952, including portable operating system interface (POSIX) compliant and non-compliant operating system or an embedded operating system. The operating system 1952 may include instructions for handling basic system services and for performing hardware dependent tasks. In some implementations, the operating system 1952 can be a kernel.

The memory 1950 can also store communication instructions 1954 to facilitate communicating with one or more additional devices, one or more computers and/or one or more servers, for example, to retrieve web resources from remote web servers. The memory 1950 can also include user interface instructions 1956, including graphical user interface instructions to facilitate graphic user interface processing.

Additionally, the memory 1950 can store sensor processing instructions 1958 to facilitate sensor-related processing and functions; telephony instructions 1960 to facilitate telephone-related processes and functions; messaging instructions 1962 to facilitate electronic-messaging related processes and functions; web browser instructions 1964 to facilitate web browsing-related processes and functions; media processing instructions 1966 to facilitate media processing-related processes and functions; location services instructions including GPS and/or navigation instructions 1968 and Wi-Fi based location instructions to facilitate location based functionality; camera instructions 1970 to facilitate camera-related processes and functions; and/or other software instructions 1972 to facilitate other processes and functions, e.g., security processes and functions, and processes and functions related to the systems. The memory 1950 may also store other software instructions such as web video instructions to facilitate web video-related processes and functions; and/or web shopping instructions to facilitate web shopping-related processes and functions. In some implementations, the media processing instructions 1966 are divided into audio processing instructions and video processing instructions to facilitate audio processing-related processes and functions and video processing-related processes and functions, respectively. A mobile equipment identifier, such as an International Mobile Equipment Identity (IMEI) 1974 or a similar hardware identifier can also be stored in memory 1950.

Each of the above identified instructions and applications can correspond to a set of instructions for performing one or more functions described above. These instructions need not be implemented as separate software programs, procedures, or modules. The memory 1950 can include additional instructions or fewer instructions. Furthermore, various functions may be implemented in hardware and/or in software, including in one or more signal processing and/or application specific integrated circuits.

Figure 20:
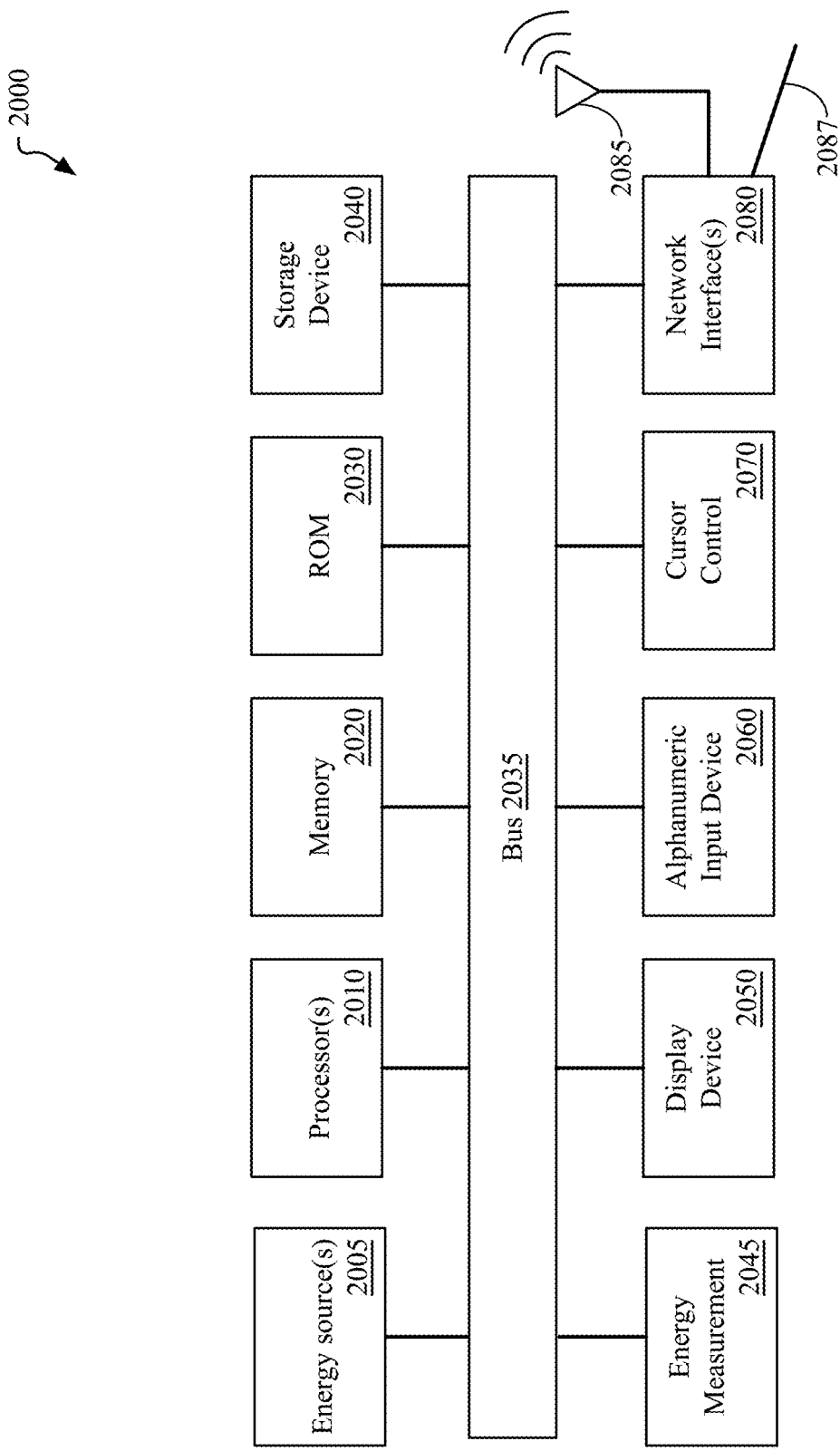
FIG. 20 is a block diagram of a computing system, according to an embodiment.

FIG. 20 is a block diagram of a computing system 2000, according to an embodiment. The illustrated computing system 2000 is intended to represent a range of computing systems (either wired or wireless) including, for example, desktop computer systems, laptop computer systems, tablet computer systems, cellular telephones, personal digital assistants (PDAs) including cellular-enabled PDAs, set top boxes, entertainment systems or other consumer electronic devices, smart appliance devices, or one or more implementations of a smart media playback device. Alternative computing systems may include more, fewer and/or different components. The computing system 2000 can be used to provide the computing device and/or a server device to which the computing device may connect.

The computing system 2000 includes bus 2035 or other communication device to communicate information, and processor(s) 2010 coupled to bus 2035 that may process information. While the computing system 2000 is illustrated with a single processor, the computing system 2000 may include multiple processors and/or co-processors. The computing system 2000 further may include memory 2020 in the form of random access memory (RAM) or other dynamic storage device coupled to the bus 2035. The memory 2020 may store information and instructions that may be executed by processor(s) 2010. The memory 2020 may also be main memory that is used to store temporary variables or other intermediate information during execution of instructions by the processor(s) 2010.

The computing system 2000 may also include read only memory (ROM) 2030 and/or another data storage device 2040 coupled to the bus 2035 that may store information and instructions for the processor(s) 2010. The data storage device 2040 can be or include a variety of storage devices, such as a flash memory device, a magnetic disk, or an optical disc and may be coupled to computing system 2000 via the bus 2035 or via a remote peripheral interface.

The computing system 2000 may also be coupled, via the bus 2035, to a display device 2050 to display information to a user. The computing system 2000 can also include an alphanumeric input device 2060, including alphanumeric and other keys, which may be coupled to bus 2035 to communicate information and command selections to processor(s) 2010. Another type of user input device includes a cursor control 2070 device, such as a touchpad, a mouse, a trackball, or cursor direction keys to communicate direction information and command selections to processor(s) 2010 and to control cursor movement on the display device 2050. The computing system 2000 may also receive user input from a remote device that is communicatively coupled via one or more network interface(s) 2080.

The computing system 2000 further may include one or more network interface(s) 2080 to provide access to a network, such as a local area network. The network interface(s) 2080 may include, for example, a wireless network interface having antenna 2085, which may represent one or more antenna(e). The computing system 2000 can include multiple wireless network interfaces such as a combination of Wi-Fi, Bluetooth®, near field communication (NFC), and/or cellular telephony interfaces. The network interface(s) 2080 may also include, for example, a wired network interface to communicate with remote devices via network cable 2087, which may be, for example, an Ethernet cable, a coaxial cable, a fiber optic cable, a serial cable, or a parallel cable.

In one embodiment, the network interface(s) 2080 may provide access to a local area network, for example, by conforming to IEEE 802.11 wireless standards and/or the wireless network interface may provide access to a personal area network, for example, by conforming to Bluetooth® standards. Other wireless network interfaces and/or protocols can also be supported. In addition to, or instead of, communication via wireless LAN standards, network interface(s) 2080 may provide wireless communications using, for example, Time Division, Multiple Access (TDMA) protocols, Global System for Mobile Communications (GSM) protocols, Code Division, Multiple Access (CDMA) protocols, Long Term Evolution (LTE) protocols, and/or any other type of wireless communications protocol.

The computing system 2000 can further include one or more energy sources 2005 and one or more energy measurement systems 2045. Energy sources 2005 can include an AC/DC adapter coupled to an external power source, one or more batteries, one or more charge storage devices, a USB charger, or other energy source. Energy measurement systems include at least one voltage or amperage measuring device that can measure energy consumed by the computing system 2000 during a predetermined period of time. Additionally, one or more energy measurement systems can be included that measure, e.g., energy consumed by a display device, cooling subsystem, Wi-Fi subsystem, or other frequently used or high-energy consumption subsystem.
Encryption for Wireless Accessory Locating and Communication [not sure if needed]

Figure 21:
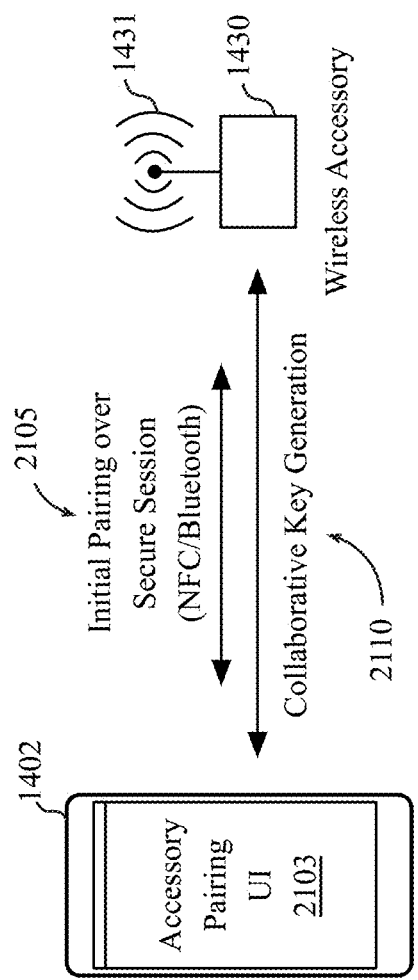
FIG. 21 illustrates a system in which key generation is performed collaboratively between an owner device and a wireless accessory, according to an embodiment.

FIG. 21 illustrates a system 2100 in which key generation is performed collaboratively between an owner device 2102 and a wireless accessory 2130, according to an embodiment. The owner device can be a version of mobile device 102 described herein. The wireless accessory 2130 can be a variant of wireless accessory 201 descried herein. The illustrated system 2100 can be used to implement a variant of initial pairing 305 and public key exchange 310 shown in the system 300 of FIG. 3, in which initial pairing 2105 is performed over a secure data session and the public key exchange 310 is a process of collaborative key generation 2110 that is performed between the owner device 2102 and the wireless accessory 2130. Furthermore, while a wireless accessory 2130 is illustrated and described, the device location functionality described herein can be applied to any electronic device without an independent network connection to allow the device to update its location at a device location server and with at least one wireless radio that is capable of broadcasting a beacon signal 2131.

Figure 22:
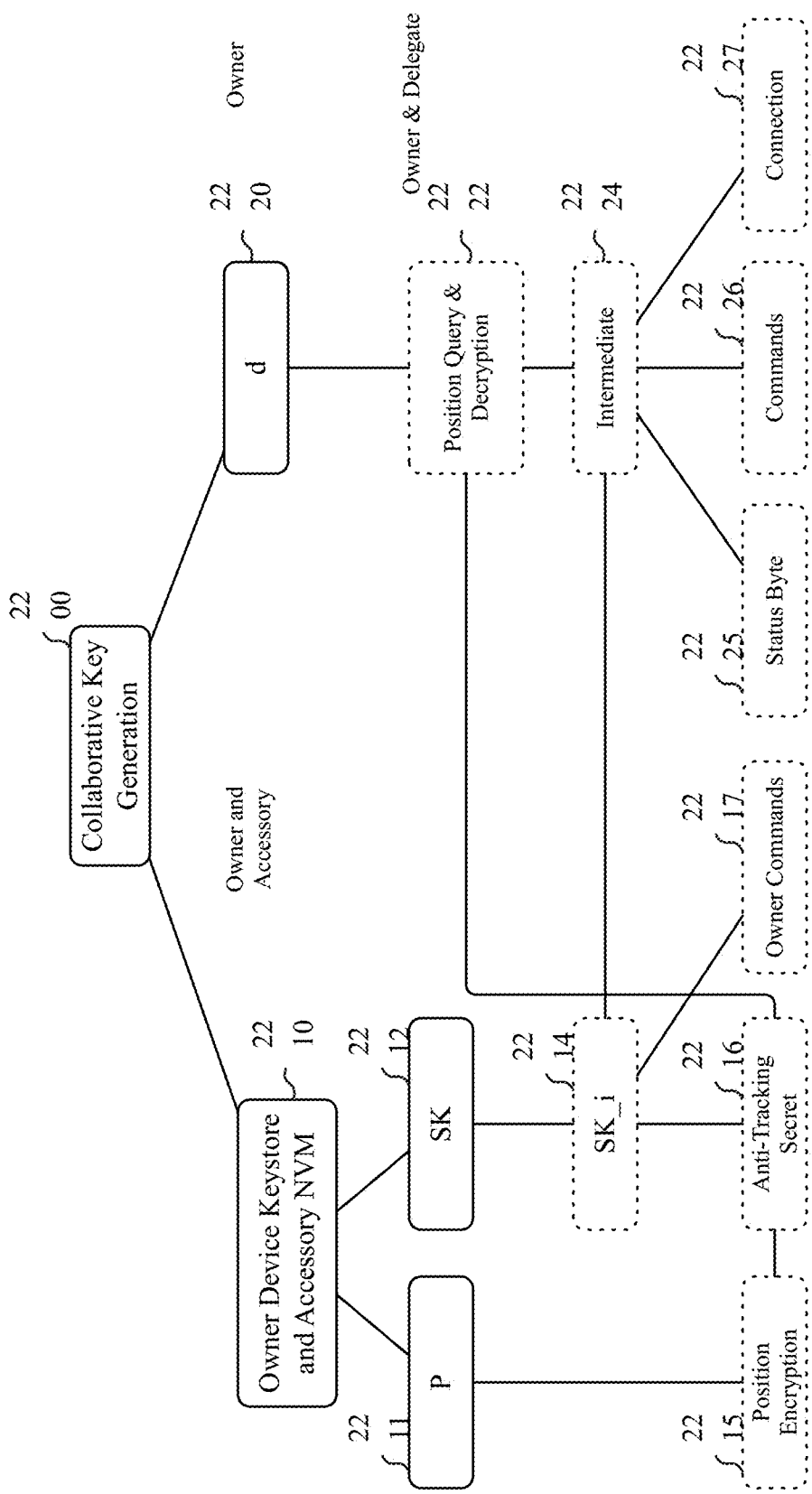
FIG. 22 illustrates a process of collaborative key generation, according to an embodiment.

Collaborative key generation can begin after an initial pairing 2105 performed over a secure session. In one embodiment the initial pairing can be performed over an NFC initiated Bluetooth® connection. An NFC data exchange between the owner device 2102 and the wireless accessory 2130 can be used to establish or exchange a shared secret that is used to encrypt a Bluetooth® connection. The encrypted Bluetooth® connection can then be used to exchange data that is used to generate cryptographic material for use in locating the wireless accessory 2130. In some embodiments, an implementation of encryption and a key hierarchy described in U.S. patent application Ser. No. 17/603,562, entitled "Sharing Keys for a Wireless Accessory" may be used and is incorporated by reference herein.
Collaborative Key Generation Process FIG. 22 illustrates a process of collaborative key generation, according to an embodiment. In one embodiment, collaborative key generation can be performed by a primary device 2202 and a secondary device 2230. The primary device 2202 can be an owner device, for example, the user device 1402 as in FIG. 21, or equivalent devices described herein. The secondary device 2230 can be, for example, the wireless accessory 1430 as in FIG. 21, or equivalent devices described herein.

During collaborative key generation, the primary device 2202 and the secondary device 2230 collaboratively generate key pair {d, P} and secret key SK. During the process, the secondary device 2230 is unable to learn private key d and neither device can bias P or SK. The collaborative key generation process also prevents the primary device 2202 from having full control over the secret key SK and key pair {d, P}, which an adversary could exploit by extracting secrets from one device to reprogram those onto another legitimate device.

In one embodiment, the primary device 2202 and the secondary device 2230 can perform operations 2211A-2211B to establish a secure data communication session. The secure data communication session can be a secure Bluetooth® connection, which is established via an exchange of secret data via an out-of-band (OOB) mechanism, such as a password, identification number, or an NFC data exchange. The secure data communication session can also be established via a wired connection, such as via an accessory interface cable that connects the primary device 2202 and the secondary device 2230.

The devices can then perform operations 2212A-2212B to generate key material and randomized data. In one embodiment, the secondary device 2230, during operation 2212B, can generate a P-224 elliptic curve scalar value s and a random value r. During operation 2212A, the primary device 2202 can generate a P-224 elliptic curve scalar value s' and a 32-byte random value r'. The primary device can additionally compute a value S'=s'·G, where G is the elliptic curve generator parameter.

{S', r'}commitmentcommitment=Hash(s∥r) commitment{s, r} The primary device 2202 and the secondary device 2230 can then perform operation 2213 and operation 2214 to exchange randomized data over the secure session. During {S', r'}commitmentcommitment=Hash(s∥r) commitment{s, r} operation 2213, the primary device 2202 can send to the secondary device 2230, which in one embodiment is an 89-byte transfer. During operation 2214, the secondary device 2230 can send a value to the primary device 2202, where. In one embodiment, is a 32-byte value. The secondary device 2230 can also send values to the primary device 2202.

The primary device 2202 and the secondary device 2230 can then perform operations 2216A-2216B to compute shared secret data based on combined random data. The secondary device 2130 can compute P=S'+s·G. The primary device 2102 can confirm that commitment=Hash(s∥r). The primary device 2102 can also compute d=s'+s (mod q) and P=d·G=(s'+s)·G=s'·G+s·G=S'+s·G. Both the primary device 2102 and the secondary device 2130 can then compute shared secret key SK=KDF(x(P), r∥r'). In one embodiment, |SK|=32 bytes. The primary device 2102 and the secondary device 2130 can then derive key material based on the shared secret in operation 2117 and operation 2118. The primary device 2102 can store key material to a keystore, such as a shared cloud keystore, in operation 2119. The secondary device 2130 can store key material to local non-volatile storage in operation 2120.

In one embodiment, the devices can derive key material based on the secret keys using the techniques described below. The secondary device 2230 can derive $SK_i$ for period i=[counter/N] where counter is the current value of an internal counter and N is the number of seconds for each privacy window. For example, for a 15-minute privacy window, N=900. The owner device can derive $SK_i$ by setting either $$i = \left\lfloor \frac{UT_{lookup} - UT_{NVM}}{N} \right\rfloor; i = \left\lfloor \frac{UT_{now} - UT_{NVM}}{N} \right\rfloor;$$

$$\text{or } i = \left\lfloor \frac{UT_{delegate} - UT_{NVM}}{N} \right\rfloor,$$

where $UT_{lookup}$ is the time corresponding to the period that position reports should be retrieved for, $UT_{now}$ is the current time, and $UT_{delegate}$ is the delegation period that a delegate is allowed to control the secondary device 2230. $UT_{NVM}$ refers to the time when the secondary device 2230 was provisioned by the primary device 2202, which can be retrieved from the non-volatile memory of the secondary device 2230. In one embodiment the primary device 2202 can set $SK_0=SK_{NVM}$ and compute $SK_{j+1}=KDF(SK_j, \text{"update"})$ for j=0, i−1, where $|SK_x|=32$ bytes for any x, although the size of each key can vary across embodiments.

Using diversified secret key $SK_i$, owner command key $OK_i$ and anti-tracking secret $AT_i$ can be generated. In one embodiment, $OK_i=KDF(SK_i, \text{"owner"})$. Additionally, $AT_i=(u_i, v_i)=KDF(SK_i, \text{"diversify"})$, where $(u_i, v_i)$ represent coordinates of an elliptic curve point. In one embodiment, ATT is a 72-byte secret, although the size can vary across embodiments.

Diversified public key $P_i$ is a diversified version of public key P. $P_i$ can be derived without knowledge of private device key d and can be used instead of P as the position encryption key to prevent long term tracking of the secondary device 2230. Where $AT_i=(u_i, v_i)$, $P_i=u_i \cdot P+v_i \cdot G$. In one embodiment, $u_i$ and $v_i$ are turned into valid scalars per FIPS 186-4, B.5.1 Per-Message Secret Number Generation Using Extra Random Bits. For example, $u_i:=(u_i \mod (n-1))+1$ and $v_i:=(v_i \mod (n-1))+1$ with n being the order of base point G, as defined for P-224.

Diversified key $d_i$ is the diversified private key d and can be passed to delegates without revealing d. Having $AT_i$ and $SK_i$, the primary device 2202 can compute $d_i=(d \cdot u_i+v_i)$. A set of $d_i$ keys can be provided to a delegate device. The delegate device can then compute $P_i=d_i \cdot G$. The primary device 2202 and the delegate can use $P_i$ to query the location of the secondary device 2230 at a location server.

Intermediate key $IK_i=KDF(SK_i, \text{"intermediate"})$ can be computed by the primary device 2202 and shared with a delegate without revealing private key d. The delegate (and the primary device 2202) can compute status byte key $BK_i$, command key $CK_i$, and connection key $LTK_i$. $BK_i$ is the encryption key used to protect secrets transmitted via the status byte, which is broadcast by the secondary device 2230 while beaconing, where $(BK_i, BIV_i)=KDF(IK_i, \text{"status"})$. $CK_i$ is the command key used to ensure authenticity of commands send to the secondary device 2230, where $CK_i=KDF(IK_i, \text{"command"})$. $LTK_i$ is the connection key that is used to establish a connection to the secondary device 2230, where $LTK_i=KDF(IK_i, \text{"connect"})$. In one embodiment, each key is a 32-byte key and $BIV_i$ is a 16-byte value, although the sizes may vary across embodiments.

Entry into Near-Owner Mode and Near-Owner State Maintenance

Figure 23:
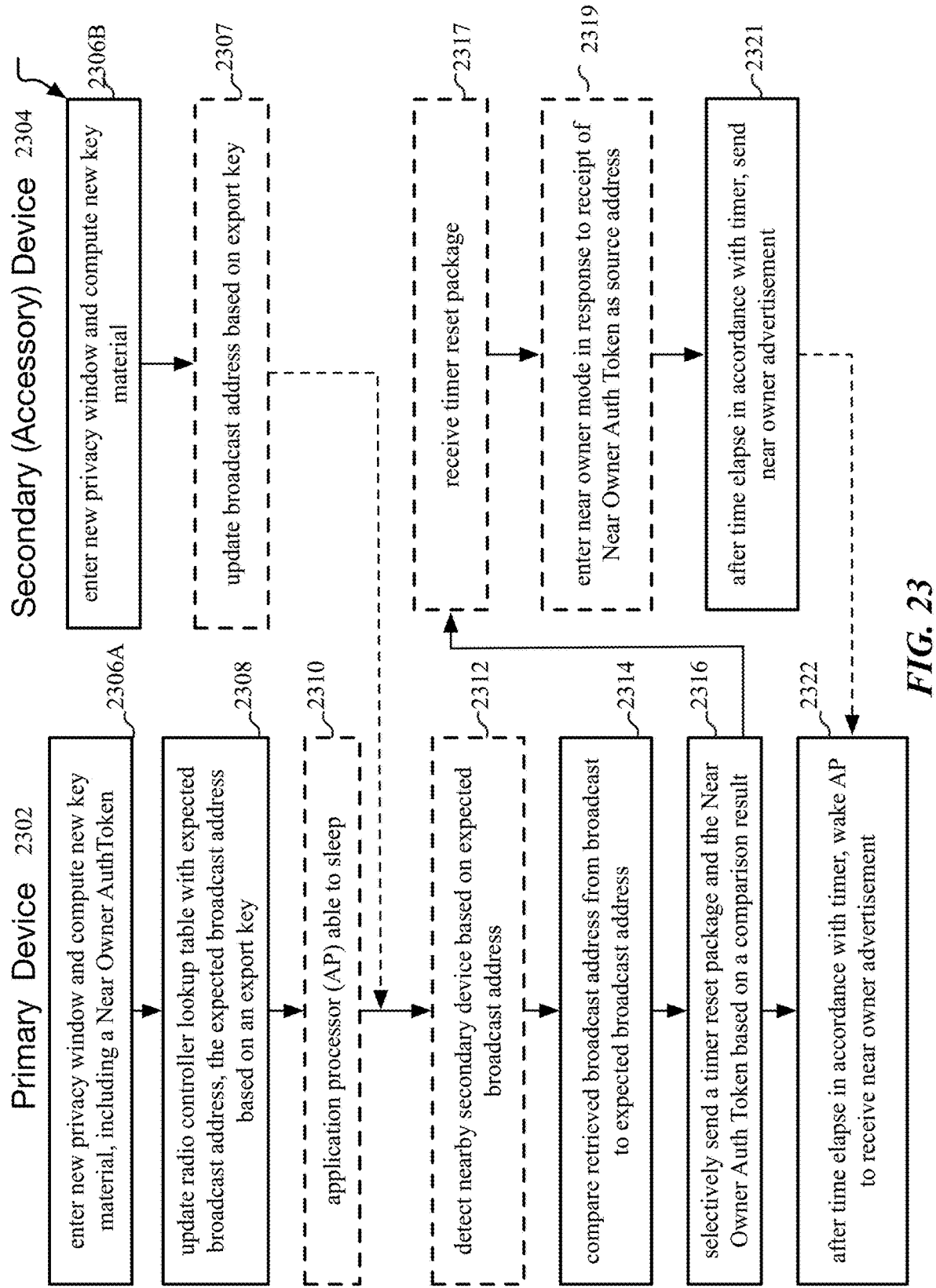
FIG. 23 is a flow diagram of a process of entering a near-owner state at a secondary device and subsequent maintenance of the near-owner state, according to an embodiment.

FIG. 23 is a flow diagram of a process for entering a near-owner state at a secondary device and subsequent maintenance of the near-owner mode, according to an embodiment. In one embodiment, a primary device 2302 (e.g., a mobile device 102) can place a secondary device 2304 (e.g., a wireless accessory 101) into a near-owner mode when the primary device 2302 detects the nearby presence of the secondary device 2304 (e.g., near-owner state). The secondary device 2304 may have been in either a "wild mode" or a near-owner mode prior to entry and subsequent maintenance of the near-owner state as described. The wireless accessory 101 may enter a wild mode if the secondary device 2304 is not near the primary device 2302. For example, the secondary device 2304 may enter a wild mode if no packet exchange or connection has occurred between the primary device 2302 and secondary device 2304 for a near-owner timeout period of time. Alternatively, the secondary device 2304 may continue to be in a near-owner state that is maintained due to the detection of the nearby secondary device 2304.

The primary device 2302 may send a command to the secondary device 2304 instructing the secondary device 2304 on sending advertisements. For example, the primary device 2302 may issue a command to set a near-owner maintenance timer that should expire after a maintenance timeout defined period of time prior to sending advertisements, alter a frequency of sending advertisements, communicate a new timeout period of time, indicate a location state that corresponds to a timeout period, and/or any other command in regard to advertisements sent between the devices. In some embodiments, the maintenance timeout period of time is predefined and in other embodiments a maintenance time may be communicated to the secondary device. The maintenance timeout period of time may depend on the current location and/or motion state of the primary and secondary devices. For example, if the devices are in a trusted location, the maintenance timeout period may be longer than if the devices are not in a trusted location. In another example, the timeout period of time may vary based on whether the primary device 2302 and/or secondary device 2304 are "in transit."

In one embodiment, the secondary device 2304 is placed into the near-owner mode before certain commands may be issued. The secondary device 2304 can be placed into the near-owner mode using a token (e.g., as shown in FIG. 23 with Near Owner Auth Token) that is derived in part based on a command key $CK_i$ and a diversified public key $P_i$. The primary device 2302 and secondary device 2304 can perform operations (2306A-2306B) to enter a new privacy window and compute new key material. The primary device 2302 and secondary device 2304 can each compute new key material for privacy window i from keys P, SK, or d as described above. The primary device 2302 can then perform an operation to derive additional key material, which can include a near-owner authorization token. In one embodiment a 1:1 mapping exists between a diversified public key $P_i$ and a corresponding near-owner authorization token, allowing the tokens to be precomputed for multiple privacy windows. In such embodiment, a near-owner authorization token for the privacy window can be derived as:

NearOwnerAuthToken$_i$=MostSignificant6Bytes(MAC (CK$_i$, x(P$_i$)||"NearOwnerAuthToken"))

The primary device 2302 can perform an operation (2308) to update a radio controller lookup table with an expected broadcast address. The expected broadcast address can be based on an export key. The secondary device 2304 can perform an operation (2307) to update a broadcast address based on the export key. The primary device 2302 and the secondary device 2304 can derive the export key based on the computed key material for the privacy window.

In one embodiment, the export key is a reduced-bit representation of the diversified public key $P_i$. The reduced-bit representation can be a compressed or compacted representation of the diversified public key that stores a reduced number of elliptic curve coordinates. In one embodiment, the export key is compacted representation $x(P_i)$, where $|x(P_i)|=28$ bytes, where only the x coordinate of an elliptic curve point is provided. In one embodiment, an indicator for which of the two valid y coordinates that corresponds with the x coordinate may also be provided.

In one embodiment, the broadcast address of the secondary device 2304 is updated by encoding bytes of the export key into the hardware address of the secondary device, for example, by setting the most significant set of bytes of the hardware address to the corresponding bytes of the export key. The primary device 2302 can then update a radio controller (e.g., Bluetooth® Controller) lookup table to look for the updated hardware address.

Figure 29:
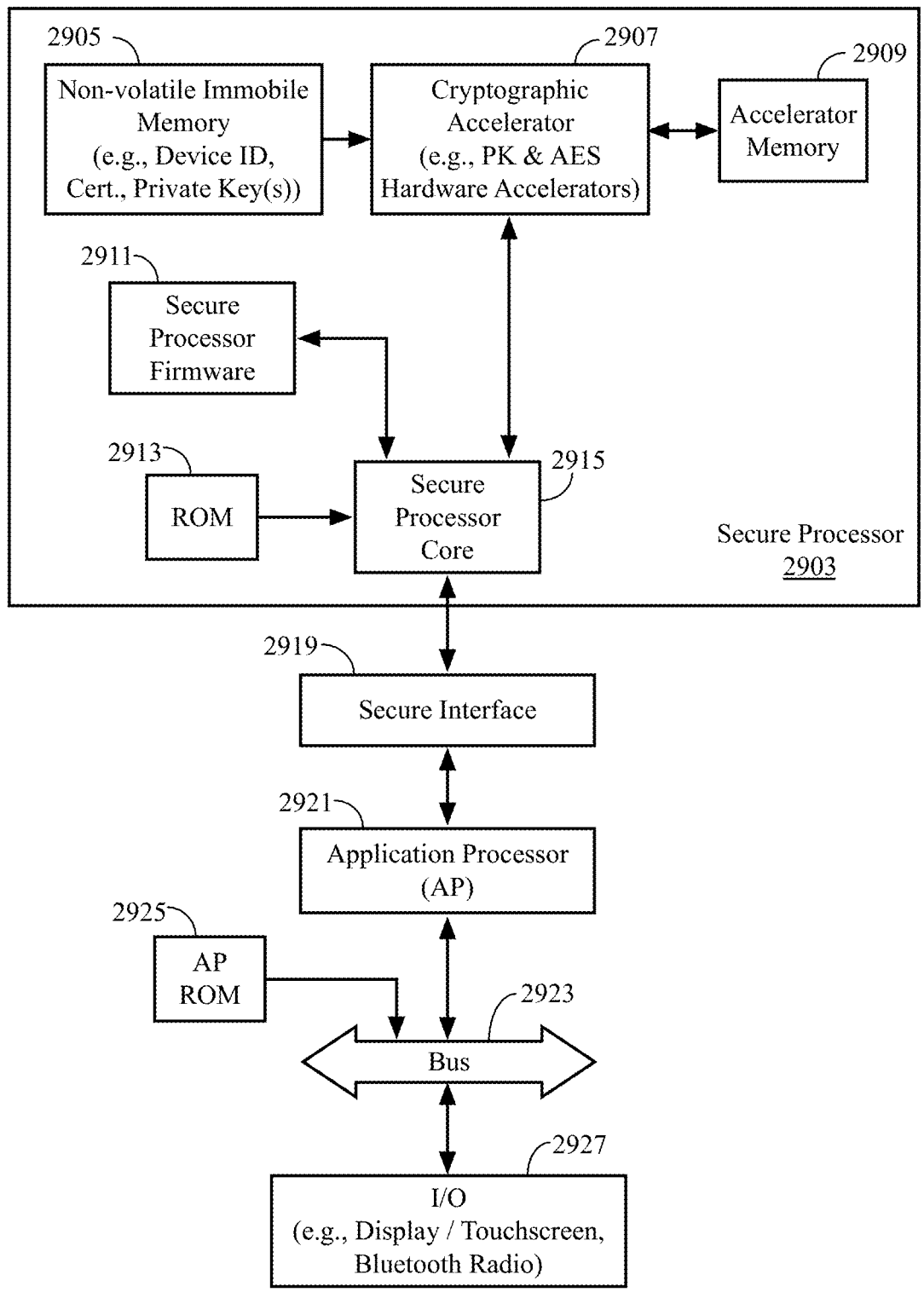
FIG. 29 illustrates a computing system including a secure processor, according to an embodiment.

Optionally, the application processor (as shown in FIG. 29) may sleep after computation of the hardware address and export key. The radio controller may scan for advertisements, so that the near-owner state may be entered and the near-owner mode may be maintained. The primary device 2302 may handle maintaining the near-owner mode by detecting the nearby secondary device and allowing the application processor to sleep or process other requests. The primary device 2302 can perform an operation (2312) to detect a nearby secondary device 2304 based on an expected broadcast address. The retrieved broadcast address from the secondary device 2304 is compared to the expected broadcast addresses of secondary device 2304 in operation (2314).

The primary device 2302 selectively performs an operation (2316) to send a message with timer reset packet and the near-owner authorization token as the source address based on the comparison result. If the comparison results in a match between a retrieved hardware address with an expected hardware address, then the near-owner state is maintained to preserve resources, such as allowing the application processor to sleep. In one embodiment, the message is a Bluetooth® network packet that is sent with the near-owner authorization token as the Bluetooth® source hardware address. The timer reset packet may include a reset identifier and a channel designated on which to expect advertisements.

The secondary device 2304 can then enter near-owner mode in response to receipt of message with near-owner authorization token as the source address in operation (2319). After the time has elapsed in accordance with the maintenance time period (2321) and (2322), the secondary device may send a near-owner advertisement (2321).

Figure 24:
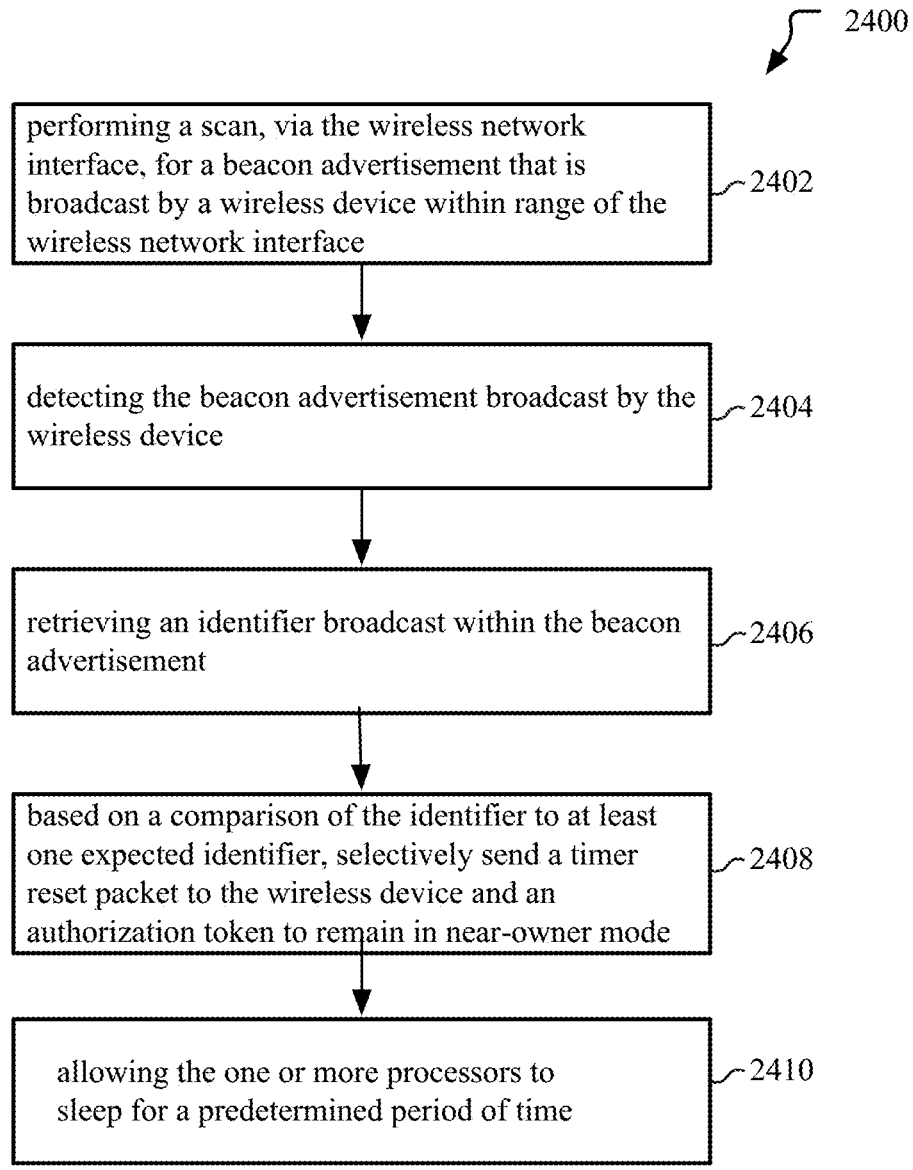
FIG. 24 is a flow diagram of a process of entering a near-owner state at a secondary device and subsequent maintenance of the near-owner state, according to an embodiment.

FIG. 24 is a flow diagram 2400 of a process for entering a near-owner state at a secondary device and subsequent maintenance of the near-owner state from the perspective of the primary device 2302, according to an embodiment.

Initially, a scan is performed by a primary device 2302, via a wireless network interface, for a beacon advertisement that is broadcast by a wireless device (e.g., secondary device 2304) within range of the wireless network interface (2402). The beacon advertisement broadcast by the wireless device is detected (2404).

Next, at least one identifier is retrieved from the broadcast within the beacon advertisement (2406). A comparison is performed by the primary device 2302 between a retrieved identifier, such as a hardware address, and an expected identifier, such as a hardware address for the secondary device 2304 within a lookup table is performed. In some embodiments, the hardware address may be an export key. Based on a result of a comparison between the at least one identifier to at least one expected identifier (e.g., a hardware address), a timer reset packet is sent to the wireless device (e.g., secondary device 2402) with an authorization token to remain in near-owner mode (2408). If the comparison result is a match, then a timer reset packet is sent to the secondary device 2402. One or more identifiers may be used to communicate a valid timer reset command. In an embodiment, a hardware address, a channel and a reset identifier should be in the timer reset packet to allow the secondary device 2304 to identify the packet as a reset packet and set a timer on the secondary device 2304.

One or more processors may sleep for a predetermined maintenance period of time (2410). The application processor of the primary device 2302 may sleep until the maintenance period of time elapses. In an embodiment, the primary device 2302 may be in a low power state and beacon scans can be performed by the wireless processor and a wireless radio receiver as a low power operation while the finder device is idle, inactive, or otherwise in a low power state. Alternatively, the application processor may handle other requests.

Figure 25:
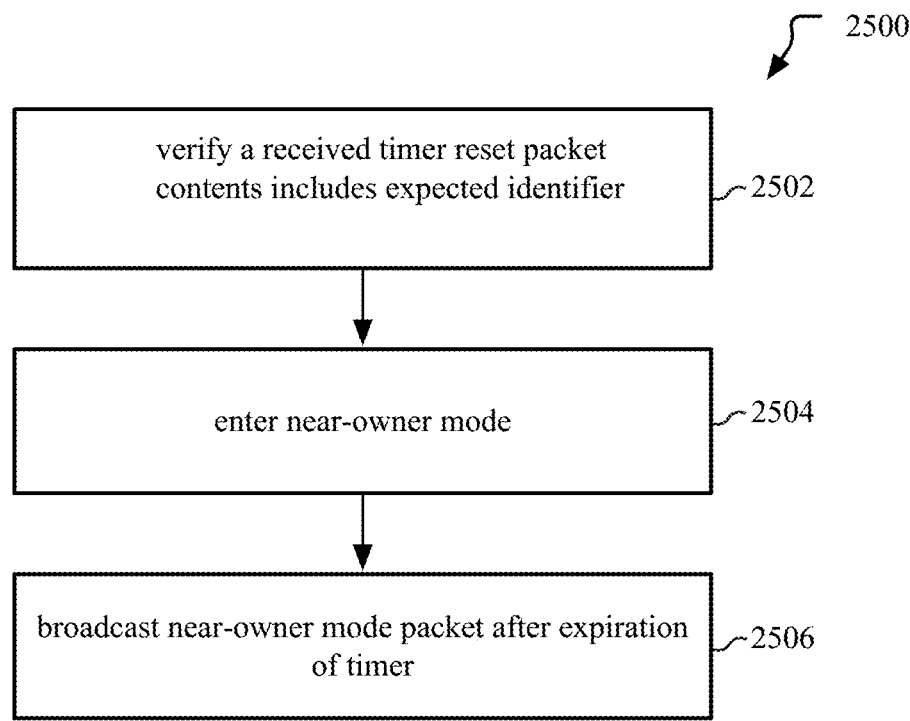
FIG. 25 is a flow diagram of a process of entering a near-owner state at a secondary device and subsequent maintenance of the near-owner state, according to an embodiment.

FIG. 25 is a flow diagram 2500 for a process of entering a near-owner state at a secondary device and subsequent maintenance of the near-owner mode, according to an embodiment. A received timer reset packet contents includes at least one expected identifier that is verified by a secondary device (2502). The received timer reset packet may be a Bluetooth® Connect_IND connection request packet with one or more identifiers to trigger a timer. In an embodiment, the identifiers, including a hardware address, a reset identifier, and a channel number, may match in order to proceed with setting the timer on the secondary device 2304. In an embodiment, the timer reset packet contains an expected Near Owner Auth token (e.g., hardware address), a particular identifier indicating that the packet is a timer reset packet, and a channel selection in the preamble indicating the connection should not be established. In an embodiment, the channel selection and/or lack of reset identifier may indicate the packet is a request to form a connection. In some embodiments, a connection will not be formed between the primary device 2302 and secondary device 2304, but the near-owner mode may be maintained. The secondary device 2304 enters near-owner state (2504) after verification of the timer reset packet, and the secondary device sends a near-owner mode packet to the primary device 2302 after expiration of timer (2506). The timer may reset again if the secondary device 2304 receives a packet from the primary device 2302 after expiration of the timer. Alternatively, if a packet is not received from the primary device 2302, the secondary device will enter wild mode.

In an embodiment, the secondary device 2304 filters received advertisements to only receive advertisements from a primary device 2302 and will not accept requests to play a sound used to identify unwanted tracking devices.

Figure 26:
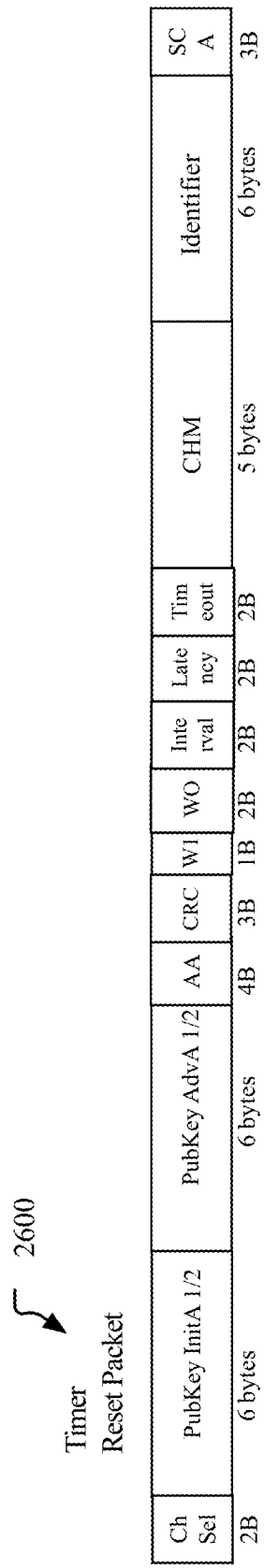
FIG. 26 illustrates a connection packet for a timer reset packet.

FIG. 26 illustrates a connection packet 2600 for a timer reset packet, in some embodiments. Connection packet 2600 may be an implementation of Bluetooth® CONNECT_IND packet that is used to form a connection mode that allows bi-directional communication between two devices according to the Bluetooth® specification. In some embodiments, the packet formats may differ from standard wireless protocol packets. In an embodiment, the connection packet may be used to send a reset a timer without forming a connection. In yet another embodiment, the timer reset packet 2511 includes a first public key portion (PubKey1/2) InitA for use as an initiator advertisement address (e.g., hardware address). The first key portion can include the first six bytes of the current public key for the wireless accessory. In one embodiment, the most significant bits of the advertisement address are constrained to the value 0b11, which specifies a static device address. The actual address bits are instead stored in the EK (extra key) field, along with bits that define a tag type for the wireless accessory if the wireless accessory is a wireless beacon tag. The timer reset packet may include fields: an advertiser's address, LLData, AA, CRCInit, WinZize, WinOffset, Interval, Latency, Timeout, ChSel (part of preamble), Hop, ChM and SCA. In an embodiment, the Hop increment value may have a value outside of a value (e.g., outside a range of 5-16) specified in the Bluetooth® specification. The ChSel field may be in the preamble of the Connect_IND packet with an expected broadcast channel. In an embodiment, the ChSel needs to be set to value 1 set a timer and not establish a connection between the primary device 2302 and secondary device 2304. The secondary device 2304 may identify the connection packet as a reset timer packet command based on receipt of an expected InitA value, Hop value, and ChSel value. Optionally, the AA field value may be an Access Address, the CRCInit field value may be an initialization for the CRC calculation, the WinSize and WinOffest may define the window size and transmit window offset, respectively, the Interval may define a frequency that the devices exchange data, the latency may be the number of times the wireless device skips a connection event to conserve power, the Timeout may provide a time value for timing out, and the SCA field may be used to correct clock accuracy of the primary device.

Connection and Command Tokens

Figure 27:
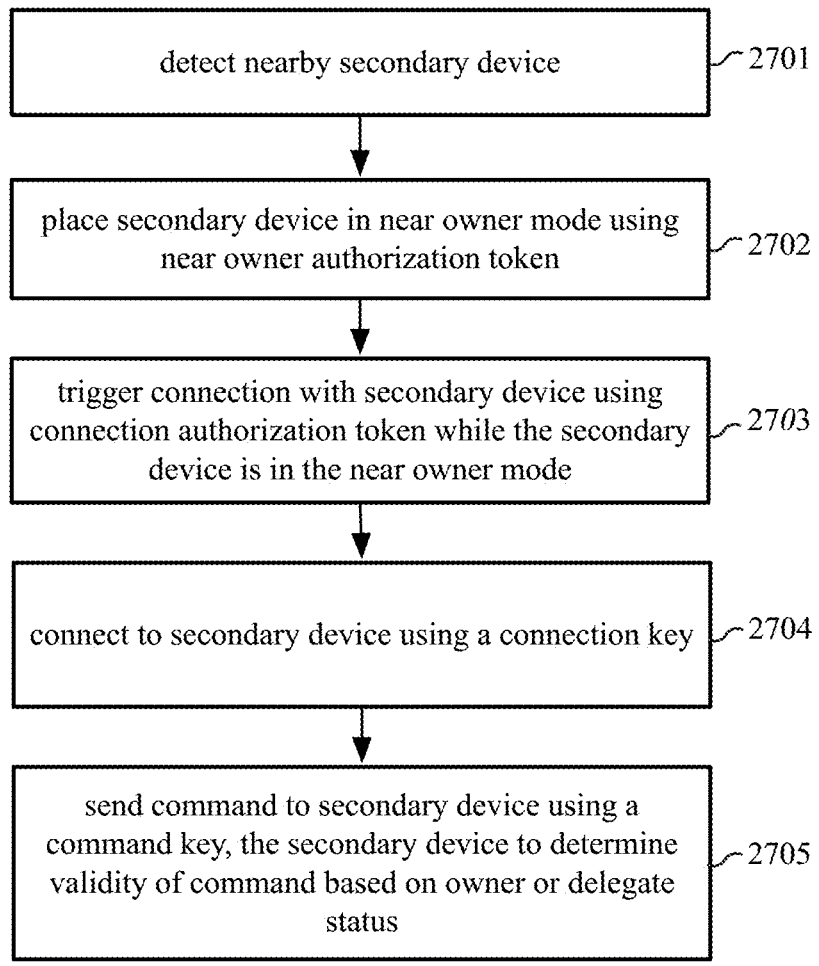
FIG. 27 is a flow diagram of a process to connect to and command a secondary device, according to an embodiment.

FIG. 27 is a flow diagram of a process to connect to and command a secondary device, according to an embodiment. The process can be performed by a primary device to connect to and command a secondary device in a manner that is secured by the keys and tokens described herein.

In an embodiment, a primary device can perform an operation 2701 to detect a nearby secondary device. For example, the primary device can detect a secondary device that is within wireless range. The secondary device can be a paired secondary device. During operation 2702, the primary device can place the secondary device in near-owner mode using a near-owner authorization token.

The primary device can detect a nearby secondary device and place the secondary device in near-owner mode as described above with respect to FIG. 26. The primary device can then perform an operation 2703 to trigger a connection with the secondary device using a connection authorization token while the secondary device is in the near-owner mode. The primary device and the secondary device can each compute a connection authorization token as:

ConnectionAuthToken$_i$=MostSignificant6Bytes(MAC (CK$_i$, x(P$_i$)||"ConnectionAuthToken"))

In the above equation, MAC refers to a message authentication code. The secondary device can place ConnectionAuthToken$_i$ into the wireless controller lookup table. The primary device can send a connection request from a hardware address equal to ConnectionAuthToken$_i$, triggering a connection request. The primary device can then perform an operation 1804 to connect to the secondary device using a connection key. For example, the primary device and the secondary device can establish a wireless connection, such as but not limited to a Bluetooth® connection, using connection key LTK$_i$. In one embodiment, to prevent repeated battery-draining attacks using an incorrect LTK$_i$, responses to tokens may be rate-limited.

The primary device can then perform an operation 2705 to send a command to secondary device using a command key. Some commands can only be issued by an owner device using an owner command key OK$_i$. For such commands, the owner device can send a command to the secondary device via a command composed as:

send     <command>||MAC(OK$_i$,     x(P$_i$) ||"OwnerCommand"||<command>||<counter>)

In the command composition, counter is a 32-bit integer that monotonically increases with every valid owner command sent to the secondary device. The counter value may be reset each privacy period. The primary device and the secondary device each keep track of the counter value. In one embodiment, if the secondary device receives a command with an invalid hardware address, the secondary device will discard the command, not increment the counter value, and terminate the connection. While authenticated commands that use a command key are described, some commands may be non-authenticated commands that do not require the presence of a command key. A device can support both authenticated and non-authenticated commands. In one embodiment, some commands may be authenticated or non-authenticated depending on the state of the secondary device. In one embodiment, the secondary device can determine the validity of the command in part based on an owner or delegate status associated with the primary device and whether the primary device has the proper keys for the attempted command. Delegation is described in further detail below.

Figure 28:
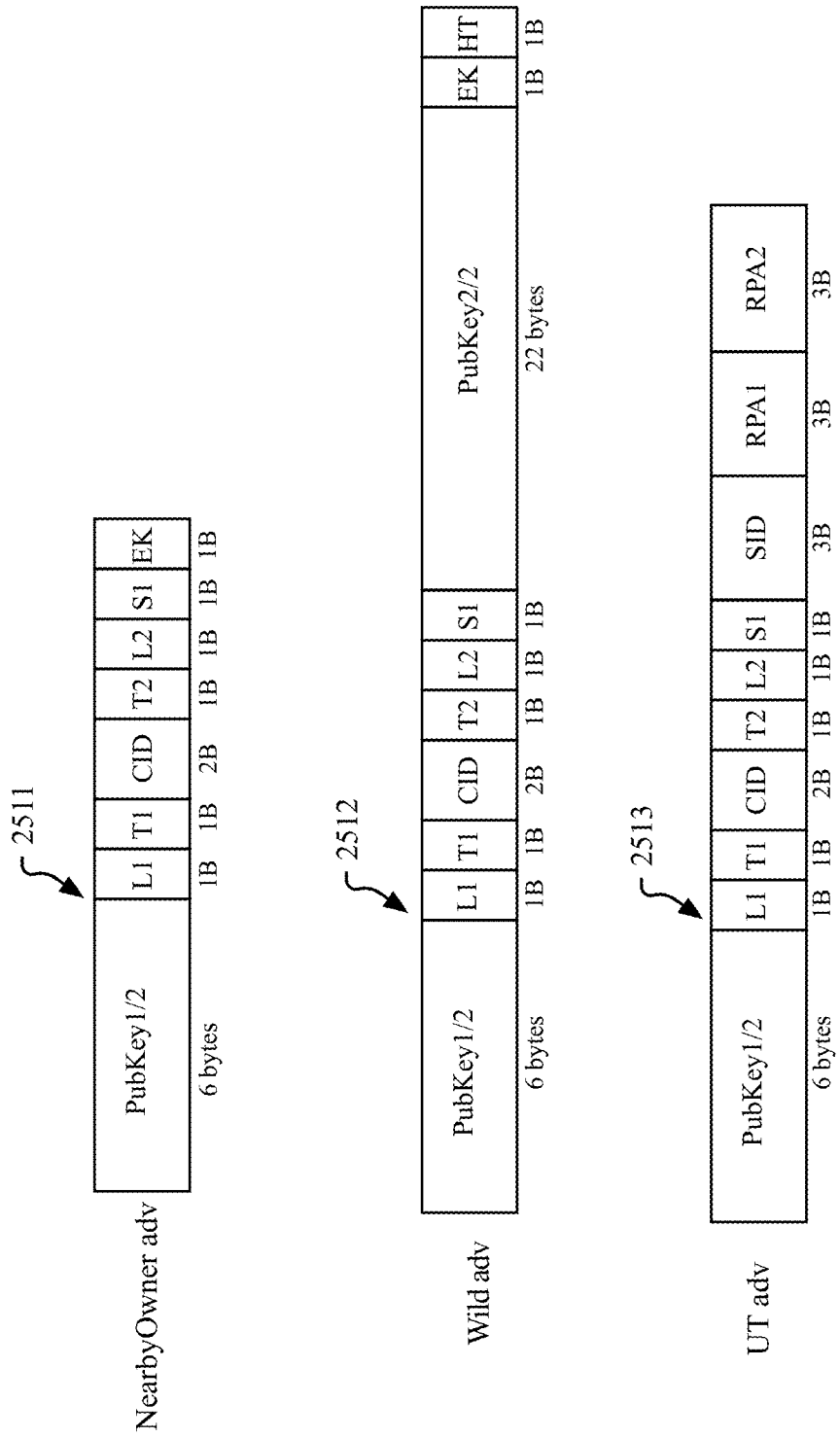
FIG. 28 illustrates advertisement beacon packets for a wireless accessory.

FIG. 28 illustrates advertisement beacon packets 2810 for a wireless accessory (e.g., secondary device 2304). Advertisement packets that are broadcast by a wireless accessory can vary based on whether the accessory is in a near-owner mode (packet 2811), in a wild mode (packet 2512), or broadcasting unwanted tracking determination and/or suppression data (packet 2813). In one embodiment the advertisement packets may be Bluetooth® Low Energy advertisement packets. However, embodiments are not limited as such. Additionally, the packet formats may differ from standard wireless protocol advertisement packets.

In one embodiment the near-owner advertisement packet 2811 includes a first public key portion (PubKey1/2) for use as an advertisement address. The first key portion can include the first six bytes of the current public key for the wireless accessory. In one embodiment, the most significant bits of the advertisement address are constrained to the value 0b11, which specifies a static device address. The actual address bits are instead stored in the EK (extra key) field, along with bits that define a tag type for the wireless accessory if the wireless accessory is a wireless beacon tag. The near-owner packet can additionally include fields L1, T1, CID, T2, L2, and S1. L1 is the length of the advertisement type field, T1 is the advertisement type field, CID is the company ID field, T2 is the payload type (e.g., object discovery), L2 is the length of the object discovery field, and S1 is a status flag field. The length of the object discovery payload can vary depending on whether the wireless accessory is in near-owner or wild mode. The status flag field can include, for example, the battery state and additional device type flags, such as, for example, whether the wireless accessory is a wireless beacon tag.

In one embodiment the wild mode advertisement packet 2812 can include similar fields as the near-owner advertisement packet 2511. The wild mode advertisement packet 2812 can additionally include a second public key portion (PubKey2/2) that includes additional bits of the public key. In one embodiment, the additional bits of the public key or the combined public key (PubKey1/2, PubKey2/2, EK) can be used as a static identifier for the wireless accessory that allows unwanted tracking notifications to be suppressed. In one embodiment the combined public key can also be used as an encryption key by finder devices to encrypt an observed location of the wireless beacon when an observation is uploaded to a device locator server.

In one embodiment, a wireless accessory is configured to broadcast a separate UT advertisement packet 2813 in an alternating sequence with wild mode advertisement packets 2812 while the accessory is in wild mode. The UT advertisement packets 2813 can include RPA1 and RPA2 values, which can be used to ignore or suppress notifications until the end of day or indefinitely. The RPA1 and RPA2 values are based on a diversified public key, which rolls every privacy period (e.g., every 15 min) and an IRK value. In one embodiment, IRK_EOD rolls every 24 hours, while IRK_INDEF does not roll and unless the wireless accessory undergoes a factory reset. The wireless accessory may be factory reset in response to unpairing the accessory from a companion device.

The UT advertisement packet 25813 is optional. In one embodiment, the UT advertisement packet 2813 can be excluded and suppression can be performed by using the static identifier for the wireless accessory. The static identifier can be configured to roll every 24 hours, allowing an unwanted tracking notification to be suppressed for an accessory each day. For example, in one embodiment the diversified public key for the device can continue to roll internally for an accessory while in wild mode, while the wild mode advertisement address is configured to roll at, for example, midnight local time for the wireless accessory. During the key roll, the currently active internal public key can be configured as the advertisement address for the beacon advertisement. To assist the owner device is re-connecting to the accessory while in wild mode, the wild mode advertisement packet 2812 can include a hint field HT that contains a set of bits (e.g., set of least significant bits) of the public key that is in current use by the accessory. The owner device can use that information to generate the proper owner key token to place the wireless accessory into near-owner mode. Once in near-owner mode, the wireless accessory can begin advertising using the near-owner advertisement packet 2811.

Computing System with a Secure Processor

FIG. 29 illustrates a computing system 2200 including a secure processor, according to an embodiment. In one embodiment the illustrated secure processor 2903 is a secure enclave processor, although other types of secure processors may be used to accelerate cryptographic operations described herein. The computing system 2900 can enable a device to perform secure accelerated cryptographic operations, to provide secure storage for a subset of private keys, and to enable the encryption of other private keys. A version of the computing system 2900 can be included in a primary device (e.g., smartphone) and a secondary device (e.g., computing device, wearable device, wireless accessory) as described herein.

The computing system 2900 includes an application processor 2921 that is communicably coupled with a secure processor 2903 via a secure interface 2919. The computing system 2900 can be a portion of any of the client devices described herein. Additionally, the computing system 2900 can be included into one or more of the servers described herein. In one embodiment, the secure processor 2903 can be implemented as a system on chip. In another embodiment, the application processor 2921 and the secure processor 2903 can be implemented on a system on chip and include one or more processors and memory controllers and other components on a single integrated circuit.

The secure processor 2903 can perform cryptographic operations as described herein, as well as other system security operations such as encrypting user files or verifying code signatures, processing user passcodes, or performing other security operations. The cryptographic operations can be performed in part by the secure processor core 2915 by executing software stored as firmware 2911 in the secure processor 2903. The secure processor core 2915 can also be coupled to a ROM 2913 which can be trusted software that can validate the software in the firmware 2911 before allowing that firmware to execute by checking a code signature of the firmware and verifying that the signature code indicates that the firmware is valid and has not been corrupted before allowing the firmware to be executed by the secure processor core 2915.

The secure processor 2903 can also include a cryptographic accelerator such as cryptographic accelerator 2907 which can perform asymmetric cryptography as well as symmetric cryptography using a hardware accelerator. The cryptographic accelerator 2907 can be coupled to a memory 2905, which can be a non-volatile and immutable memory that is used to store, in a secure manner, a device identifier or a set of device identifiers and a set of one or more certificates and private keys which are hidden from the rest of the system and are not readable by the rest of the system in one embodiment. The cryptographic accelerator 2907 has access to the private keys and other data within the memory 2905 and access to the memory 2905 is not allowed for components outside of the secure processor 2903. In one embodiment, the cryptographic accelerator 2907 can be coupled to an accelerator memory 2909 which can be a scratch pad memory used to perform the cryptographic operations that are performed by the cryptographic accelerator 2907. The application processor 2921 can be coupled to one or more buses 2923 which are coupled to one or more input and output (I/O) devices 2927, such as a touchscreen display a Bluetooth® radio, an NFC radio, a Wi-Fi radio, etc. Other input and output devices can be included. The application processor 2921 is also coupled to an application processor ROM 2925, which provides software to boot the application processor. Similarly, the ROM 2913 provides code to boot the secure processor core 2915 within the secure processor 2903.

Detection of Unwanted Tracking

A potential downside of the rolling key privacy protections described herein is the risk of allowing accessories to remain unfound or allowing accessories to be placed on an individual with malicious intent to track the individual. Accordingly, techniques are provided to enable a user device to detect the potential of unwanted tracking using the device locator techniques described herein.

Techniques are provided to mitigate the risk of accessories supporting privacy preserving locator services being used to surreptitiously and maliciously track individuals without losing the utility of the service to enable lost accessories to be found. Wireless accessories will enter a discoverable wild mode when separate from the owner device for a period of time. Heuristics can be applied using sensor data to infer movement or activity context to additionally determine whether to cause a device to enter discoverable wild mode. When in the discoverable wild mode, devices will begin to advertise a new payload containing a stable identifier in alternation with the standard privacy preserving advertisement payload. The discoverable wild mode uses the same privacy preserving hardware address as the standard payload, allowing prompt discovery by the owner when co-located with the wireless accessory. The stable identifier is broadcast as part of the data field of the payload. The stable identifier can be broadcast in alternate packets as the standard beacon broadcast. The stable identifier is non-unique and for every N devices an identifier collision will occur (for various values of N based on the selected identifier length). The non-unique nature of the stable identifier prevents the use of the stable identifier as a tracking tool in large crowds (e.g., malls, etc.), while allowing the identifier to be used to detect persistent malicious tracking if the same stable identifier on a non-owned device is continuously observed.

The alternate packets can have truncated headers to allow extra data to be included in the payload. The extra data can include, for example, information that can be used to suppress any alerts associated with the wireless device. When the same stable identifier of a wireless accessory in discoverable wild mode is continuously observed, the user of the finder (e.g., non-owner) device may be alerted. Heuristics are used to filter false positive alerts. In addition to an alert, options can be provided to the user of the finder device as to how to proceed, such as how to locate and identify an accessory that is potentially being used to track an individual or how to suppress notifications for wireless accessories that are known to the user of the user device.

Based on certain triggering scenarios, a scan for devices in discoverable wild mode can be initiated. A scan can be triggered, for example, when a user is in transit, such as walking running, or biking for greater than a period of time and/or for greater than a threshold distance. A scan can be triggered when a device detects a state transition in device motion, for example, when beginning or ending a trip via public or private transit. A scan can also be triggered when a user is leaving or arriving at a location of interest, such as the user's home or work, or other places where the user regularly spends time (e.g., gym, coffee shop, etc.).

Heuristics and/or machine learning models can be used to reduce the number of false positives for tracking detection. In one embodiment, context-based heuristics are applied, including the analysis of device motion, device location, and the number of detected wireless devices around the device, which can be detected by the various advertisement beacons broadcast by those devices. For example, alarms can be suppressed on a device when the device is at the user's home location and stationary, as it unlikely the user is being tracked at that point. Alarms can also be suppressed when the user is on crowded public transit (e.g., bus, subway, train, etc.), as there are legitimate reasons why the device of the user will persistently a detect tags having the same stable identifier. In one embodiment, the heuristics can be applied via a machine learning model that has been trained using device context data that corresponds with a high likelihood of potential false-positive unwanted tracking notifications. An on-device model can apply inference operations to recognize potential false-positives based on device context data and suppress warnings that are likely false positives.

Heuristics and/or machine learning models can also be applied to determine an increased likelihood of unwanted tracking. For example, if the same persistent identifier is detected at the beginning and end of a vehicle state transition, after leaving a high density area, or after leaving a location of interest, it is possible that the detected wild mode tag is being used to track the user. An on-device model can be configured to detect such scenarios and lower the alert thresholds in such scenarios, resulting in faster notifications in scenarios where device context information suggests that unwanted tracking is more likely.

In one embodiment, determination of the density of an area can include determining a number of beaconing wireless devices that are within range of an electronic device. This determination can include performing a wireless scan to detect, for example, a number of Bluetooth® or Bluetooth® Low Energy devices that are in the vicinity of the electronic device. Operations can then be performed to consolidate multiple devices that appear to be on the same person. For example, if multiple beaconing devices appear to be at the same location for a period of time, those devices may be determined to be associated with a single individual. Additionally, of multiple beaconing devices within a small radius appear to be moving in the same direction at the same rate for a period of time, those devices may be determined to be associated with the same moving individual. Consolidating beacons enables a determination of the density of individuals within a region, rather than a determination of the number of devices. The number of individuals in an area can then be used to determine a population density for an area for the purposes of false-positive or likely tracking scenarios.

Exemplary Unwanted Tracking User Interfaces

Figure 30A:
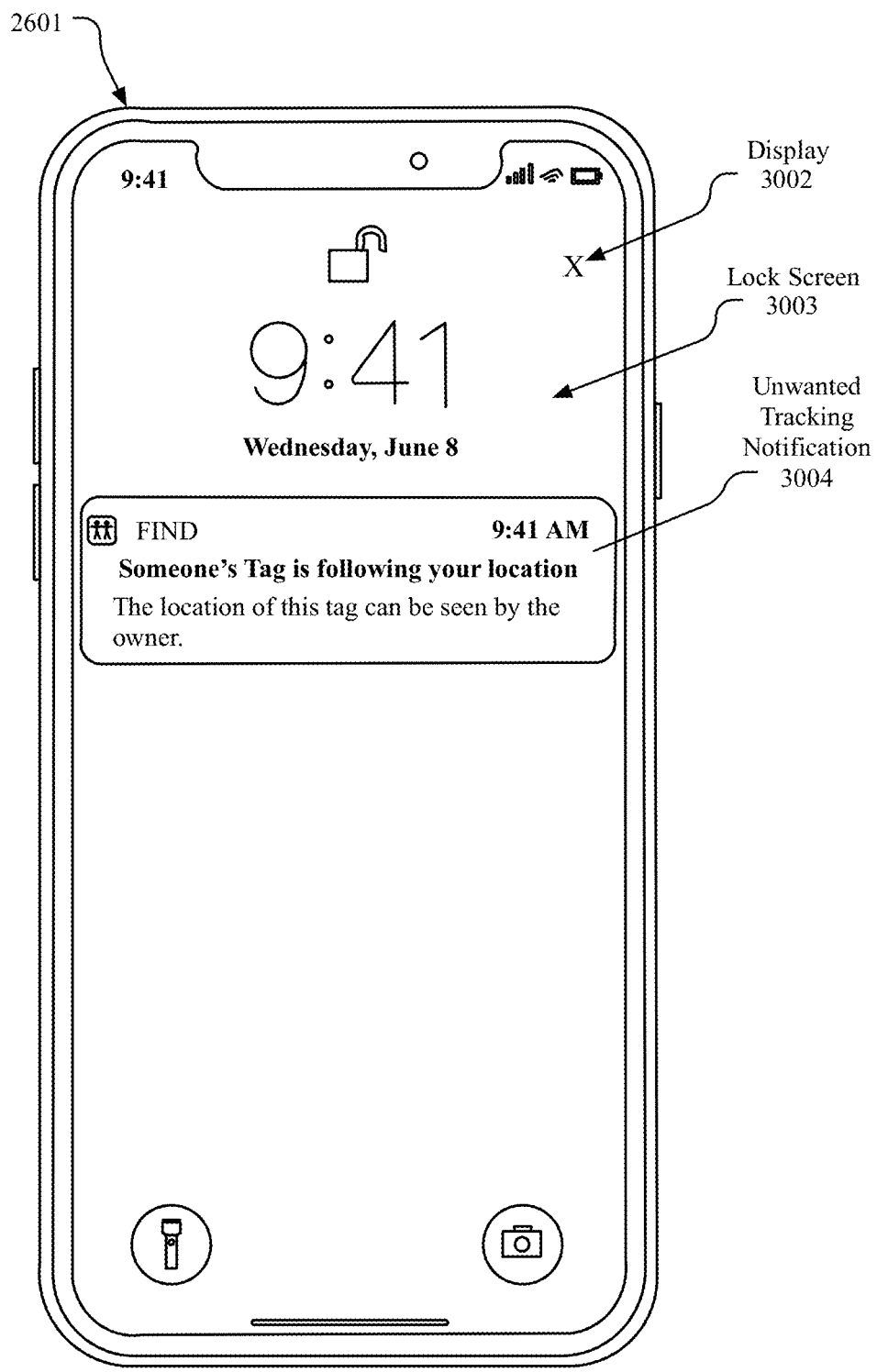
FIG. 30A-C illustrate unwanted tracking user interfaces on an electronic device, according to an embodiment.
Figure 30B:
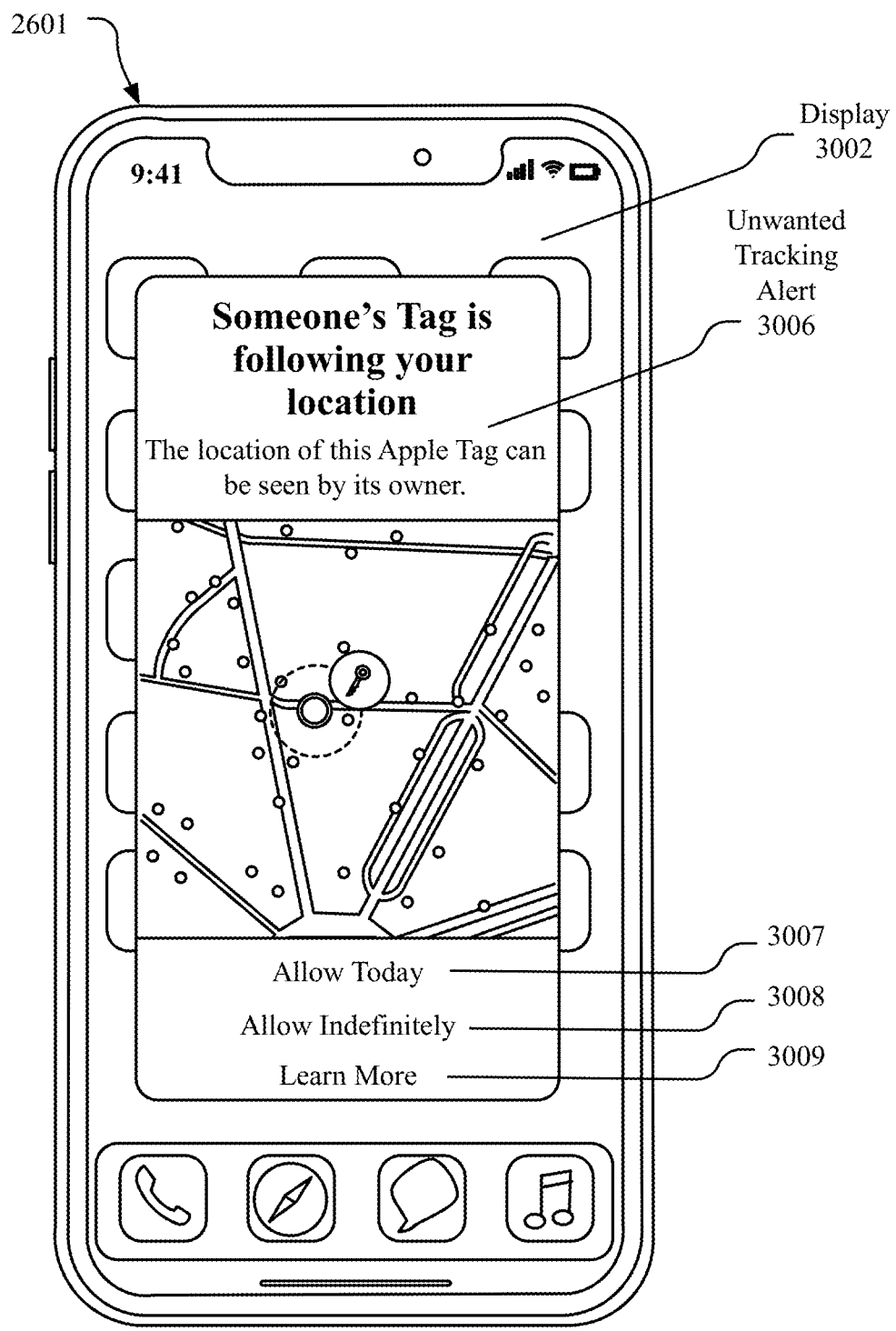
Figure 30C:
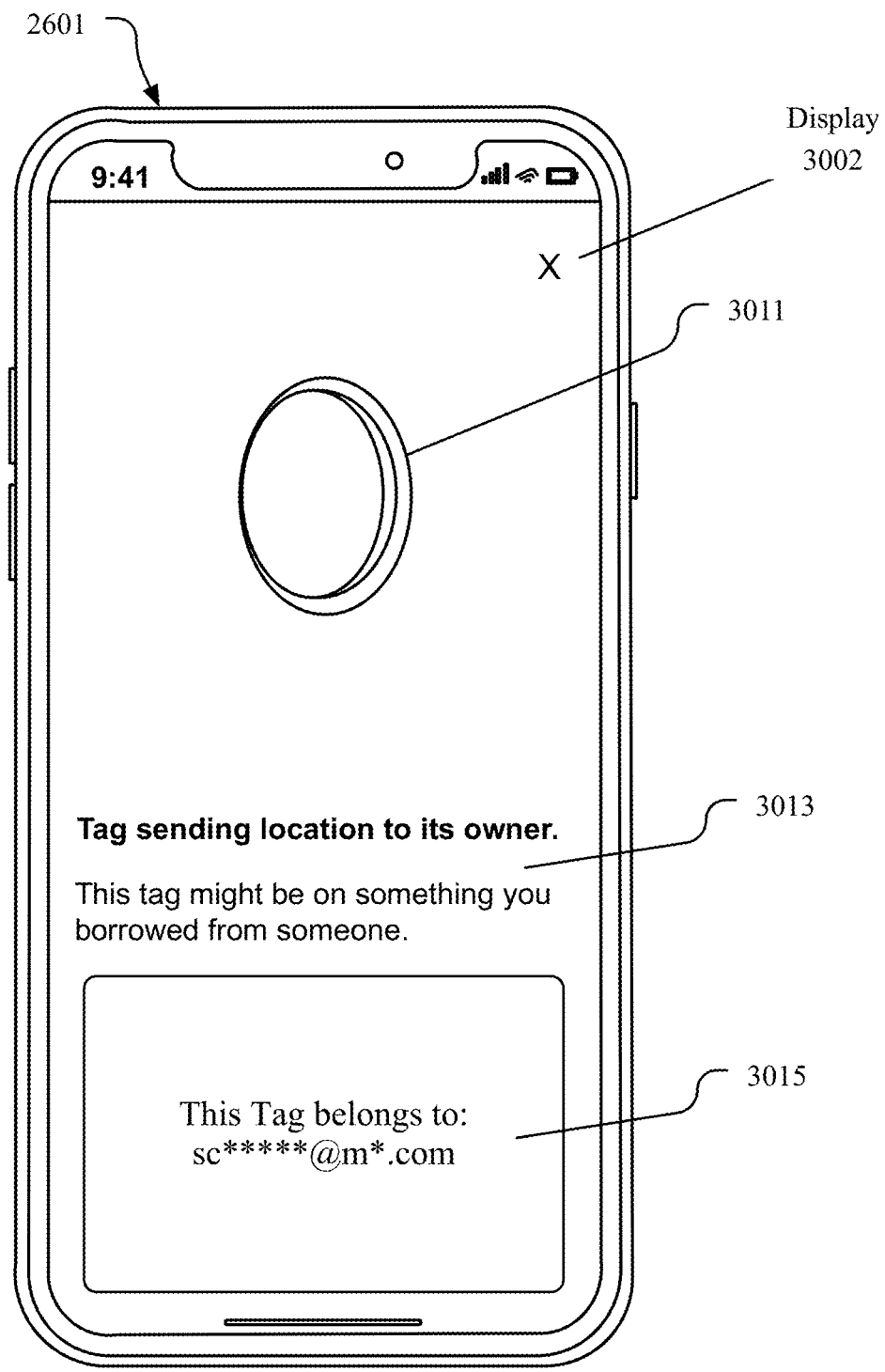

FIG. 30A-C illustrate unwanted tracking notifications and alerts, according to an embodiments. FIG. 30A shows an electronic device 3001 that can include a display 3002 that can be used to display a lock screen user interface 3003 while the electronic device 3001 is in a locked state. While in the locked state, the electronic device 3001 can display an unwanted tracking notification 3004 in response to a determination (e.g., based on the operations 2500 shown in FIG. 25A) that beaconing wireless accessory may be allowing unwanted tracking of a user.

FIG. 30B shows an electronic device 3001 having a display 3002 on which an unwanted tracking alert 3006 can be presented. The unwanted tracking alert 3006 can inform the user that the location of the tag is remotely visible and/or that the tag may be allowing an unauthorized person to remotely track the location of the user. The unauthorized person can track the location of the tag via, for example, the device locator UI 204 described herein. When an unwanted tracking notification is issued, a user can be presented with multiple options. An interface element 3007 can be presented to enable the user to allow the presence of the tag (e.g., suppress unwanted tracking alerts) for the current day. An interface element 3008 can also be presented to allow the tag indefinitely. An additional interface element 3009 can be presented to provide information about the unwanted tracking alert.

FIG. 30C shows a user interface on an electronic device 3001 having a display 3002 on which a user interface can be displayed that presents information on an owner of a device that is being used for potential unwanted tracking. The user interface can display a representation of a detected wireless device (e.g., tag 3011) and informational text 3013 that informs the user that the detected wireless device may be on (e.g., attached to or included within) a borrowed item. The tag may also be on an individual that is travelling with the user. In one embodiment a user can also be presented with an option to perform an NFC tap to reveal a masked identifier for an accessory. The NFC tap can acquire information on the tag that can be sent to a registration server. The registration server may return information that allows the user interface to display an incomplete identifier 3015 of the registered user of the tag. The user may recognize the incomplete identifier 3015 and determine that the tag is safe. In one embodiment, if there is a relationship between the user account on the electronic device 3001 and the user account to which the accessory is registered, the identifier may be a complete or unmasked identifier. The relationship may be determined by the registration server, which can send an unmasked identifier, or can be determined by the electronic device. For example, a masked identifier can be sent as cleartext, while an unmasked identifier may be sent that is encrypted. If the electronic device 3001 is already aware of the appropriate decryption key, such as a public key of the account to which the accessory is registered, the electronic device 3001 and decrypt and display the unmasked identifier.

Figure 31A:
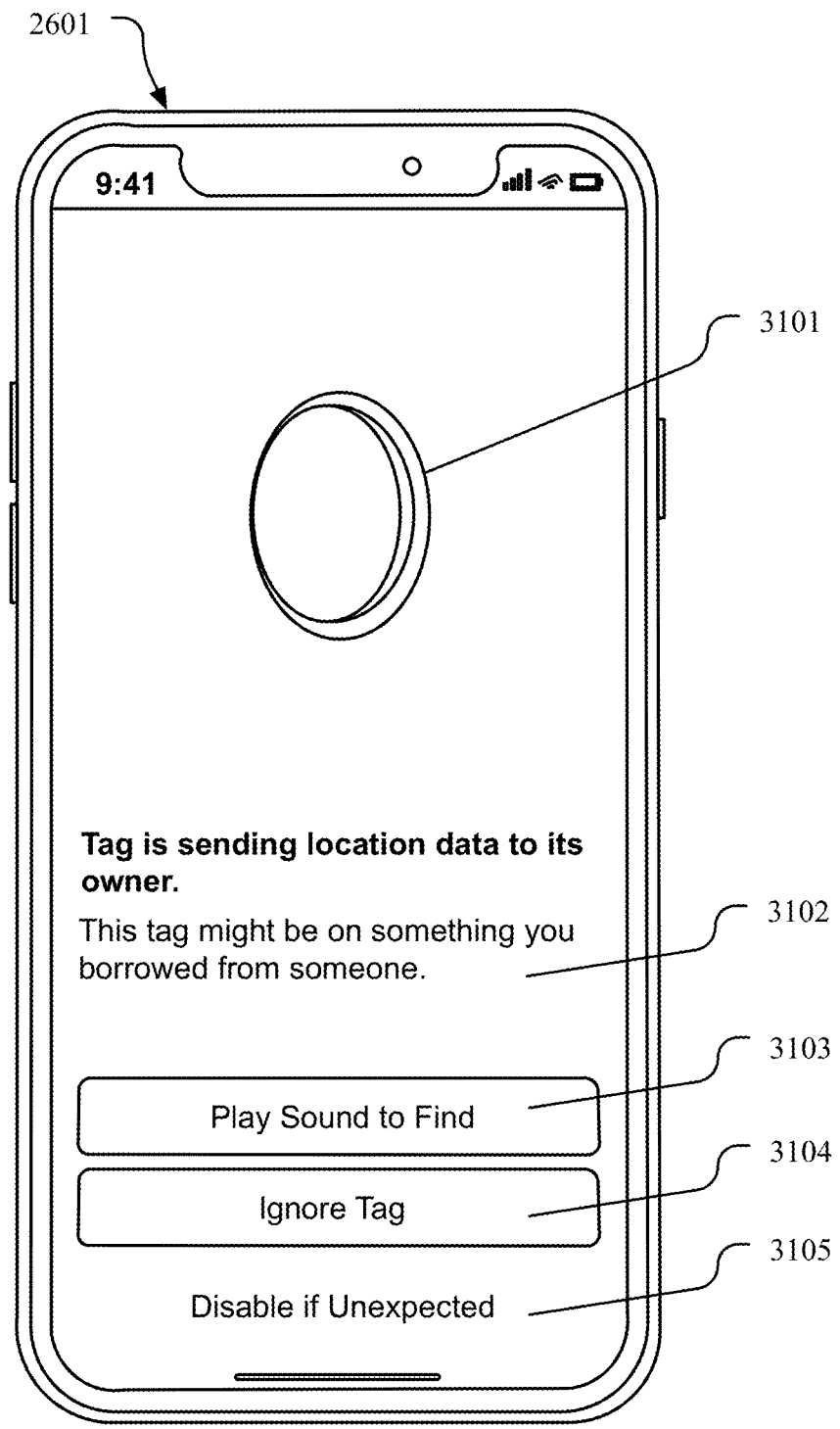
FIG. 31A-C illustrate unwanted tracking user interfaces on an electronic device, according to an embodiment.
Figure 31B:
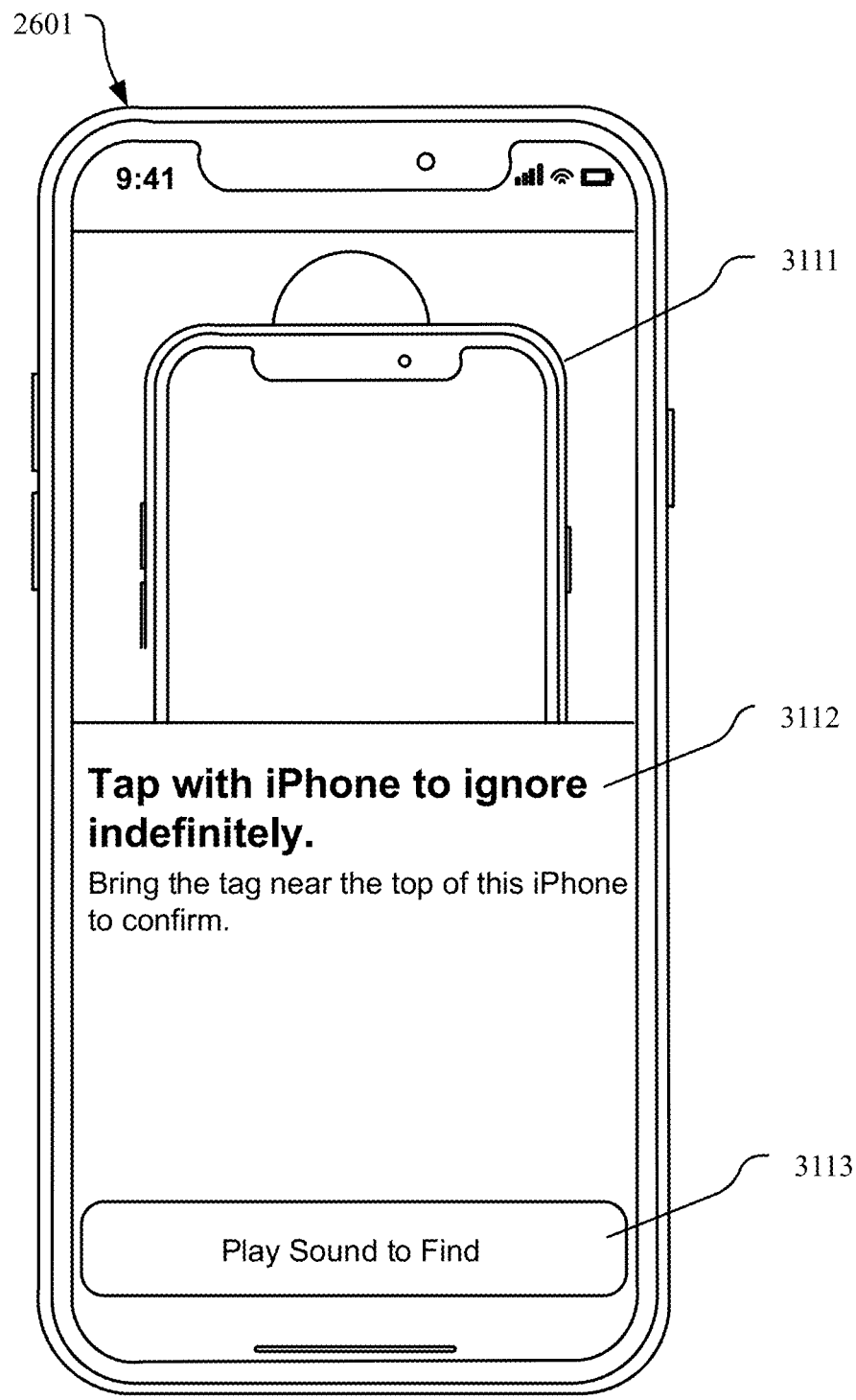
Figure 31C:
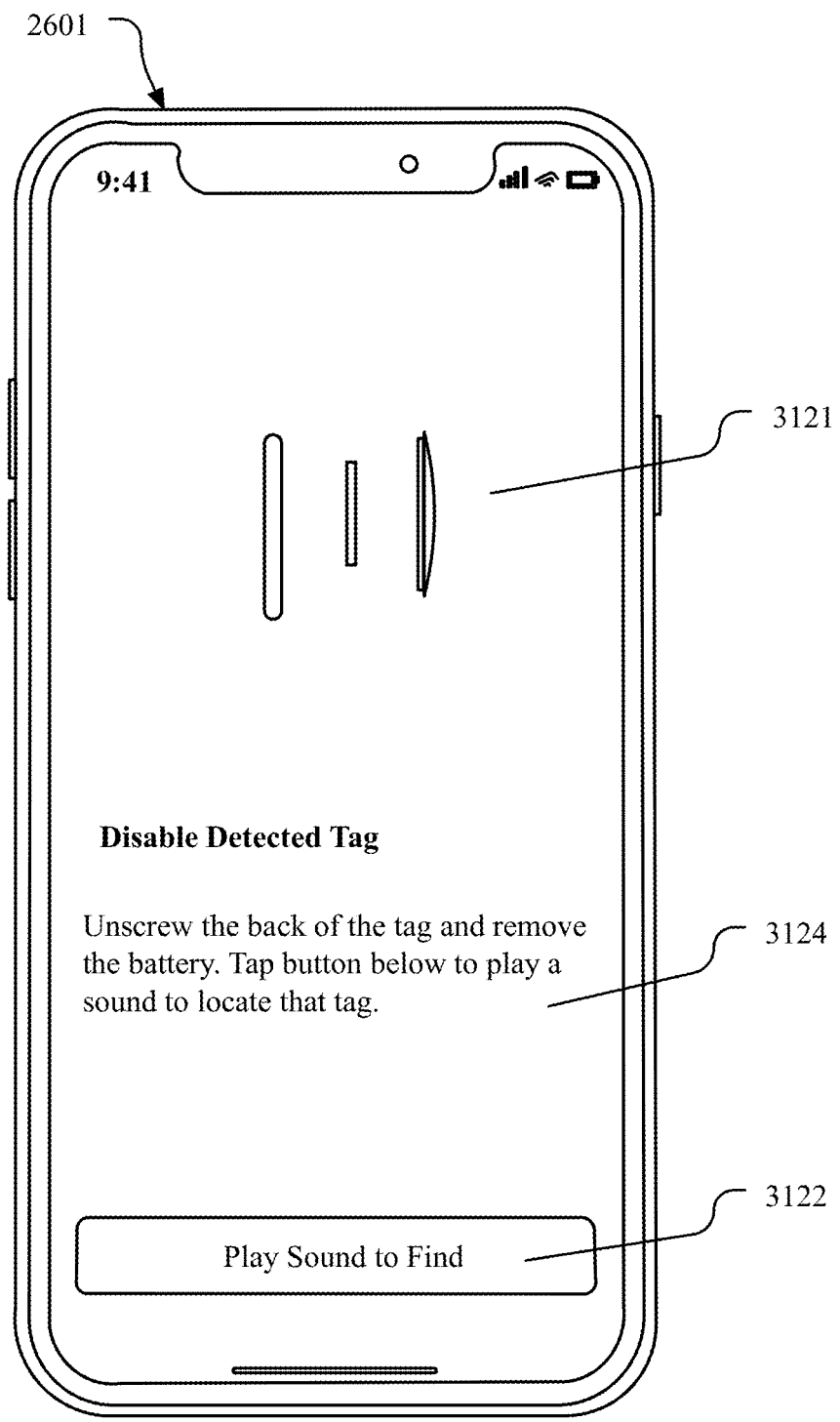

FIG. 31A-C illustrate unwanted tracking user interfaces on an electronic device 3101, according to an embodiment. The unwanted tracking user interfaces can be presented on the display 3102 of the electronic device 3101 after an unwanted tracking notification or alert has been presented.

As shown in FIG. 31A, an unwanted tracking user interface can be presented that includes the display of a representation 3101 of the tag or other wireless accessory that may be allowing unwanted tracking of a user, along with informational text 3102 as to the nature of the unwanted tracking alert and/or the nature of the accessory device that may be allowing the user to be tracked. Additionally, an interface element 3103 can be presented to play a sound that allows the user to find the accessory. An interface element 3104 can also be presented to ignore warnings for the accessory. An interface element 3105 can also be presented to present a screen that informs the user how to disable the accessory if the accessory is being used to facilitate unwanted tracking.

As shown in FIG. 31B, an unwanted tracking user interface can be presented that includes graphical display 3111 and instructional text 3112 of how to an NFC tap of the accessory device can be used to indefinitely ignore the accessory device. An interface element 3113 can also be presented to send a command to the accessory device that causes the accessory device to play a sound that allows the accessory device to be located.

As shown in FIG. 31C, an unwanted tracking user interface can be presented that includes the display of a representation 2621 of the tag or other accessory device that may be allowing unwanted tracking of a user and instructional text 3124 that informs the user how to disable the accessory device. An interface element 3122 can also be presented to send a command to the accessory device that causes the accessory device to play a sound that allows the accessory device to be located.

Although the embodiments have been described in language specific to structural features and/or methodological acts, it is to be understood that the appended claims are not necessarily limited to the specific features or acts described. The specific features and acts disclosed are instead to be understood as embodiments of the claims useful for illustration.

What is claimed is:

1. An electronic device comprising:
   a memory comprising computer-executable instructions; and
   one or more processors configured to access the memory and execute the computer-executable instructions to perform operations comprising:
      scanning, by a first processor of the one or more processors of the electronic device, for a beacon advertisement that is broadcast by a wireless accessory device in a near-owner mode, wherein the wireless accessory device is in the near-owner mode when the electronic device is within range of the wireless device;
      detecting, by the electronic device, the beacon advertisement broadcasted by the wireless device;
      retrieving, by the electronic device, an identifier broadcast within the beacon advertisement;

based on a result of a comparison between the identifier to at least one expected identifier, sending, by the electronic device to the wireless device, a timer reset packet and an authorization token for the wireless accessory device to remain in the near-owner mode, wherein the timer reset packet includes a predetermined time period; and managing, by the electronic device, a second processor of the electronic device in sleep mode for the predetermined time period.

2. The electronic device of claim 1, wherein the identifier is a hardware address.

3. The electronic device of claim 1, wherein the memory comprises additional computer-executable instructions and the one or more processors are further configured to access the memory and execute the additional computer-executable instructions to perform additional operations comprising:
determine whether the wireless device associated with the beacon advertisement is associated with an account on the electronic device.

4. The device of claim 1, wherein the memory comprises additional computer-executable instructions and the one or more processors are further configured to access the memory and execute the additional computer-executable instructions to perform additional operations comprising to generate a set of cryptographic keys based on a key material, wherein the key material is collaboratively generated with the wireless accessory device.

5. The device of claim 4, wherein:
the set of cryptographic keys includes keys for one or more privacy periods of the wireless accessory device; and
the memory comprises additional computer-executable instructions and the one or more processors are further configured to access the memory and execute the additional computer-executable instructions to perform additional operations comprising changing, each privacy period, one or more keys used to generate a hardware address with the wireless accessory device.

6. The electronic device of claim 1, wherein the second processor wakes after the predetermined time period.

7. The electronic device of claim 1, wherein the timer reset packet include a reset identifier and a channel selection.

8. The electronic device of claim 1, wherein the electronic device includes a Bluetooth network interface.

9. A wireless accessory device comprising:
a memory comprising computer-executable instructions; and
one or more processors configured to access the memory and execute the computer-executable instructions to perform operations comprising:
receiving, by the wireless accessory device from a electronic device, a timer reset packet, wherein the timer reset packet includes a predetermined time period and a near-owner authorization token;
identifying, by the wireless accessory device, the near-owner authorization token;
transitioning, by the wireless accessory device based at least in part on the identification of the near-owner authorization token, to a near owner mode; and
when in the near-owner mode, broadcasting, by the wireless accessory device, a near-owner mode packet after expiration of the predetermined time period.

10. The wireless accessory device of claim 9, wherein the memory comprises additional computer-executable instructions and the one or more processors are further configured to access the memory and execute the additional computer-executable instructions to perform additional operations comprising to generate a set of cryptographic keys based on a key material, wherein the key material is collaboratively generated with the electronic device.

11. The wireless accessory device of claim 10, wherein:
the set of cryptographic keys includes keys for one or more privacy periods of the wireless accessory device; and
the memory comprises additional computer-executable instructions and the one or more processors are further configured to access the memory and execute the additional computer-executable instructions to perform additional operations comprising changing, each privacy period, one or more keys used to generate a hardware address with the wireless accessory device.

12. The wireless accessory device of claim 9, wherein the predetermined time for expiration based at least in part on at least one of a location of the wireless accessory device or a motion state.

13. A computer-implemented method comprising:
scanning, by a first processor of an electronic device, for a beacon advertisement that is broadcast by a wireless accessory device in a near-owner mode, wherein the wireless accessory device is in the near-owner mode when the electronic device is within range of the wireless accessory device;
detecting, by the electronic device, the beacon advertisement broadcast by the wireless accessory device;
retrieving, by the electronic device, an identifier broadcast within the beacon advertisement;
based on a result of a comparison between the identifier to at least one expected identifier, sending, by the electronic device to the wireless accessory device, a timer reset packet and an authorization token for the wireless accessory device to remain in the near-owner mode, wherein the timer reset packet includes a predetermined time period; and
managing, by the electronic device, a second processor of the electronic device in sleep mode for the predetermined time period.

14. The computer-implemented method of claim 13, wherein the identifier is a hardware address.

15. The computer-implemented method as in claim 13, further comprising:
determining whether the wireless accessory device associated with the beacon advertisement is associated with an account on a mobile electronic device.

16. The computer-implemented method of claim 13, further comprising:
generating a set of cryptographic keys based on a key material, wherein the key material is collaboratively generated with the wireless accessory device.

17. The computer-implemented method of claim 16, wherein:
the set of cryptographic keys includes keys for one or more privacy periods of the wireless accessory device; and
the method further comprises changing, each privacy period, one or more keys used to generate a hardware address with the wireless accessory device.

18. The computer-implemented method of claim 13, wherein the second processor wakes after a predetermined time period.

19. The computer-implemented method of claim 13, wherein the timer reset packet include a reset identifier and a channel selection.

20. The computer-implemented method of claim 13, wherein the electronic device includes a Bluetooth network interface.

21. A non-transitory machine-readable medium storing instructions to cause one or more processors of an electronic device to perform operations comprising:
- scanning, by a first processor of the one or more processors of the electronic device, for a beacon advertisement that is broadcast by a wireless accessory device in a near-owner mode, wherein the wireless accessory device is in the near-owner mode when the electronic device is within range of the wireless accessory device;
- detecting, by the electronic device, the beacon advertisement broadcast by the wireless device;
- retrieving, by the electronic device, an identifier broadcast within the beacon advertisement;
- based on a result of a comparison between the identifier to at least one expected identifier, sending, by the electronic device to the wireless accessory device, a timer reset packet and an authorization token for the wireless accessory device to remain in the near-owner mode, wherein the timer reset packet includes a predetermined time period; and
- managing, by the electronic device, a second processor of the one or more processors of the electronic device in sleep mode for the predetermined time period.

22. The non-transitory machine-readable medium of claim 21, wherein the identifier is a hardware address.

* * * * *